US008260760B2

(12) United States Patent
Murakoshi

(10) Patent No.: US 8,260,760 B2
(45) Date of Patent: Sep. 4, 2012

(54) CONTENT PROVIDING APPARATUS, CONTENT PROVIDING SYSTEM, WEB SITE CHANGING APPARATUS, WEB SITE CHANGING SYSTEM, CONTENT PROVIDING METHOD, AND WEB SITE CHANGING METHOD

(75) Inventor: Sho Murakoshi, Tokyo (JP)

(73) Assignee: Sony Corporation (JP)

( * ) Notice: Subject to any disclaimer, the term of this patent is extended or adjusted under 35 U.S.C. 154(b) by 300 days.

(21) Appl. No.: 11/076,140

(22) Filed: Mar. 9, 2005

(65) Prior Publication Data
US 2005/0217459 A1 Oct. 6, 2005

(30) Foreign Application Priority Data

Mar. 24, 2004 (JP) ................. P2004-086676

(51) Int. Cl.
*G06F 17/30* (2006.01)
(52) U.S. Cl. ............................ 707/705; 707/829; 84/601
(58) Field of Classification Search ........................ None
See application file for complete search history.

(56) References Cited

U.S. PATENT DOCUMENTS

| | | | | |
|---|---|---|---|---|
| 5,969,283 A * | 10/1999 | Looney et al. | ................. | 84/609 |
| 6,484,199 B2 * | 11/2002 | Eyal | ............... | 709/223 |
| 6,700,049 B2 * | 3/2004 | Togashi | ......................... | 84/609 |
| 6,731,312 B2 * | 5/2004 | Robbin | ......................... | 715/792 |
| 6,928,433 B2 * | 8/2005 | Goodman et al. | ............. | 386/243 |
| 6,947,705 B2 * | 9/2005 | Tsuchiuchi | ................... | 455/3.06 |
| 6,954,763 B2 * | 10/2005 | Nunome et al. | ............... | 707/102 |
| 6,987,221 B2 * | 1/2006 | Platt | ................................ | 84/601 |
| 7,024,424 B1 * | 4/2006 | Platt et al. | ............................. | 1/1 |
| 7,166,791 B2 * | 1/2007 | Robbin et al. | ............. | 84/477 R |
| 7,174,312 B2 * | 2/2007 | Harper et al. | ................... | 705/35 |
| 7,395,048 B2 * | 7/2008 | Kotzin | .......................... | 455/406 |

(Continued)

FOREIGN PATENT DOCUMENTS

JP 6-076545 A 3/1994

(Continued)

OTHER PUBLICATIONS iPod mini, Mac Fan, Japan, Mainichi Communications Co., Ltd., Mar. 1, 2004, vol. 12. No. 3, p. 32-34. (see attached office action for English description).

*Primary Examiner* — Fred I Ehichioya
*Assistant Examiner* — Michelle Owyang
(74) *Attorney, Agent, or Firm* — Lerner, David, Littenberg, Krumholz & Mentlik, LLP

(57) ABSTRACT

Apparatus in which, with respect to a vague search request, content, such as a musical piece matching a user's mood at that time, can easily be searched for with a simple operation. A content providing apparatus includes a content storage section in which a plurality of pieces of content are grouped and stored. In a state in which content read from the content storage section is provided to the user, when a user input detection device detects a specific input by the user, desired content other than the provided content among the content belonging to the same group as the content being provided belongs or the content belonging to a group differing from the group to which the content being provided belongs is selected from a plurality of pieces of content stored in the content storage section, and the content is provided to the user.

24 Claims, 32 Drawing Sheets

U.S. PATENT DOCUMENTS

| | | | |
|---|---|---|---|
| 7,424,677 B2 * | 9/2008 | Sezan et al. | 715/719 |
| 2002/0018074 A1 | 2/2002 | Buil et al. | |
| 2002/0073108 A1 * | 6/2002 | Morita et al. | 707/201 |
| 2003/0033420 A1 * | 2/2003 | Eyal et al. | 709/231 |
| 2003/0095096 A1 * | 5/2003 | Robbin et al. | 345/156 |
| 2003/0163486 A1 * | 8/2003 | Van Der Meulen | 707/104.1 |
| 2004/0032680 A1 * | 2/2004 | Fujiwara | 360/15 |
| 2004/0055448 A1 * | 3/2004 | Byon | 84/626 |
| 2004/0128286 A1 * | 7/2004 | Yasushi et al. | 707/3 |
| 2004/0255761 A1 * | 12/2004 | Yamane et al. | 84/615 |
| 2004/0260730 A1 * | 12/2004 | Iwama | 707/104.1 |
| 2005/0240494 A1 * | 10/2005 | Cue et al. | 705/27 |

FOREIGN PATENT DOCUMENTS

| | | |
|---|---|---|
| JP | 2000-331422 A | 11/2000 |
| JP | 2001-209586 A | 8/2001 |
| JP | 2002-116933 A | 4/2002 |
| JP | 2004-505367 A | 2/2004 |
| JP | 2004039113 A | 2/2004 |

* cited by examiner

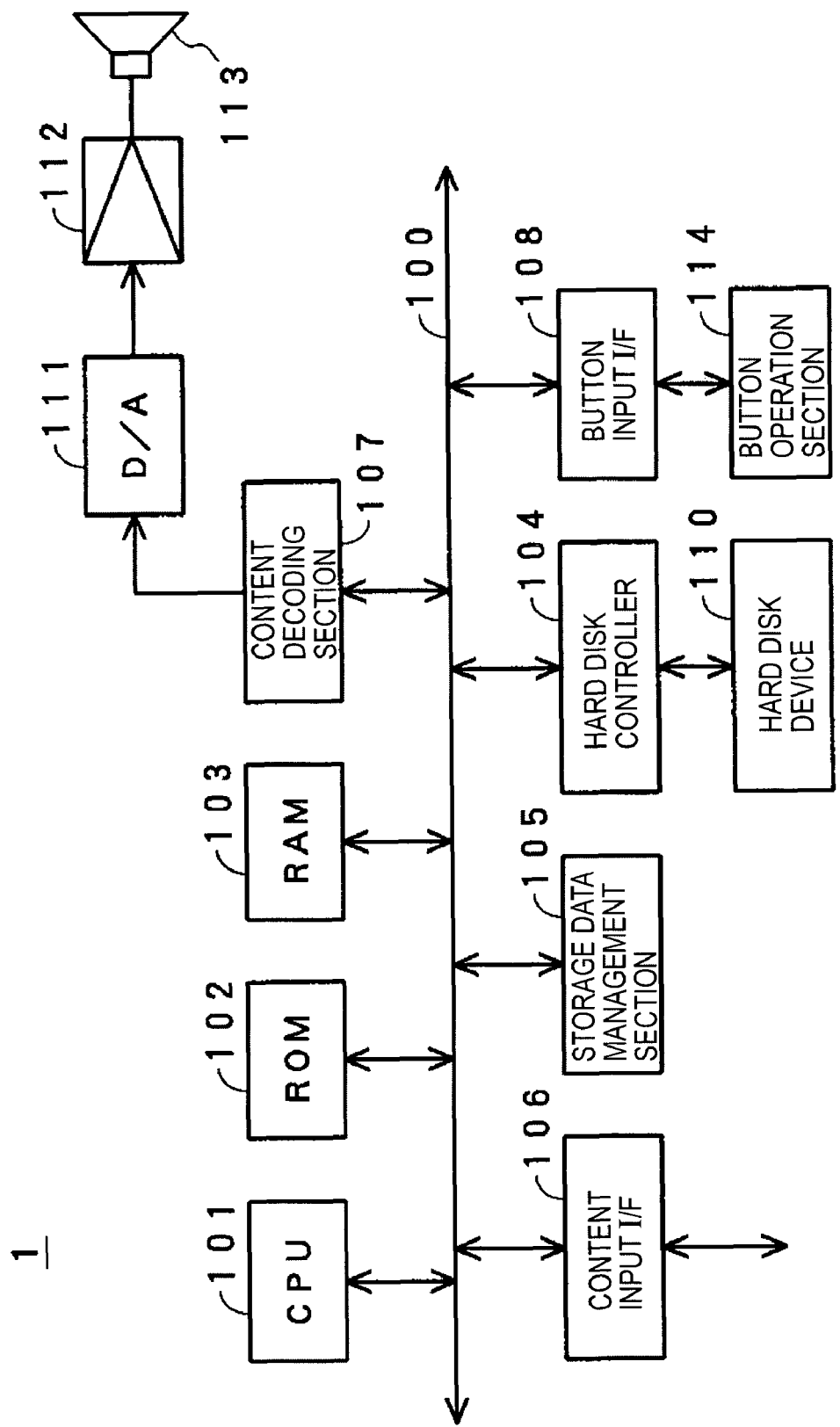

FIG. 3

| | | |
|---|---|---|
| | MUSICAL PIECE 11 | ADDRESS |
| | MUSICAL PIECE 12 | ADDRESS |
| GENRE 1 | MUSICAL PIECE 13 | ADDRESS |
| | ⋮ | |
| | MUSICAL PIECE 21 | ADDRESS |
| | MUSICAL PIECE 22 | ADDRESS |
| GENRE 2 | MUSICAL PIECE 23 | ADDRESS |
| | ⋮ | |
| | MUSICAL PIECE 31 | ADDRESS |
| | MUSICAL PIECE 32 | ADDRESS |
| GENRE 3 | MUSICAL PIECE 33 | ADDRESS |
| | ⋮ | |
| | | |

FIG. 25
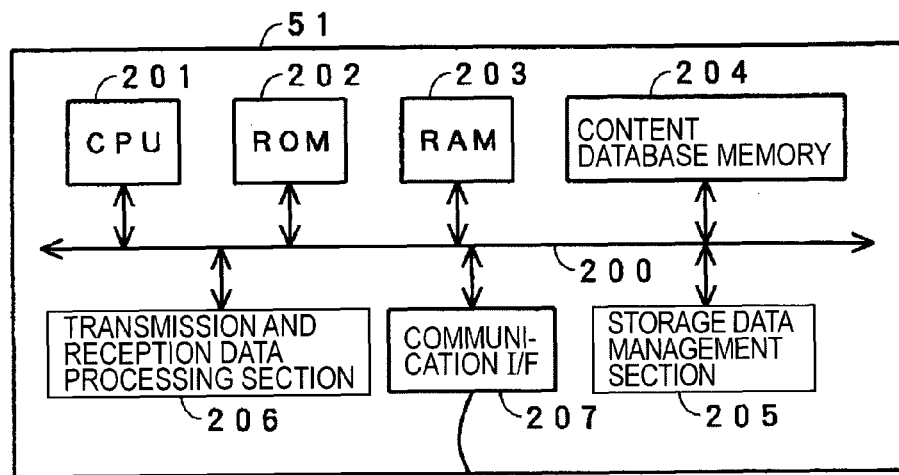
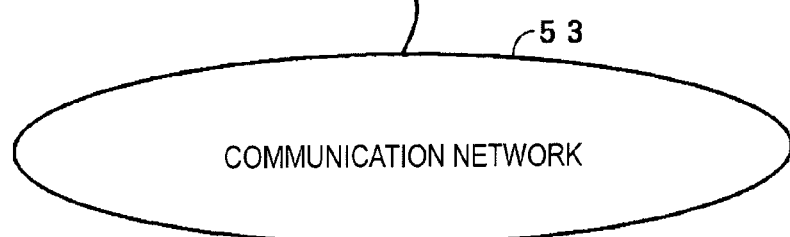
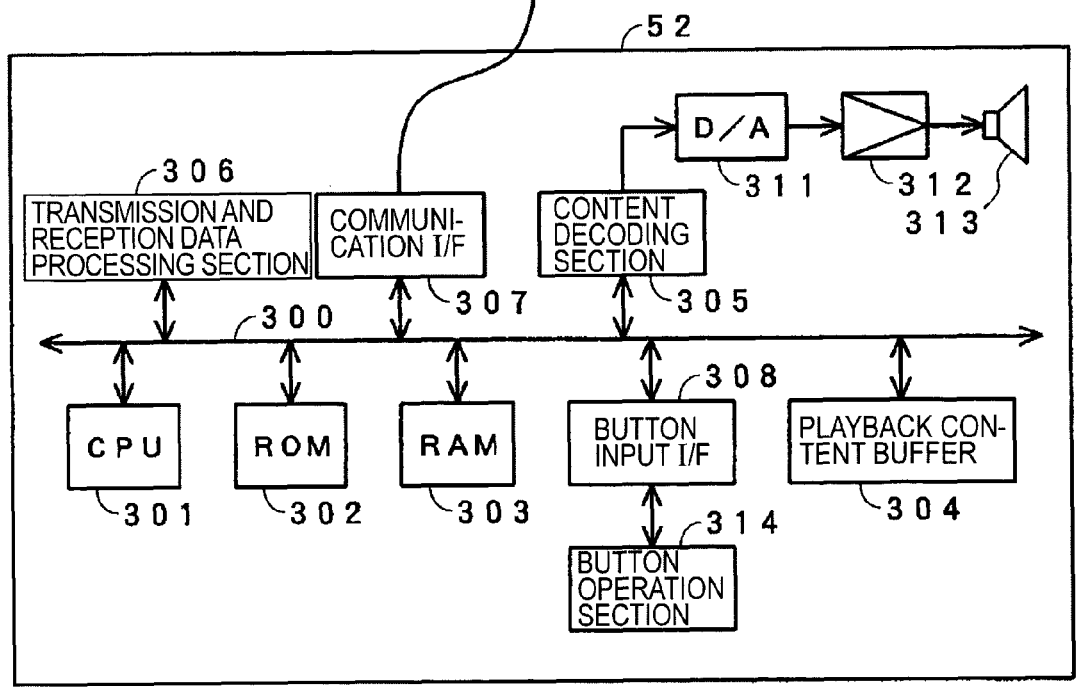

CONTENT PROVIDING APPARATUS, CONTENT PROVIDING SYSTEM, WEB SITE CHANGING APPARATUS, WEB SITE CHANGING SYSTEM, CONTENT PROVIDING METHOD, AND WEB SITE CHANGING METHOD

BACKGROUND OF THE INVENTION

1. Field of the Invention

The present invention relates to an apparatus, a system, and a method that are suitable for use when a user searches for desired content that seems to be desirable at that time, though there is no specific target content, from a large-capacity storage device in which, for example, a large amount of musical piece content, a large amount of movie content, a large amount of electronic-book content, etc., are stored.

2. Description of the Related Art

In this specification, the term "content" is information represented by signals of, for example, music, video, electronic books (text information, such as research papers, novels, and magazines, and still-image information), guide information, Web pages, and programs (including game programs).

When a recording medium, such as an optical disc, in which content of a plurality of musical pieces are contained, is loaded into a playback device and is played back, usually, a user of the playback device selects a musical piece desired to be played back. Hitherto, when the selection and the playback of the musical piece are performed, related attribute information, such as musical piece titles and artist names, is displayed, and a musical piece is selected while viewing the display so as to instruct the playback thereof.

As the storage capacity of recording media has increased, it has become possible to store several thousands or several tens of thousands of pieces of musical content in one recording medium. Accordingly, there has been a demand for searching a recording medium in which a large amount of musical piece content is stored in this manner for desired musical piece content.

As an example of this searching method, when the related attribute information of musical piece content is displayed as described above and the displayed information is used for searching, a hierarchical structure has come to be used to store desired musical piece content.

FIG. 32 shows an example of such a hierarchical structure. In this example, search items are set as a first layer. As the search items, in the example of FIG. 32, five items are given: "artist", "album", "musical piece", "genre", and "composer". Examples of "artist" are performers, singers, and conductors. "Album" is a group of a plurality of musical pieces contained in one CD (Compact Disc), and the groups of musical pieces are divided by album titles. "Genre" is divided according to the type, such as classical, jazz, pop, Latin, and new music.

The hierarchical structure is divided into a plurality of layers for each search item. For example, in the case of "genre", the highest layer is a layer that is divided into groups for each type of a plurality of genres described above. Then, below that layer, layers of the items of "artist", "album", and "musical piece" are arranged in sequence. The "artist" layer is a layer that is divided into groups for each artist, and the "album" layer is a layer that is divided into groups for each album. The musical pieces of the lowest layer are formed of individual musical pieces, and groups of a plurality of musical pieces are arranged under the layer above the lowest layer.

As shown in FIG. 32, below the "artist" layer, "albums" and "musical pieces" are arranged in sequence. Below "album" layer, the "musical piece" layer is arranged. Below the "composer" layer, "albums" and "musical pieces" are arranged in sequence.

As another classification (grouping) method, grouping may be performed according to "'60s music", "top 25", "top rated", and "recently played-back music", and directly below that group, a group of musical pieces belonging to each group may be arranged.

When classification (grouping) is performed in the above hierarchical structure, when a layer is selected, a list of a plurality of groups contained in the associated layer is displayed as attribute information. The user is able to select a desired group from the list. When the user selects a predetermined group, the display is changed to display a list of groups of the layer below that predetermined group. When the layer of the group of musical pieces of the lowest layer is reached, the related attribute information of each piece of the musical content is displayed, and the user selects a desired musical piece by referring to the information.

For this reason, in order to reach a desired musical piece, it is necessary to frequently go back and forth through the hierarchical structure or scrolling of the list has to be frequently and repeatedly performed. As a result, as the capacity of recording media becomes even larger, the searching operation burden on the user just keeps on increasing.

Attempts have been made to reduce the searching operation burden on the user by introducing a function for searching for a musical piece using a searching function disclosed in, for example, International Publication No. WO 02/48917 A1. However, it cannot be said that this is easy to use in terms of the method of inputting search information.

SUMMARY OF THE INVENTION

When one music is selected from among a large number of musical piece content, is played back, and is listened to, there are cases in which the user does not particularly specifically have a desire to listen to a specific musical piece content, but wants to listen to a musical piece matching his or her mood at that time. That is, there are cases in which a searching demand occurs, such as "anything is OK, but I don't like this, and this musical piece is nice".

In such a case, the user feels uncomfortable selecting, from a list display, musical pieces classified by the hierarchical structure as described above. The reason for this is that the above-described method is effective when the specific musical piece desired to be listened to is known, and is not suitable for a vague search in which the user does not know a specific musical piece but wants to listen to some appropriate musical piece.

The request for the above-described searching sometimes occurs similarly not only in the case where the content is a musical piece, but also in the case of other content, such as movies, electronic books, and game programs.

It is an object of the present invention to provide an apparatus by which a user is able to easily search for content, such as a musical piece matching his or her mood at that time, by a simple operation, and a method for use with the apparatus.

To achieve the above-mentioned object, in one aspect, the present invention provides a content providing apparatus including: a content storage section in which a plurality of pieces of content are divided into a plurality of groups and are stored; input detection means for detecting a first specific input; and provided-content changing means for selecting, from the plurality of pieces of content stored in the content storage section, desired content belonging to a group differing from a group to which the content being provided belongs and for providing the desired content to a user when the first specific input is detected by the input detection means in a state in which one of the pieces of content is provided to the user.

According to an embodiment of the present invention, using as an example a case in which content is a musical piece, a user who is tired of a particular musical piece listened to up to that point but wants to maintain the same atmosphere performs a specific input, such as depressing a button or speaking a specific word in order to input the word via a microphone. Then, the provided-content changing means provides, to the user, musical piece content selected in a desired manner from among the musical pieces belonging to the same group, such as the same genre and artist as those listened to up to that point.

If the user does not like the provided musical piece, the user performs the specific input again. Then, the provided-content changing means selects a different desired musical piece from among the musical pieces belonging to the same group and provides the desired musical piece to the user.

In this manner, by performing a specific input once or a plurality of times repeatedly, the user can simply and easily receive the provision of content appropriate for his or her mood at that time.

That is, by performing a simple input, such as a simple button operation, content such as a recommended musical piece is provided from the content providing apparatus. Thus, there is an advantage for the user in that the searching operation burden is lessened. Moreover, if the user does not like the content presented (provided) as the recommended one, the user needs only to repeat the same input operation, and in this respect, also, the burden of the searching input of the user operation is lessened.

BRIEF DESCRIPTION OF THE DRAWINGS

FIG. 1 is a block diagram showing an example of the configuration of a first embodiment of a content providing apparatus according to the present invention;

FIG. 3 shows an example of grouping of content in the content providing apparatus according to the first embodiment of the present invention;

FIG. 25 is a block diagram showing an example of the configuration of a content providing system according to a fifth embodiment of the present invention;

DESCRIPTION OF THE PREFERRED EMBODIMENTS

Figure 2A:
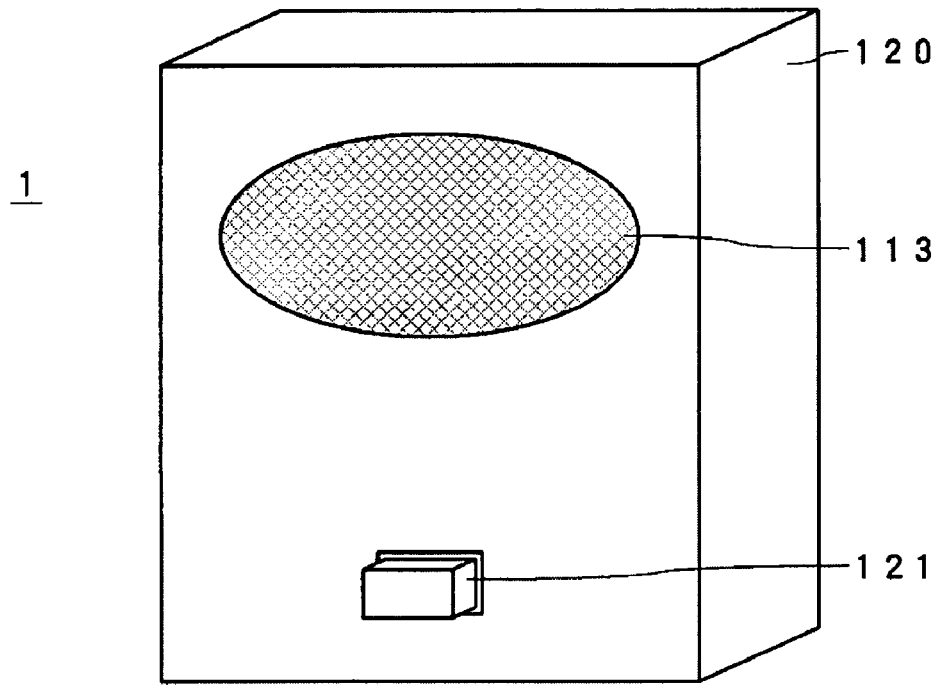
FIGS. 2A and 2B show an example of the exterior configuration of the content providing apparatus according to the first embodiment of the present invention.

A description will now be given below of embodiments of a content providing apparatus, a content providing system, a Web site changing apparatus, and a Web site changing system according to the present invention with reference to the drawings.

First Embodiment

FIG. 1 is a block diagram of a first embodiment of a content providing apparatus according to the present invention. FIG. 2 shows an example of the exterior of a housing of the content providing apparatus according to the first embodiment. A content providing apparatus 1 of the first embodiment is an example of an apparatus for playing back content of a musical piece stored in a storage device and for playing it back from a speaker. In the example of FIG. 1, as the storage device, a hard disk device 110 is used.

As shown in FIG. 1, the content providing apparatus 1 of the first embodiment includes a microcomputer. A CPU (Central Processing Unit) 101, a ROM (Read Only Memory) 102 in which programs are stored, a RAM (Random Access Memory) 103 for a work area, a hard disk controller 104, a storage data management section 105, a content input interface 106, a content decoding section 107, and a operation button input interface 108 are connected to a system bus 100.

The hard disk controller 104 is used to connect the hard disk device 110 to the system bus 100. The hard disk controller 104 functions to send writing data sent via the system bus 100 to the hard disk device 110 and functions to send data read from a hard disk device to the system bus 100.

The content input interface 106 is formed of, for example, a USB (Universal Serial Bus) interface and is connected to a personal computer, etc., via a connection cable. A button operation section 114 is connected to the button input interface 108.

A D-A (Digital-to-Analog) conversion circuit 111 is connected to the content decoding section 107. The output end of the D-A conversion circuit 111 is connected to a speaker 113 via an amplifier 112.

FIG. 2A shows the exterior of the content providing apparatus 1 of this embodiment. The speaker 113 is mounted on a box-shaped housing 120, and one operation button 121 is provided as an operation button forming the button operation section 114 in this embodiment. The operation button 121 is formed of a non-locking pressing button.

For the hard disk device 110, a large-capacity hard disk device having, for example, 100 GB is used. In this example, in the hard disk device 110, a large number of pieces of content (content of musical pieces) are already written when a user purchased the content providing apparatus 1.

In the case of this embodiment, a large number of those pieces of content are grouped according to the related attributes of the content (here, the related attributes are attributes that are extracted and obtained from the content data, such as the tempo of the content of the musical piece, but are attributes that are accompanied to the associated content, such as the genre of each musical piece, the artist of each musical piece, an album in which each musical piece is recorded, the composer of each musical piece, 60's music, top 25, etc.).

In the first embodiment, the genre is adopted as the related attribute of content for grouping, and the content is grouped into a plurality of groups according to genre. Then, management table information for indicating which genre of group the content of each musical piece belongs to is stored in the hard disk device 110. The content providing apparatus 1 manages the content that is read from the hard disk device 110 and played back in accordance with the management table information.

FIG. 3 shows an example of the table information. In FIG. 3, genres 1, 2, 3 . . . are, for example, pop, classical, jazz, Latin, etc. As a plurality of musical pieces 11, 12, 13 . . . , musical pieces 21, 22, 23 . . . , and musical pieces 31, 32, 33 . . . belonging to each group of the genres 1, 2, 3 . . . , information for identifying musical pieces is described. As the information for identifying the musical piece, for example, a content ID is used.

In the example of FIG. 3, address information in the hard disk device is stored in such a manner as to correspond to the information for identifying each musical piece.

In this embodiment, in the hard disk device 110, in addition to the content that is prestored as described above, content can be added later. For this purpose, the CPU 101 is configured to be able to perform processing for writing into the hard disk device 114 and processing for reading from the hard disk device in accordance with a program stored in the ROM 102 while using the RAM 103 as a work area.

In this embodiment, the writing of content data into the hard disk device 110 is performed in accordance with instructions to the personal computer connected to the content providing apparatus 1. That is, the content data sent from the personal computer is input to the content providing apparatus 1 via the content input interface 106.

In this example, since content of musical pieces is handled, the content data sent from the personal computer is audio data. In this example, not only audio data, but also additional information, such as the title of the musical piece, the genre to which the associated musical piece belongs, the artist, and the album, are sent from the personal computer.

The content data containing the additional information, which is input via the content input interface 106, is written into the hard disk device 110 under the control of the CPU 101. At this time, the additional information and the information of the writing address in the hard disk device is sent to the storage data management section 105. In the storage data management section 105, by using the information of the genre as the additional information, a determination is made as to which genre (group) the data belongs to. Based on the determination result, the management information of the added content is added to the management table information shown in FIG. 3.

Then, in this embodiment, the depressing operation of the operation button 121 is made to have the meaning "the current state is not a state desired by the user". Therefore, since the depressing operation of the operation button 121, which is performed in a state in which the content providing apparatus 1 is switched off, means the desire to change to a state in which the power supply is not switched off, the CPU 101 of the content providing apparatus 1 performs control so that the power supply is switched on.

Furthermore, the depressing operation of the operation button 121, which is performed when content of a particular musical piece is read from the hard disk device 110 and is played back from a speaker 113, means that "the musical piece that is currently being played back is different from the musical piece desired to listen to". Therefore, in this embodiment, the CPU 101 of the content providing apparatus 1 provides the content of a musical piece differing from the musical piece currently being played back.

That is, the depressing operation of the operation button 121 at this time is an operation based on the mood of the user who wants to request musical piece content other than the musical piece content currently being played back because the musical piece content currently being played back is not a musical piece desired to listen to though the user does not have the content of a specific target musical piece.

Here, when the mood of the user when the user vaguely requests a musical piece different from the musical piece currently being played back in this manner is considered, there is a case in which the user wants to listen to another musical piece continuously with the same mood, and there is a case in which the user wants to listen to a musical piece by which the user has another mood. In the former case, when the depressing operation of the operation button 121 is performed, the content of a desired musical piece in the same genre (group) as that of the content currently being played back should be played back. In contrast, in the latter case, when the depressing operation of the operation button 121 is performed, the content of a desired musical piece in the genre (group) different from that of the content currently being played back should be played back.

The content providing apparatus can also be configured by assuming one of the cases. However, in the content providing apparatus of this embodiment, by defining a depressing operation of a different mode as the depressing operation of the operation button 121, it is possible to cope with both of the above-described two cases.

That is, in the first embodiment, the operation of depressing the operation button 121 once in the normal mode is assumed as an operation when it is desired to listen to another musical piece continuously with the same mood, and the operation of depressing the operation button 121 two times continuously is assumed as an operation when it is desired to listen to a musical piece by which the user changes to another mood.

Figure 4:
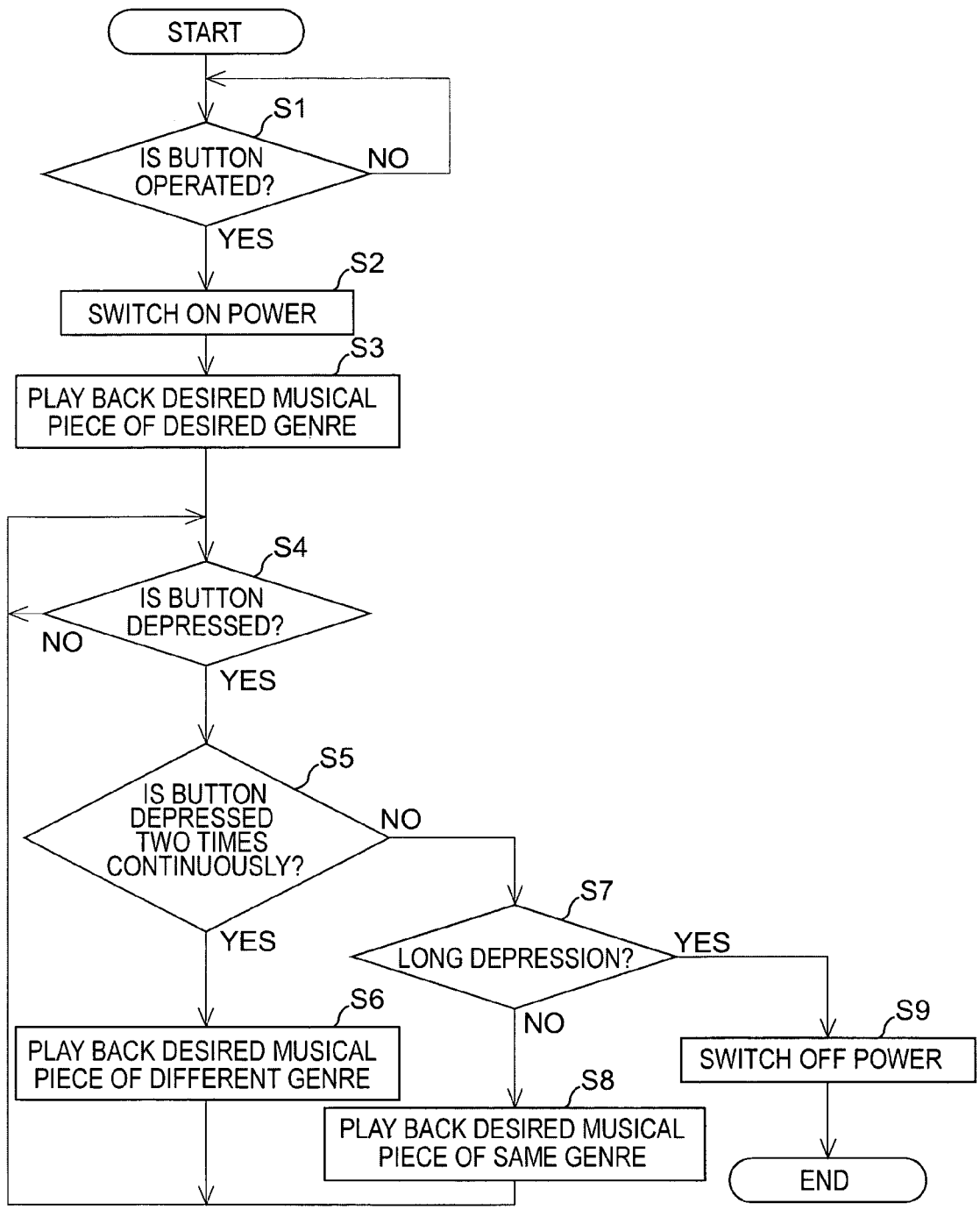
FIG. 4 is a flowchart illustrating the processing operation in the content providing apparatus according to the first embodiment of the present invention.

FIG. 4 is a flowchart illustrating the processing operation of the content providing apparatus 1 on the basis of the operation of the operation button 121. In the example of FIG. 4, in addition to the above-described operation mode with respect to the operation button 121, the operation mode of a long depressing longer than or equal to a predetermined time, for example, three seconds, is defined as the operation for shifting to a mode differing from the switched-off state, that is, a switched-on state.

In the content providing apparatus 1 of this embodiment, even in the switched-off state, parts including the CPU 101 for detecting that the operation button 121 is operated are powered on, so that whether or not the operation button 121 is operated by the user is always monitored (step S1).

Then, in the operation of monitoring the operation of the operation button 121 in the switched-off state in step S1, when it is determined that the operation button 121 is depressed, because it is an operation from the switched-off state, the CPU 101 performs control so that power is supplied to the entire content providing apparatus 1 (step S2). The depressing operation mode of the operation button 121 at this time, which means switching on the power supply, may be any depressing operation mode.

Then, when the power supply is switched on, the CPU 101 reads content data of a desired musical piece from the hard disk device 110 and transfers the content data to the content decoding section 107. Then, in the content decoding section 107, the received content data is decoded, and a digital audio signal, which is the decoded result, is sent to a D-A conversion circuit 111. In the D-A conversion circuit 111, the digital audio signal is converted into an analog audio signal, and the analog audio signal is supplied to the speaker 113 via the amplifier 112, and sound is played back (step S3).

When the user does not like the played-back musical piece, the user operates the operation button 121 to request the playback of another musical piece. As described above, there are two operation modes of the operation button 121 at that time. When it is desired to maintain the same atmosphere as that of the content currently being played back, the operation is performed once shortly as in the normal case, and when it is desired to change the atmosphere to an atmosphere differing from that of the content currently being played back, the depressing operation is performed two times continuously.

Accordingly, the CPU 101 determines whether or not the operation button 121 is depressed (step S4). When it is determined that the operation button 121 is depressed, a determination is made as to whether or not it is a depressing operation performed two times continuously (step S5).

When it is determined in step S5 that it is a two-time continuous depressing operation, the CPU 101 reads, from the hard disk device 110, desired musical piece content different from the musical piece content currently being played back from the genre (group) different from that of the musical piece content currently being played back, transfers the desired musical piece content to the content decoding section 107, and plays back sound from the speaker 113 (step S6). Thereafter, the process returns to step S4, whereby another depressing operation of the operation button 121 is monitored.

When it is determined in step S5 that the operation is not a two-time continuous depressing operation, the CPU 101 determines whether or not the depressing operation of the operation button 121 is a long depression (step S7). When it is determined that the depressing operation is a long depression, the content providing apparatus 1 is switched off (step S9), and the processing routine is completed.

When it is determined in step S7 that the depressing operation is not a long depression, the CPU 101 determines that the operation is a normal one depressing operation, reads, from the hard disk device 110, desired musical piece content different from the musical piece content currently being played back from the same genre as that of the musical piece content currently being played back, transfers the desired musical piece content to the content decoding section 107, and plays sound back from the speaker 113 as described above (step S8). Thereafter, the process returns to step S4, whereby another depressing operation of the operation button 121 is monitored.

For the method of selecting desired content in steps S6 and S8, a method of randomly selecting, for example, an address for each group of the hard disk device 110 shown in FIG. 3 by using a random number can be used. Furthermore, a sequence in which content is provided randomly in accordance with a predetermined rule may also be determined. Furthermore, the provision sequence may be determined in advance in such a way that, for example, content with a short musical piece and content with a long musical piece are in an appropriate allocation. Also, the provision sequence may be determined in advance in such a way that, for example, musical pieces at a fast tempo and at a slow tempo are in an appropriate allocation. This applies the same for the method of selecting a desired group and desired content in the following several embodiments.

Furthermore, by referring to the genre based on the operation of the operation button 121, the content selection history, and the content playback history, a genre and content to be provided next can also be selected.

In the manner described above, according to the first embodiment, when the user wants to listen to a musical piece matching the current mood though the user does not particularly have a specific musical piece as a musical piece to be listened to, the target musical piece can be comparatively easily searched for by merely operating only the operation button 121.

[Modification of the First Embodiment]

If the user has already determined a specific musical piece desired to be listened to, there is a risk in that it takes a long time to arrive at the desired musical piece with only the operation of the operation button 121. In order to avoid this problem, the content providing apparatus 1 should include means by which the user can directly specify and select the content of the musical piece in addition to the operation button 121.

Accordingly, in this example, as means for the user to directly specify and select the content of the musical piece, the content providing apparatus 1 uses a display section and operation means for performing a selection input via the screen of the display section.

Figure 2B:
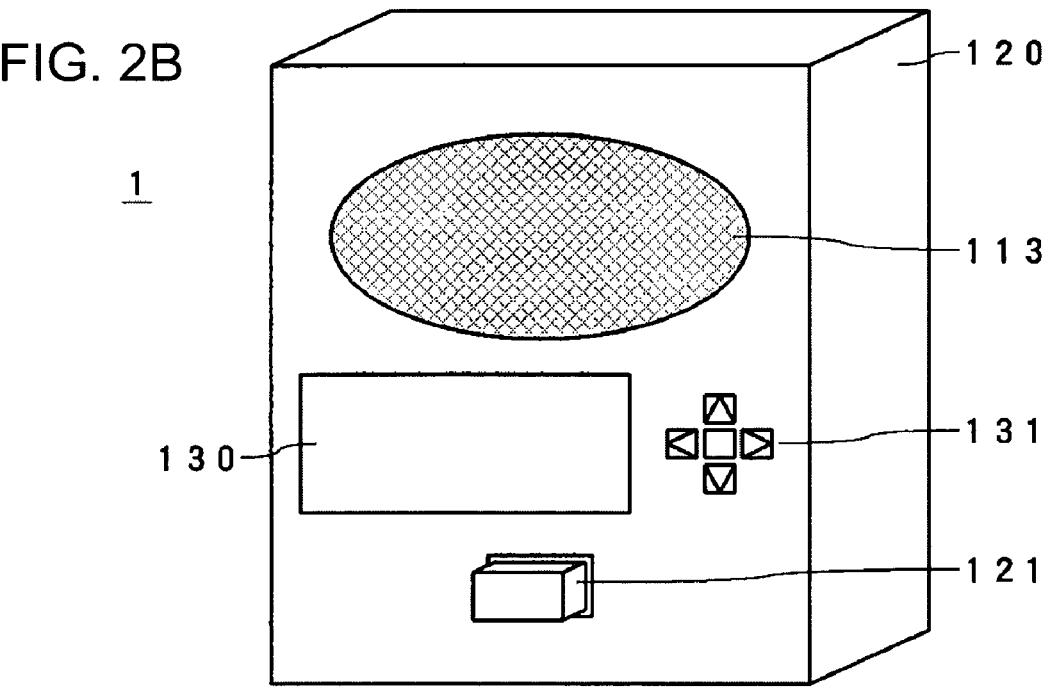

FIG. 2B shows an example of the exterior of the content providing apparatus 1 in that case. That is, the content providing apparatus 1 includes a display section 130 formed of, for example, an LCD (Liquid-Crystal Display), and a cross-type operation button 131 for moving a selection cursor displayed on the display section 130 vertically and horizontally and for performing a determination operation. In FIG. 2B, the central button to which no arrow is attached among the operation buttons 131 is a determination button.

Figure 32:
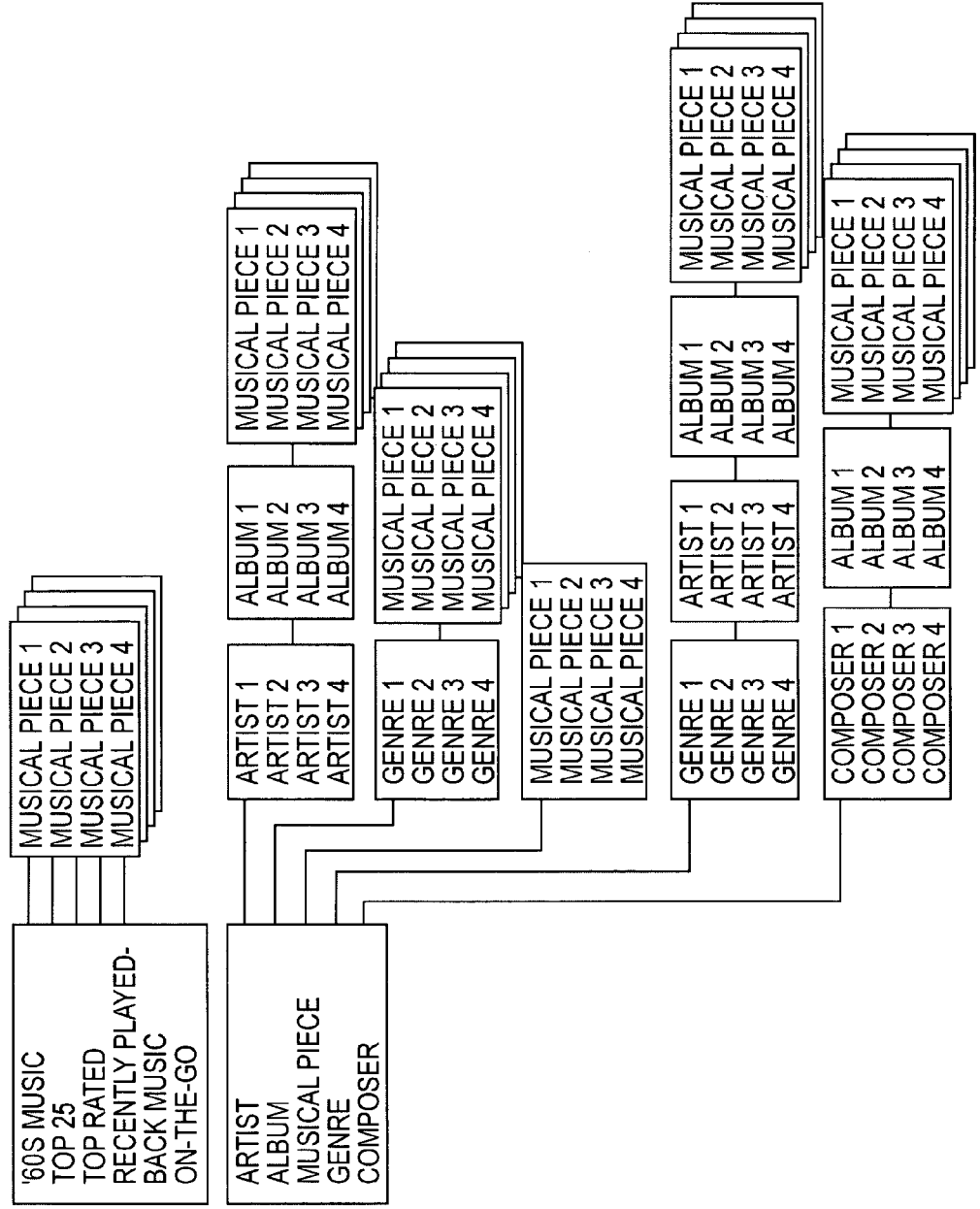
FIG. 32 shows an example of a hierarchical group of musical piece content.

In the case of this example, for the content stored in the hard disk device 110, a large amount of content, which is described with reference to FIG. 32 at the beginning of the specification, is grouped in advance by using not only a genre, but also related attribute information such as an artist, an album, and a composer. The CPU 101 displays a content group for each hierarchy on the display section 130. The user selects and determines the group desired by the user himself/herself from among the groups for each hierarchy displayed on the screen of the display 130 by using the cross-type operation button 131. When a specific group is selected and determined in the associated hierarchy, the CPU 101 allows a group selection screen of a hierarchy below that to be displayed in order to prompt a selection in the associated hierarchy.

Then, the CPU 101 displays the content name of the musical piece, etc., at the lowest hierarchy. When the selection and determination of the content via the cross-type operation button 131 is received at the screen of the lowest hierarchy, the selected and determined content is read from the hard disk device 110 and is played back.

When the operation button 121 is operated while the content of the selected and determined musical piece is being played back or after it is played back in the manner described above, the above-described processing operation of FIG. 4 is performed on the basis of the genre to which the selected and determined content belongs.

In the foregoing description, the grouping of the content is performed by the genre, and content whose genre is different is selected and played back by the two-time continuous depressing operation of the operation button 121. Alternatively, the content may be grouped by using another related attribute, such as the artist, the album, and the composer, and as a result of a two-time continuous depressing operation of the operation button 121, the related attributes of those groups, that is, content whose artist, album, and composer differs may be selected and played back.

In the above-described embodiment, although a depressing operation of the operation button is used as an input meaning "the current state differs from the state desired by the user", the above input is not restricted to the depressing operation of the operation button. For example, the system may also be configured in such a way that a microphone is provided in the content providing apparatus, and a specific sound input to the microphone, for example, uttering the word "different", is processed as the above input. In this case, two consecutive utterances of the same word, for example, "different, different", can be assigned to the two continuous depressions of the operation button in the above-described embodiment, and a long utterance such as "dif--fer--ent" can be assigned to the long depression of the operation button.

Furthermore, the operation of clapping the hands rather than the utterance by human speech can also be used as an input meaning "the current state is not the state desired by the user". In this case, for example, the time when the number of times the hands are clapped is once can be made to correspond to the normal one depressing operation of the operation button; the time when the number of times the hands are clapped is two times can be made to correspond to the two-time continuous depressing operation of the operation button; and the time when the number of times the hands are clapped is three can be made to correspond to an operation from the switched-on state to the switched-off state.

Furthermore, all the content that is grouped by using the genre, the artist, and the album as a rule may be provided in advance. Also, with respect to the operation button 121, an operation differing from that described above, for example, a three-time continuous operation, may be defined in advance, and based on the different operation of the operation button 121, grouping of which one of the rules should be selected may be switched and selected as desired.

Second Embodiment

The configuration of the block diagram of the second embodiment is identical to that shown in FIG. 1. As an input meaning "the current state is not a state desired by the user", an example in which an operation button is used, and grouping is performed according to the genre is shown.

Figure 5A:
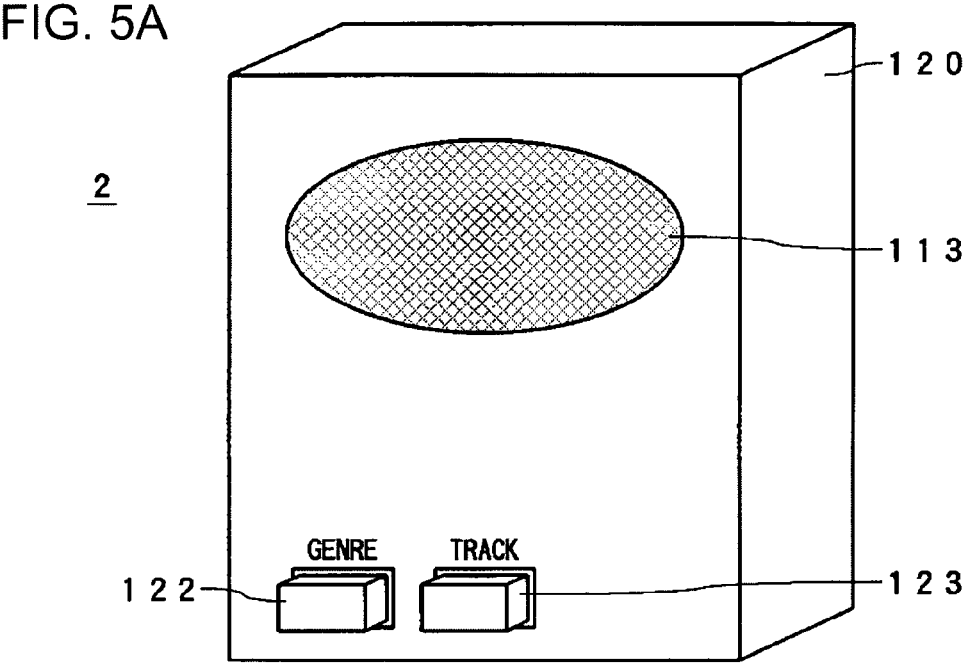
FIGS. 5A and 5B show an example of the exterior configuration of a content providing apparatus according to a second embodiment of the present invention.

However, in a content providing apparatus 2 of the second embodiment, as operation buttons, an operation button for changing a group, and an operation button for changing content in the group are used. That is, as shown in FIG. 5A, a genre button 122 for changing a genre (for changing a group), and a track button 123 for changing a musical piece (for changing content in the group) are used.

In this embodiment, the one depressing operation of the normal length of the genre button 122 is an input meaning "the genre of the content of the musical piece content currently being played back is not a genre desired by the user", and the depressing operation of a long depression longer than or equal to, for example, three seconds, is defined as a request for changing from the switched-on state to the switched-off state.

Furthermore, in this embodiment, the one depressing operation of the normal length of the track button 123 is an input meaning "the genre of the content of the musical piece currently being played back is the same and good, but differs from the content of the musical piece desired by the user". Furthermore, the long depressing operation of longer than or equal to, for example, three seconds, of the track button 123 is an input of the same meaning as that of the one depressing operation of the normal length of the track button 123. However, the processing in the content providing apparatus 2 with respect to the above differs from the depressing operation of the normal length.

That is, in the content providing apparatus 2 of the second embodiment, when the track button 123 is depressed for a long time, some of a plurality of musical piece content contained in the same genre as the genre of the content of the musical piece currently being played back, for example, only an introduction portion (the introduction portion of the musical piece, this is hereinafter referred to as an "intro") are sequentially played back in a desired sequence, so that a musical piece differing from the content of the musical piece currently being played back is presented to the user.

Then, when the track button 123 is depressed by the user again while the intros are being played back, by determining that it is an operation for requesting the playback of the entire content being played back at the time the depressing operation is performed, the content providing apparatus 2 is placed in a state of playing back the content, the playback of the entirety of which is requested, without playing back the intro of the content of the next musical piece.

Figure 6:
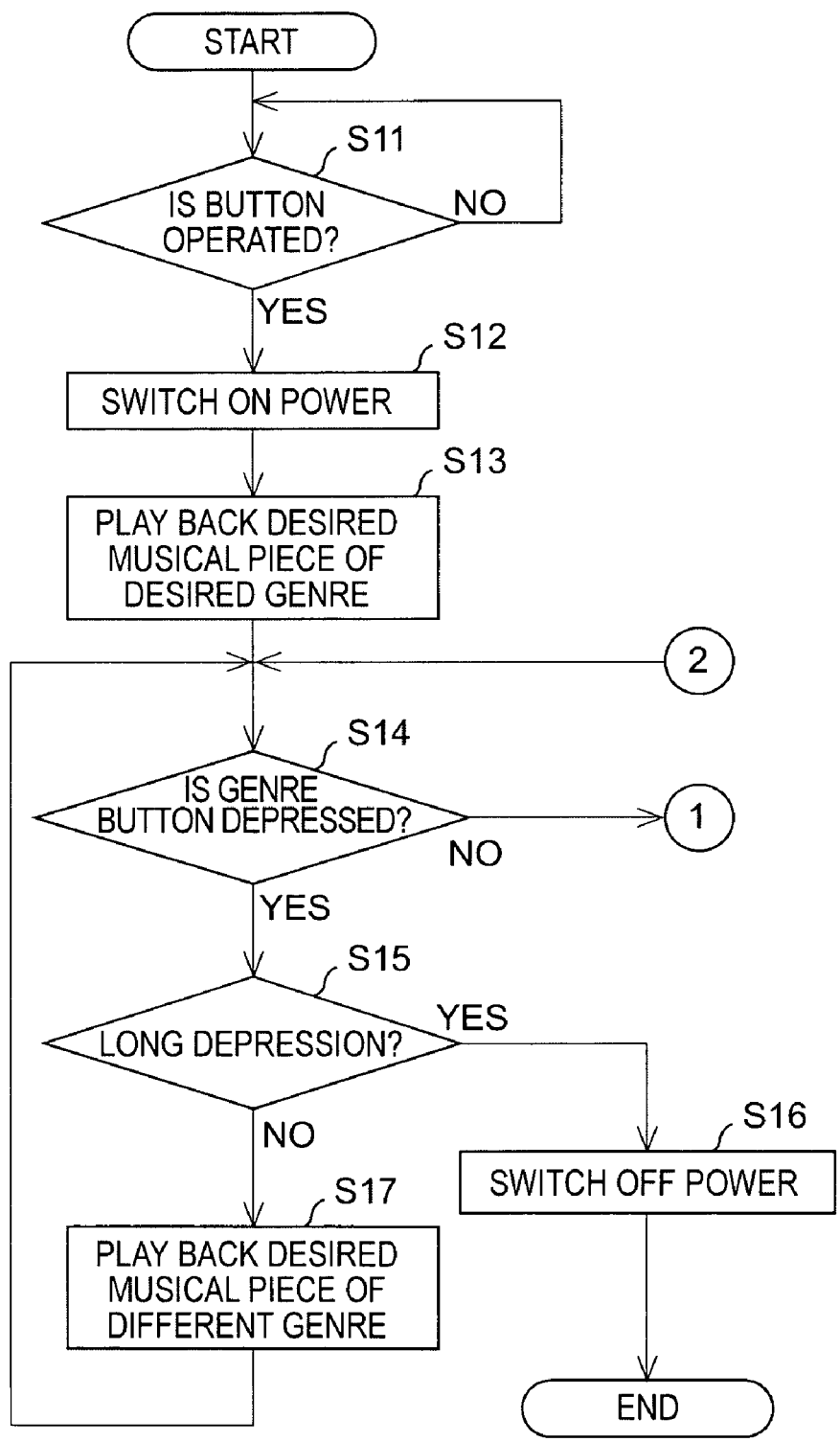
FIG. 6 shows a portion of the flowchart illustrating the processing operation in the content providing apparatus according to the second embodiment of the present invention.
Figure 7:
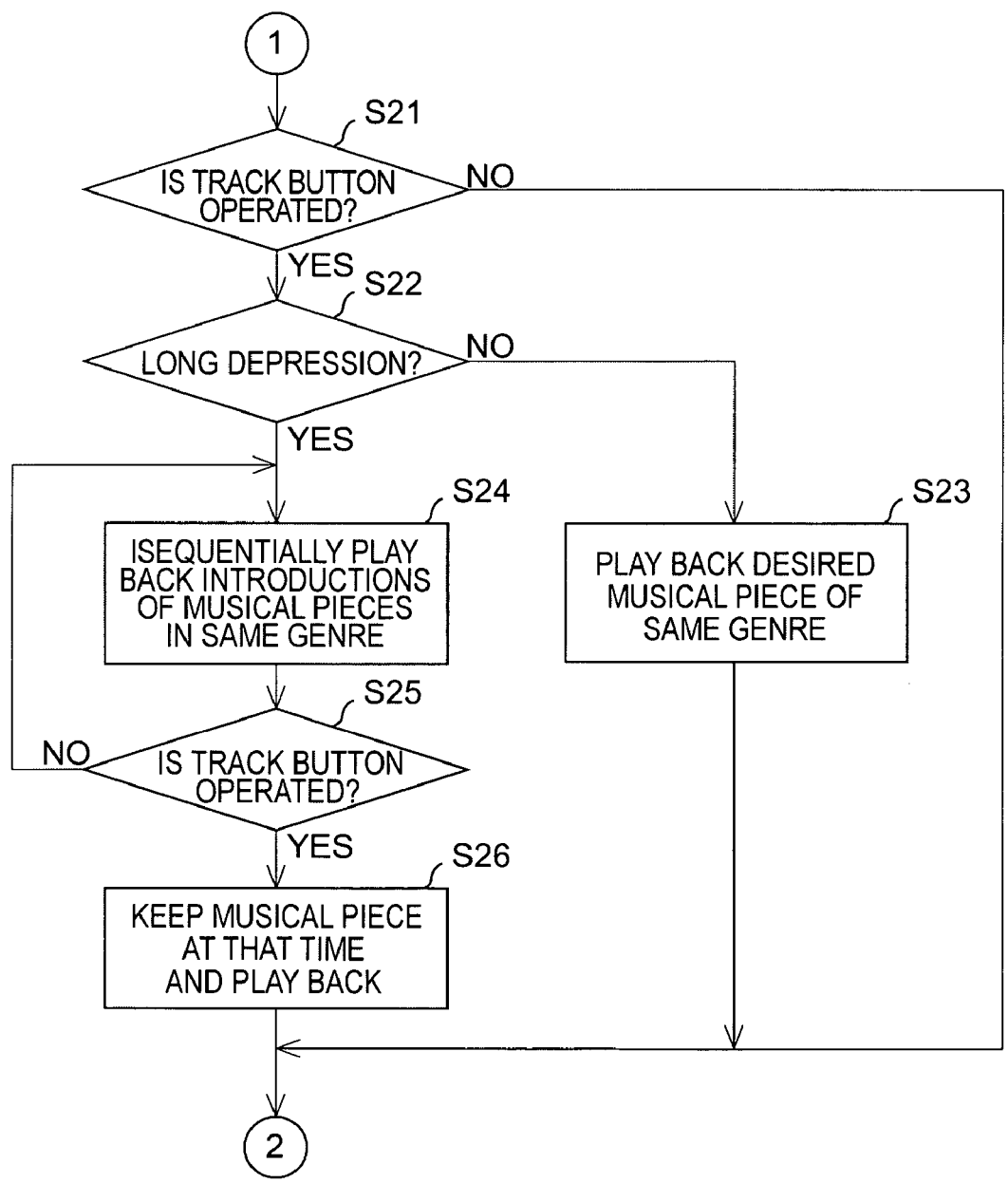
FIG. 7 shows a portion of the flowchart illustrating the processing operation in the content providing apparatus according to the second embodiment of the present invention.

FIGS. 6 and 7 are flowcharts illustrating a processing operation based on the operation of the genre button 122 and the track button 123 in the content providing apparatus of the second embodiment.

In the content providing apparatus 2 of the second embodiment, even in the state in which the power supply is switched off, power is supplied to the parts including the CPU 101 for detecting that the genre button 122 or the track button 123 is operated, so that whether or not the genre button 122 or the track button 123 is operated by the user is always monitored (step S11).

Then, in the operation of monitoring the operation of the genre button 122 and the track button 123 in the switched-off state in step S11, when it is determined that the genre button 122 and/or the track button 123 is operated, since it is an operation from the switched-off state, the CPU 101 performs control so that power is supplied to the entire content providing apparatus 2 (step S12). The operation button to be detected as being depressed in step S11 may be any one of the genre button 122 and the track button 123, and the depressing operation mode may be any depressing operation mode.

Then, when the power supply is switched on, the CPU 101 reads the content data of a desired musical piece from the hard disk device 110 and transfers the content data to the content decoding section 107. Then, in the content decoding section 107, the received content data is decoded, and a digital audio signal, which is the decoded result, is sent to the D-A conversion circuit 111. In the D-A conversion circuit 111, the digital audio signal is converted into an analog audio signal, the analog audio signal is supplied to the speaker 113 via the amplifier 112, and sound is played back (step S13).

When the user does not like the played-back musical piece, the user requests the playback of another musical piece by operating the genre button 122 and the track button 123. As described above, there are two modes of the operation of the genre button 122 and the track button 123 at that time. When the user wants to maintain the same atmosphere as that of the musical piece currently being played back, the user operates the track button 123, and when the user wants to change the atmosphere to another atmosphere different from the musical piece content currently being played back, the user operates the genre button 122.

Therefore, the CPU 101 determines whether or not the genre button 122 is operated (step S14). When it is determined that the genre button 122 is operated, a determination is made as to whether or not it is a long depressing operation (step S15). When the operation is determined in step S15 that the operation is a long depressing operation of the genre button 122, the CPU 101 switches off the power supply (step S16), and this processing routine is completed.

When it is determined in step S15 that the operation is not a long depressing operation of the genre button 122, the CPU 101 reads, from the hard disk device 110, musical piece content different from the musical piece content currently being played back from the genre (group) different from that of the musical piece content currently being played back, and transfers the musical piece content to the content decoding section 107, so that, as described above, sound is played back from the speaker 113 (step S17). Thereafter, the process returns to step S14, whereby the depressing operation of the genre button 122 is monitored.

When it is determined in step S14 that the genre button 122 is not depressed, the CPU 101 determines whether or not the track button 123 is operated (step S21 in FIG. 7). When it is determined that the track button 123 is also not depressed, the process returns to step S14, whereby the depressing operation of the genre button 122 is monitored.

When it is determined in step S21 that the track button 123 is depressed, the CPU 101 determines whether or not the depressing operation is a long depression (step S22). When it is determined that the depressing operation is not a long depression, the CPU 101 determines that the operation of the track button 123 is a normal one depressing operation, reads, from the hard disk device 110, desired musical piece content different from the musical piece content currently being played back from the same genre of that of the musical piece content currently being played back, and transfers the desired musical piece content to the content decoding section 107, so that, as described above, sound is played back from the speaker 113 (step S23). Thereafter, the process returns to step S14, and the depressing operation of the genre button 122 is monitored.

When it is determined in step S22 that the depressing operation of the track button 123 is a long depression, the CPU 101 performs control so that intros of the content of a plurality of musical pieces in the same genre as that of the content currently being played back in a desired sequence of provision (step S24).

Then, the process waits for the track button 123 to be depressed again by the user (step S25), and continues the sequential playback of the intros until another depressing operation occurs. Then, when it is determined in step S25 that there is another depressing operation of the track button 123, the CPU 101 performs control so that the sequential playback of the intros is stopped, the musical piece content whose intro is currently being played back when the depressing operation occurs is kept, and the entire musical piece content is played back (step S26). Thereafter, the process proceeds to step S14, where the depressing operation of the genre button 122 is monitored.

According to the second embodiment, since the user can sequentially listen to the candidate intro of the musical piece to be listened to next without depressing the track button 122 a plurality of times by depressing the track button 122 for a long time, the searching for the musical piece matching the current mood can be easily performed.

Therefore, when the user wants to listen to a musical piece matching the current atmosphere though the user does not particularly have a specific musical piece, it is possible to comparatively easily to search for a target musical piece by only operating the two operation buttons of the genre button and the track button.

[Modification 1 of the Second Embodiment]

In the second embodiment, by enabling only the button for changing the content in the group (for example, the track button) to be depressed for a long time, the intros of a plurality of pieces of content in the same group can be played back. In addition, by depressing for a long time the button for changing the group (for example, the genre button), intros of a plurality of pieces of content of a different group can also be played back. The operation for shifting from the switched-on state to the switched-off state is defined as a simultaneous depressing operation of the genre button 122 and the track button 123.

Figure 8:
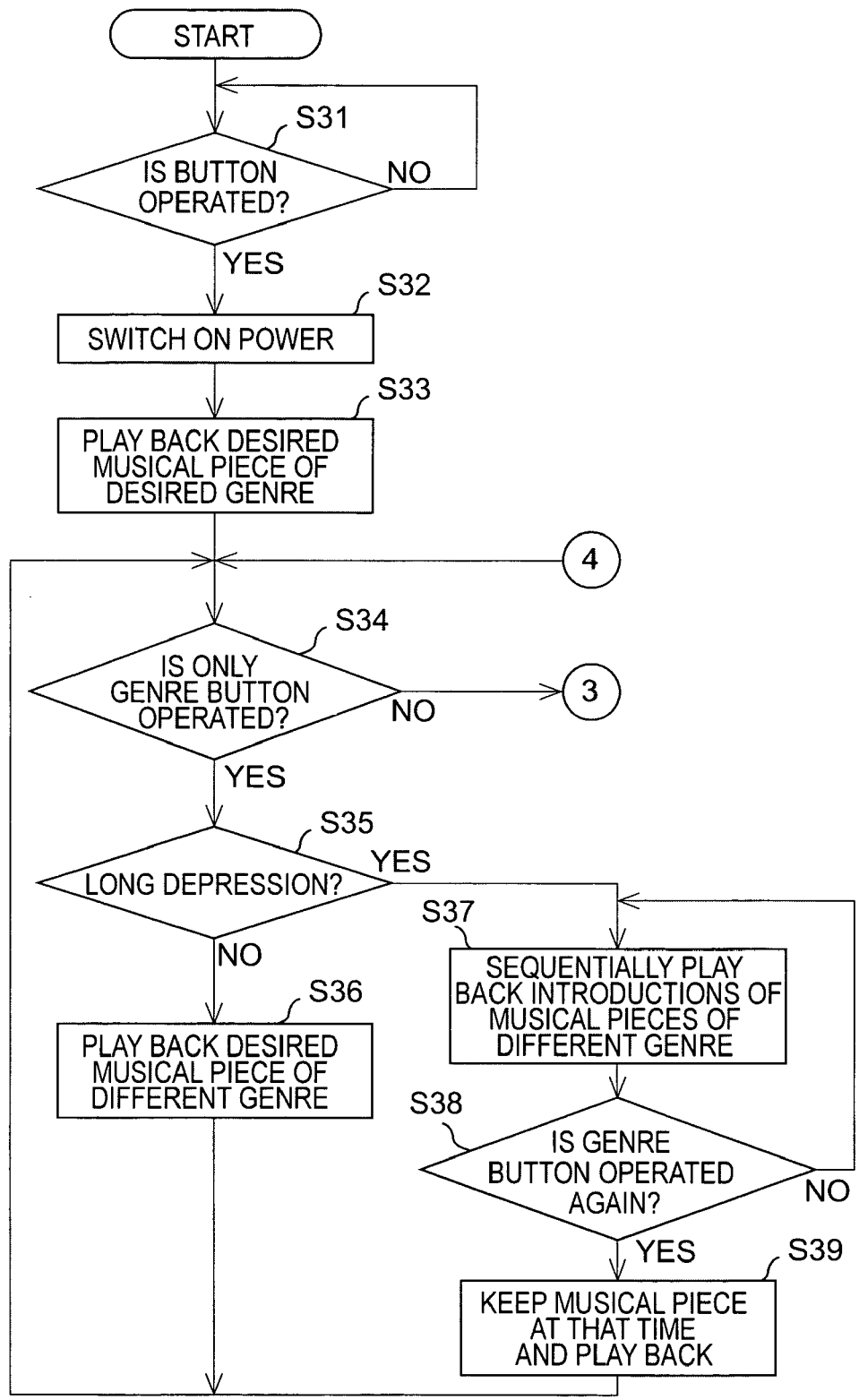
FIG. 8 shows a portion of the flowchart illustrating the processing operation in the content providing apparatus according to the second embodiment of the present invention.
Figure 9:
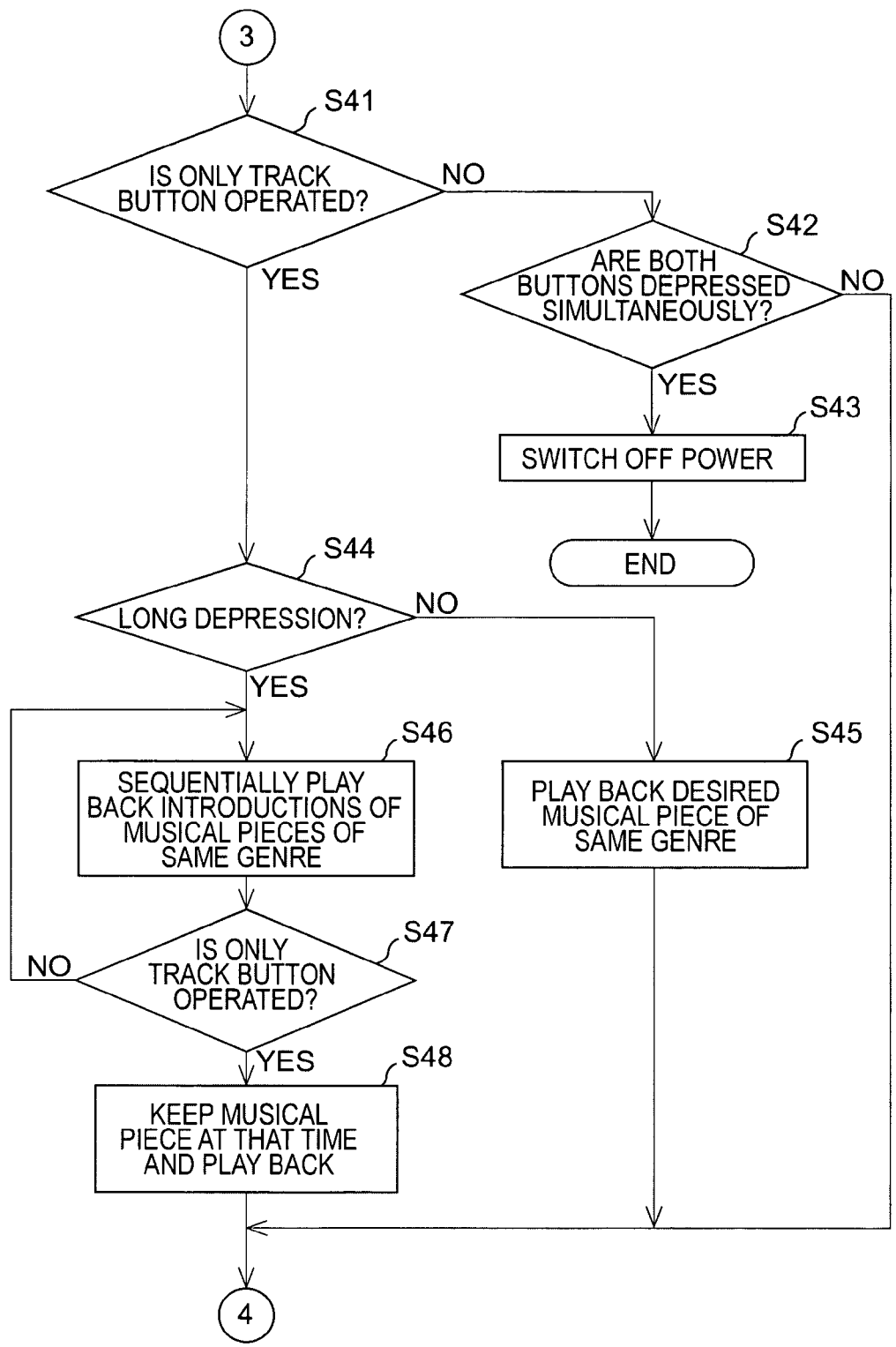
FIG. 9 shows a portion of the flowchart illustrating the processing operation in the content providing apparatus according to the second embodiment of the present invention.

FIGS. 8 and 9 are flowcharts illustrating the processing operation based on the operation of the genre button 122 and the track button 123 in the content providing apparatus 2 when the configuration is formed in such a manner.

That is, in the content providing apparatus 2 of this example, even in the state in which the power supply is switched off, power is supplied to the parts including the CPU 101 for detecting that the genre button 122 and/or the track button 123 are operated, so that whether or not the genre button 122 and/or the track button 123 are operated by the user is always monitored (step S31).

Then, in the operation of monitoring the operation of the genre button 122 and the track button 123 in the state in which the power supply is switched off in step S31, when it is determined that the genre button 122 and/or the track button 123 are depressed, the CPU 101 performs control so that power is supplied to the entire content providing apparatus 2 because it is an operation from the switched-off state (step S32). The operation button to be detected as being depressed in step S31 may be any one of the genre button 122 and the track button 123, and the depressing operation mode may be any depressing operation mode.

Then, when the power supply is switched on, the CPU 101 reads the content data of a desired musical piece from the hard disk device 110 and transfers the content data to the content decoding section 107. Then, in the content decoding section 107, the received content data is decoded, and a digital audio signal, which is a decoded result, is sent to the D-A conversion circuit 111. In the D-A conversion circuit 111, the digital audio signal is converted into an analog audio signal, the analog audio signal is supplied to the speaker 113 via the amplifier 112, and sound is played back (step S33).

When the user does not like the played-back musical piece, the user requests the playback of another musical piece by operating the genre button 122 and/or the track button 123. As described above, there are two operation modes of the genre button 122 and the track button 123 at that time. When it is desired to maintain the same atmosphere as that of the musical piece content currently being played back, the track button 123 is operated. When it is desired to change the atmosphere to an atmosphere different from that of the musical piece content currently being played back, the genre button is operated. When the power supply is to be switched off, both the genre button 122 and the track button 123 are depressed simultaneously.

Therefore, the CPU 101 determines whether or not only the genre button 122 is operated (step S34). When it is determined that only the genre button 122 is operated, the CPU 101 determines whether or not the operation is a long depressing operation (step S35).

When it is determined in step S35 that the operation is not a long depressing operation of the genre button 122, the CPU 101 reads, from the hard disk device 110, content of a musical piece different from the musical piece content currently being played back from the genre (group) different from that of the musical piece content currently being played back, transfers the content to the content decoding section 107, and plays back sound from the speaker 113 in the manner described above (step S17). Thereafter, the process returns to step S14, and the depressing operation of the genre button 122 is monitored.

When it is determined in step S35 that the operation is a long depressing operation of the genre button 122, the CPU 101 performs control so that the intro of the content of a musical piece selected from each of a plurality of genres different from that of the content currently being played back is sequentially played back and output in the provision sequence (step S37).

Then, the process waits for the genre button 122 to be depressed by the user again (step S38), and continues the sequential playback of the intros of the content of a musical piece selected from each of the plurality of different genres until another depressing operation occurs. In this case, when the intro playback for each musical piece from all the genres is completed, the same intros may be repeatedly played back. In this embodiment, however, another musical pieces are sequentially selected from all the genres, and the intros thereof are played back.

When it is determined in step S38 that another depressing operation of the genre button 122 is performed, the CPU 101 performs control so that the sequential playback of the intros is stopped, the musical piece content of the genre, whose intro was being played back when the depressing operation was performed, is kept, and the entire content of the musical piece is played back (step S39). Thereafter, the process proceeds to step S34, and the depressing operation of the genre button 122 is monitored.

When it is determined in step S34 that the genre button 122 is not depressed or only the genre button 122 is not depressed, the CPU 101 determines whether or not only the track button 123 is depressed (step S41 in FIG. 9). When it is determined in step S41 that the track button 123 is not depressed or only the track button 123 is not depressed, a determination is made as to whether or not both the genre button 122 and the track button 123 are depressed simultaneously (step S42). When it is determined that they are not depressed simultaneously, the process returns to step S34, and the depressing operation of the genre button 122 is monitored.

When it is determined in step S42 that the genre button 122 and the track button 123 are not depressed simultaneously, the CPU 101 switches off the power supply (step S43), and the processing routine is completed.

When it is determined in step S41 that only the track button 123 is depressed, the CPU 101 determines whether or not the depressing operation is a long depression (step S44). When it is determined that the depressing operation is not a long depression, the CPU 101 determines that the operation of the track button 123 is a normal one depressing operation, reads, from the hard disk device 110, desired musical piece content different from the musical piece content currently being played back from the same genre as that of the musical piece content currently being played back, transfers the musical piece content to the content decoding section 107, and as described above, sound is played back from the speaker 113 (step S45). Thereafter, the process returns to step S34, and the depressing operation of the genre button 122 is monitored.

When it is determined in step S44 that the depressing operation of the track button 123 is a long depression, the CPU 101 performs control so that the intros of the musical piece content in the same genre as that of the content currently being played back are sequentially played back and output in the providing sequence (step S46).

Then, the process waits for the track button 123 to be depressed by the user again (step S47), and continues the sequential playback of the intros until another depressing operation occurs. When it is determined in step S47 that the track button 123 is depressed again, the CPU 101 performs control so that the sequential playback of the intros is stopped, the musical piece content whose intro is being played back when the depressing operation is performed is kept, and the entire content of the musical piece is played back (step S48). Thereafter, the process proceeds to step S34, and the depressing operation of the genre button 122 is monitored.

According to the second embodiment, by simply depressing the genre button 122 for a long time without operating it many times, the intro of the musical piece, which is a candidate of the genre (group) of the musical piece to be listened to next, can be listened to sequentially. As a result, it is easy to search for a genre (group) matching the mood of the user at that time.

Therefore, the following operation becomes possible that, first, a preference genre is determined by listening to the intro of content whose genre is different by depressing for a long time the genre button 122, and thereafter, by depressing the track button 122 for a long time, the intros of the candidates of the musical pieces to be listened to are sequentially listened to in the selected genre, and the musical piece matching the current mood is determined.

Therefore, when the user wants to listen to a musical piece matching the current feeling though the user does not particularly have a specific musical piece, it is possible to comparatively easily to search for a target musical piece by only operating the genre button and the track button.

[Modification 2 of the Second Embodiment]

Also, in the second embodiment, if the user has already determined a specific musical piece to be listened to, there is a risk in that it takes too much time to arrive at the desired musical piece with only the operation of the operation buttons 122 and 123. Also, in the second embodiment, in order to avoid this problem, the content providing apparatus 2 includes, in addition to the operation buttons 122 and 123, means by which the user can directly specify and select the content of the musical piece.

That is, in the modification 2, the content providing apparatus 2 includes a display section, and operation means for performing a selection input via the screen of the display section as means by which the user directly specifies and selects the content of the musical piece.

Figure 5B:
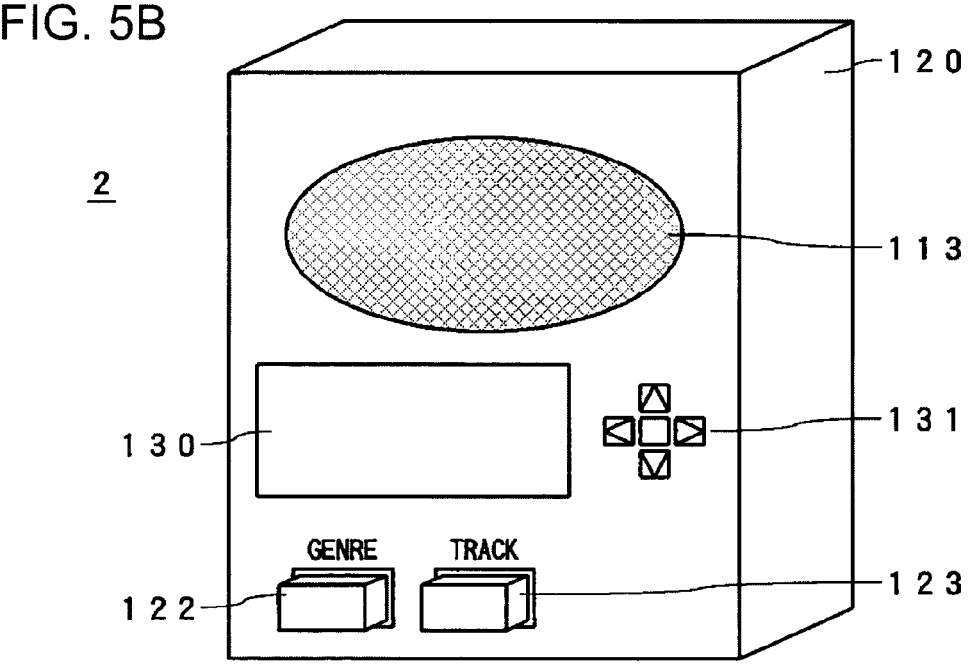

FIG. 5B shows the exterior of the content providing apparatus 2 in that case. That is, the content providing apparatus 2 includes a display section 130 formed of, for example, an LCD, and a cross-type operation button 131 for moving a selection cursor displayed on the screen of the display section 130 vertically and horizontally and for performing a determination operation.

The large amount of content stored in the hard disk device 110 is divided according to not only the genre, but also according to the group having a hierarchical structure as illustrated with reference to FIG. 32 at the beginning of the specification. The CPU 101 displays a content group for each hierarchy on the display section 130. The user selects and determines the group desired by the user himself/herself from among the groups for each hierarchy, displayed on the display 130, by using the cross-type operation button 131. When a specific group is selected and determined in the associated hierarchy, the CPU 101 allows a selection screen in the group below that hierarchy to be displayed so that a selection at the associated hierarchy is prompted.

Then, the CPU 101 displays the content names of the musical pieces, etc., at the lowest hierarchy. At the lowest hierarchy, when the selection and determination of the content via the cross-type operation button 131 is received, the CPU 101 reads the selected and determined content from the hard disk device 110 and plays it back.

In the manner described above, when the operation button 123 is operated while the content of the selected and determined musical piece is being played back or after it is played back, based on the genre to which the selected and determined content belongs, the above-described processing operation of FIGS. 6 and 7, or FIGS. 8 and 9 is performed.

Also, in the second embodiment, the input meaning "the current state is not a state desired by the user" is not restricted to the depressing operation of the operation button. For example, a microphone can be provided in the content providing apparatus, so that a specific sound input to this microphone is used. For example, instead of the genre button, an utterance of "genre" is assigned, and instead of the track button, an utterance of "track" is assigned, so that these can also be processed as the above-described inputs.

In this case, for example, an utterance of "track intro" can be assigned to the utterance corresponding to the long depressing of the track button.

Furthermore, the operation of clapping the hands rather than the utterance by human speech can also be used as an input meaning "the current state is not a state desired by the user". In this case, for example, the time when the number of times the hands are clapped is once can be made to correspond to the change of the content in the group; the time when the number of times the hands are clapped is two times can be made to correspond to the change of the group; and the time when the number of times the hands are clapped is three can be made to correspond to the intro playback of the content in the group.

In the foregoing description, the grouping of the content is performed using the genre. Alternatively, the grouping of the content may be performed using other content related attributes, such as the artist, the album, and the composer, and instead of the genre button, an artist button, an album button, and a composer button, etc., may be provided.

All the content that is grouped by using the genre, the artist, and the album as a rule may be provided in advance. Also, with respect to the operation button 122, an operation differing from that described above, for example, a three-time continuous operation, may be defined in advance, and based on the different operation of the operation button 121, grouping of which one of the rules should be selected may be switched and selected in a desired manner.

Third Embodiment

In the above-described first and second embodiments, by using one of the content related attributes, such as the genre, the artist, the album, and the composer, as a reference (rule) in advance, grouping is performed, and with respect to only the determined group, the content inside and outside that group is selected.

On the other hand, in the third embodiment, the rule for grouping is not fixed to one. For example, the content related attributes, such as the genre, the artist, the album, and the composer, are each grouped in advance. Which grouping should be used when selecting content can be switched and selected by a user input, such as a button operation.

Figure 10A:
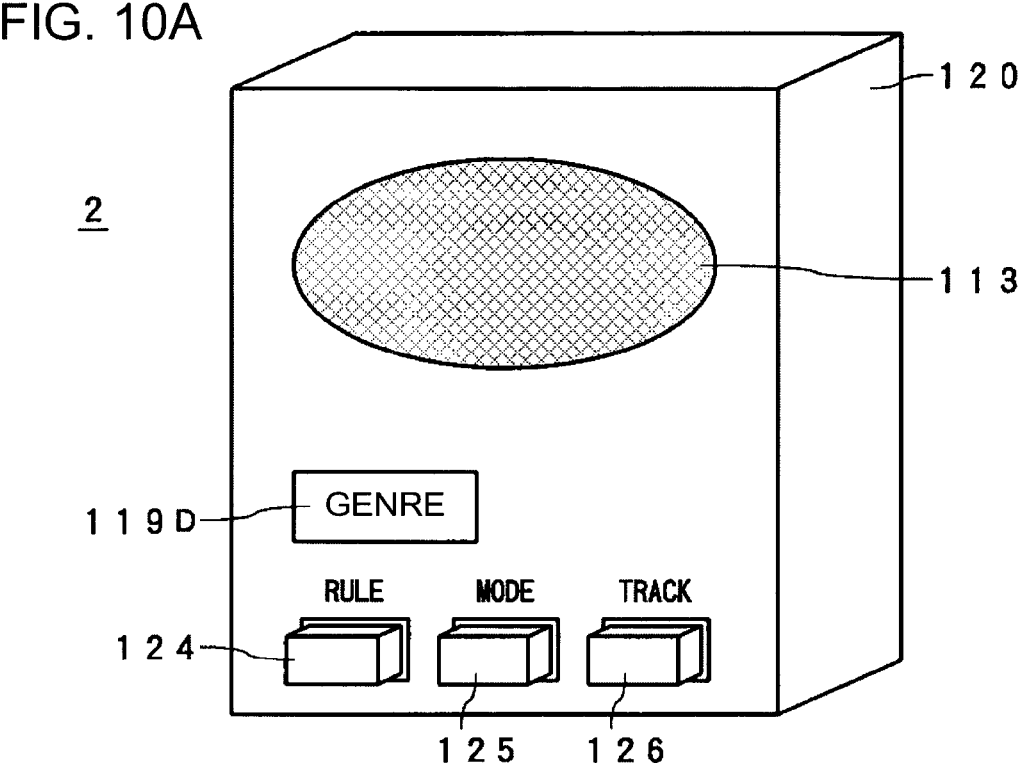
FIGS. 10A and 10B show an example of the exterior configuration of a content providing apparatus according to a third embodiment of the present invention.

FIG. 10A shows an example of the exterior of a content providing apparatus 3 according to a third embodiment. FIG.

11 is a block diagram showing the internal configuration of the content providing apparatus 3 of the third embodiment.

Figure 11:
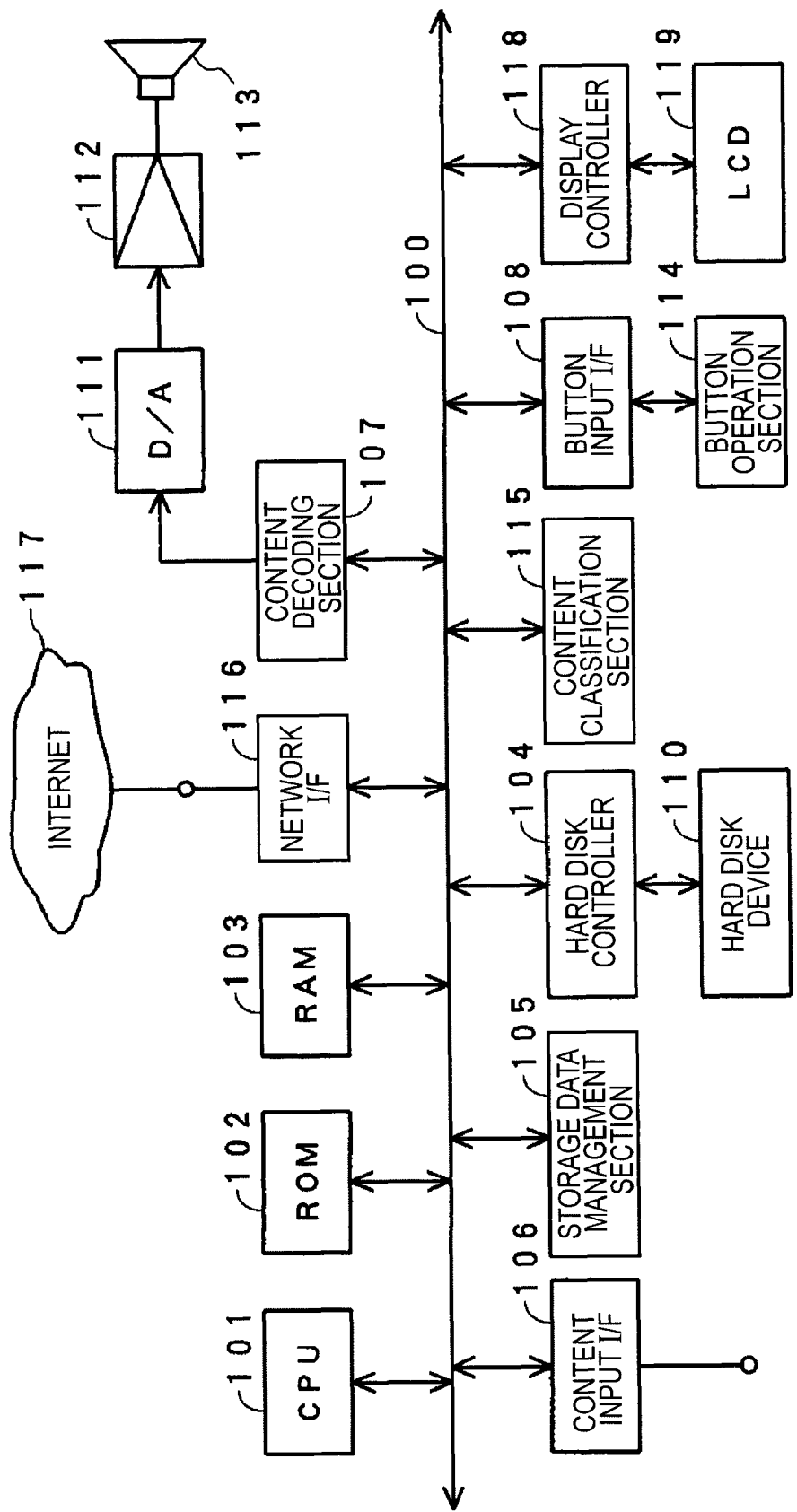
FIG. 11 is a block diagram showing an example of the configuration of the content providing apparatus according to the third embodiment of the present invention.

In the block diagram of FIG. 11, components identical to those in the first embodiment shown in FIG. 1 are designated with the same reference numerals. In the third embodiment of FIG. 11, a content classification section 115 is connected to the system bus 100, and a network interface 116 for connecting the content providing apparatus 3 to the Internet 117 is provided in such a manner as to be connected to the system bus 100. Furthermore, a display section 119 formed of an LCD is connected to the system bus 100 via a display controller 118. The display section 119 constitutes a rule display section.

Figure 12:
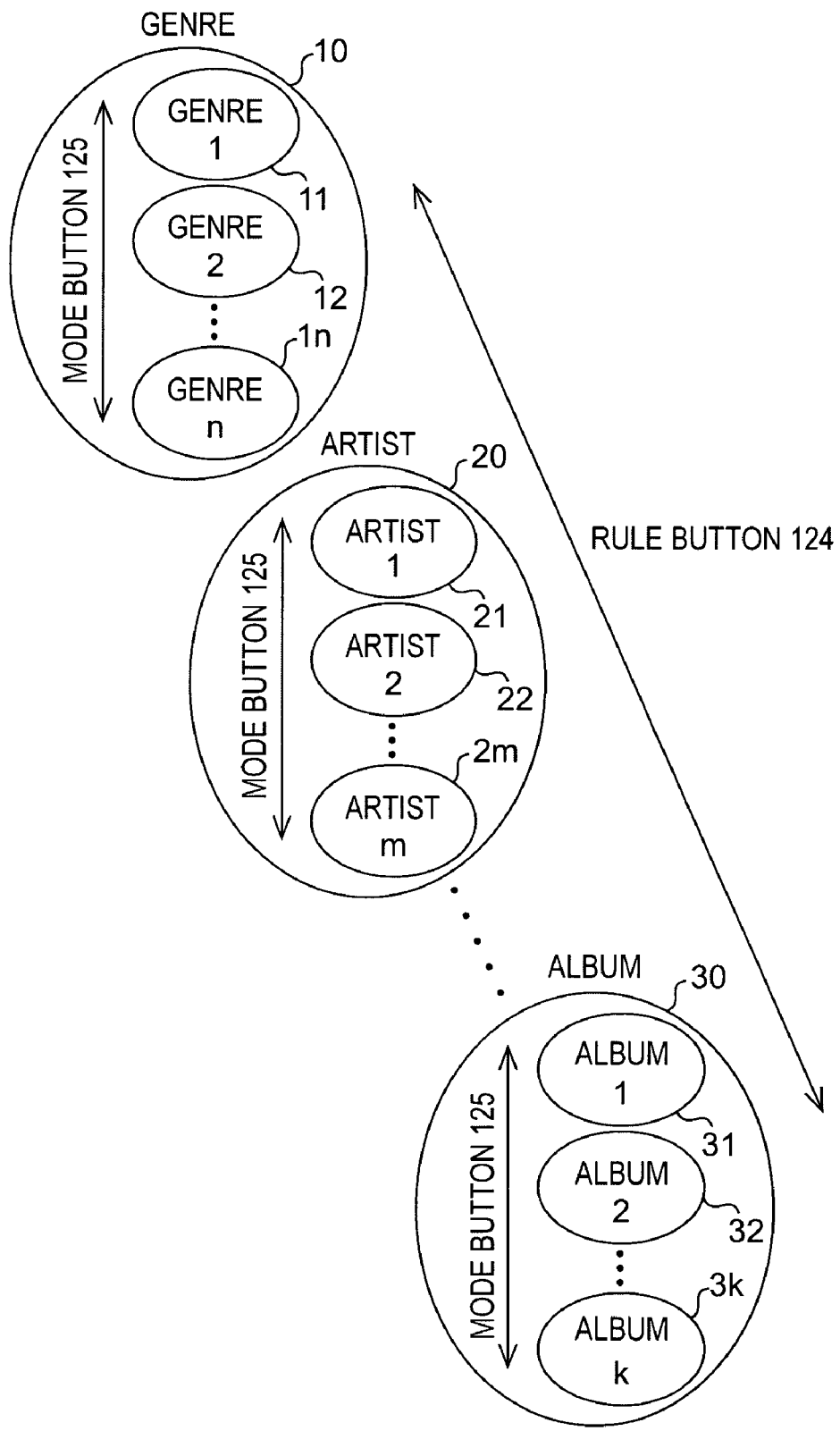
FIG. 12 illustrates the processing operation of the content providing apparatus according to the third embodiment of the present invention.

In the third embodiment, as shown in FIG. 12, the content of the musical pieces that are prestored in the hard disk device 110 is grouped in advance in units of large groups by using, as a rule, the genre, the artist, the album, and the composer. In this case, as shown in FIG. 12, a large group 10 of the rule of the genre contains a plurality of small groups as a small group 11 of a genre 1, a small group 12 of a genre 2 . . . , and a small group in of a genre n. Similarly, each of a large group 20 of the rule of the artist and a large group 30 of the rule of the album contains a plurality of small groups 21, 22, . . . , 2m and a plurality of small groups 31, 32, . . . , 3k, respectively.

Management data, such as table information, regarding the grouping is structured in such a manner as to be managed in the storage data management section 105 similarly to the above-described embodiments.

The content classification section 115 and the network interface 116 perform a classification of grouping with respect to the content that is newly received by the content providing apparatus 3 via the content input interface 106.

That is, when the content related attribute information is accompanied to the content data received by the content providing apparatus 3 via the content input interface 106, the content related attribute information is sent to the content classification section 115.

Then, based on the received content-related attribute information, the content classification section 115 determines which small group of which large group the received content data belongs to, and sends the determination result to the storage data management section 105. At this time, the number of the large groups and the small groups to which the received content data belongs usually become plural. The reason for this is that particular content belongs to a small group of a particular genre, belongs to a small group of a particular artist, belongs to a small group of a particular album, and belongs to a small group of a particular composer.

When the content related attribute information is not accompanied to the received content data via the content input interface 106, the content related information can be obtained by accessing, for example, a server apparatus for performing content-related information notification service, the server apparatus being disposed in the Internet.

For example, when a content ID (identification data) is accompanied to the content data received via the content input interface 106, the content providing apparatus 3 makes an inquiry of the content-related information by sending the content ID to the server apparatus, such as a CD (Compact Disc)-DB (Database) in the Internet, via the network interface 116, and obtains, as the result of the inquiry, the content-related information from the CD-DB, etc.

Then, in the content providing apparatus 3, the obtained content-related information is analyzed to make a determination as to which group the content data received via the content input interface 106 belongs and sends the determination result to the storage data management section 105. In the same manner as described above, the content data received in the storage data management section 105 is grouped and managed.

The LCD display section 119 is configured to display the rule being selected. The remaining construction is the same as the above-described embodiments except that the configuration of the button operation section 114 and the processing based on the button operation thereof differ.

In the third embodiment, the button operation section 114, as shown in FIG. 10A, includes operation buttons 124, 125, and 126.

The depressing operation of the operation button 124 has the meaning "the rule for desired grouping differs from that currently being selected". As a result of this button being depressed, the large group is changed from that currently being selected to another group. Hereinafter, this operation button 124 is referred to as a "rule button 124". That is, as shown in FIG. 12, as a result of the depressing operation of the rule button 124, the group is changed to a desired large group, and as described above, the changed rule is displayed on the screen 119D of the LCD display section 119.

In this embodiment, the long depressing of the rule button 124 is assumed as an operation for shifting from the switched-on state to the switched-off state.

The depressing operation of the operation button 125 has the meaning "the desired small group belonging to the large group of the rule being selected is not a small group to which the content currently being selected belongs". As a result of this button being depressed, the playback is changed to the content in another small group differing from the small group to which the content being selected in the same large group belongs. Hereinafter, this operation button 125 is referred to as a "mode button 125". That is, as shown in FIG. 12, as a result of the normal depressing operation of the mode button 125, in the large group, the small group to be selected is changed to the desired small group.

In this embodiment, as a result of the long depressing of the mode button 125, in the large group, intros of individual pieces of content selected in a desired manner from each of a plurality of small groups are played back in a desired sequence.

The operation button 126 is the same as the track button of the above-described embodiments. The operation of the operation button 126 has the meaning "the small group being selected needs not to be changed, but the content being selected differs from the desired content". Then, when the operation button 126 is depressed for a short time as in the normal case, in the small group being selected, the playback content is changed to content other than the content being selected. Also, in this example, hereinafter, this operation button 126 is referred to as a "track button".

Also, in this embodiment, as a result of the long depressing of the track button 126, in the small group, intros of a plurality of pieces of content are played back in a desired sequence.

Figure 13:
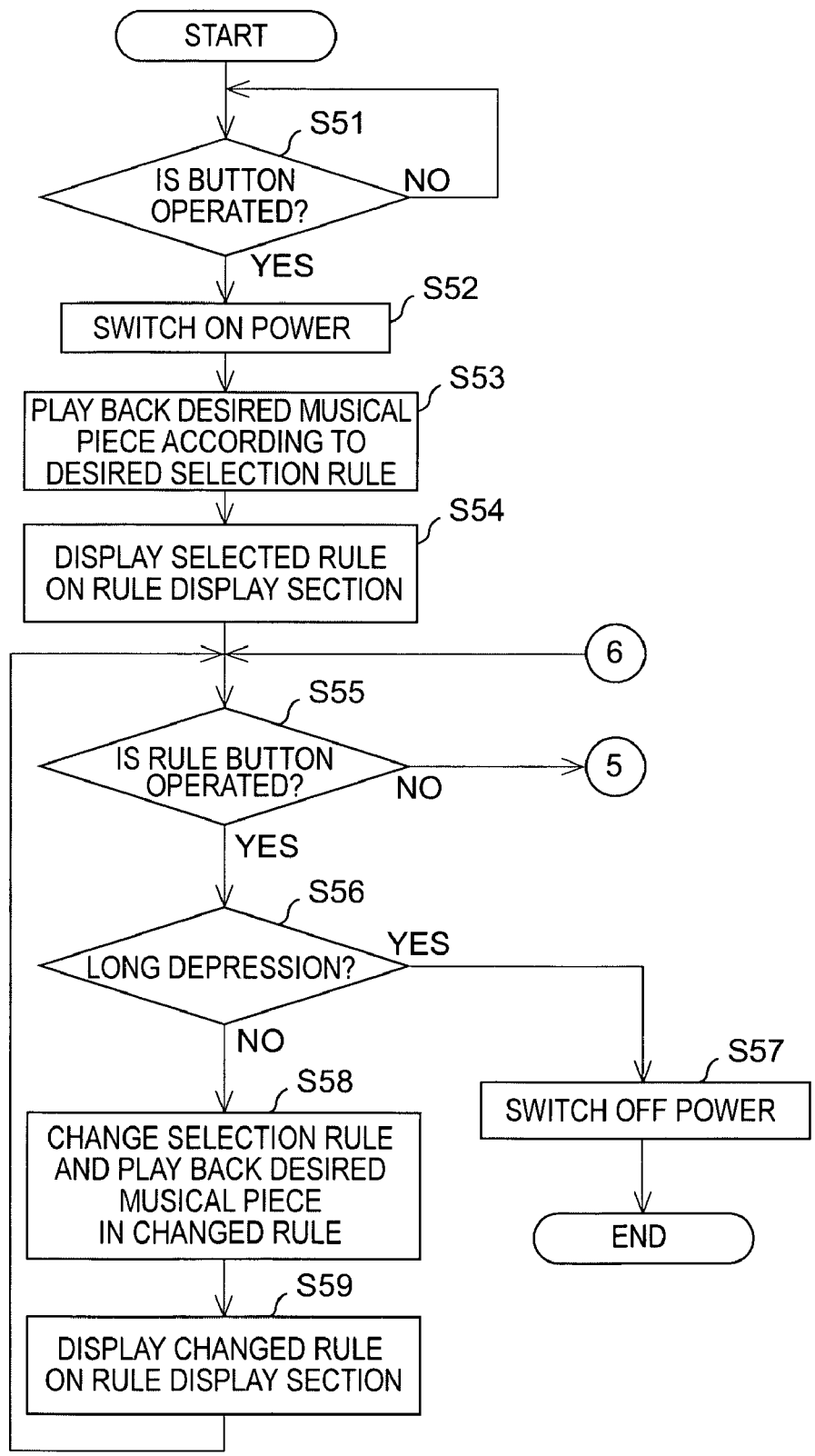
FIG. 13 shows a portion of the flowchart illustrating the processing operation in the content providing apparatus according to the third embodiment of the present invention.
Figure 14:
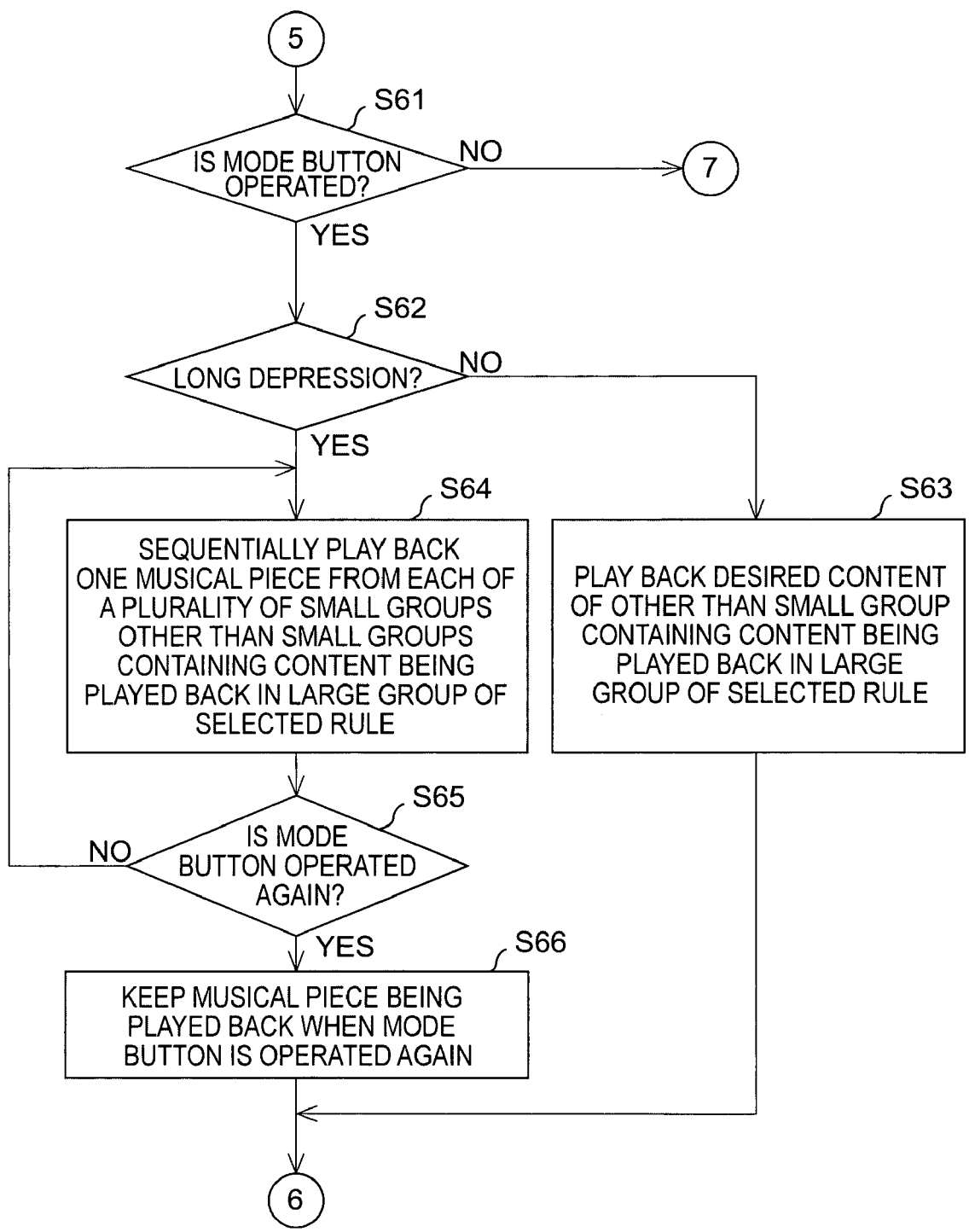
FIG. 14 shows a portion of the flowchart illustrating the processing operation in the content providing apparatus according to the third embodiment of the present invention.
Figure 15:
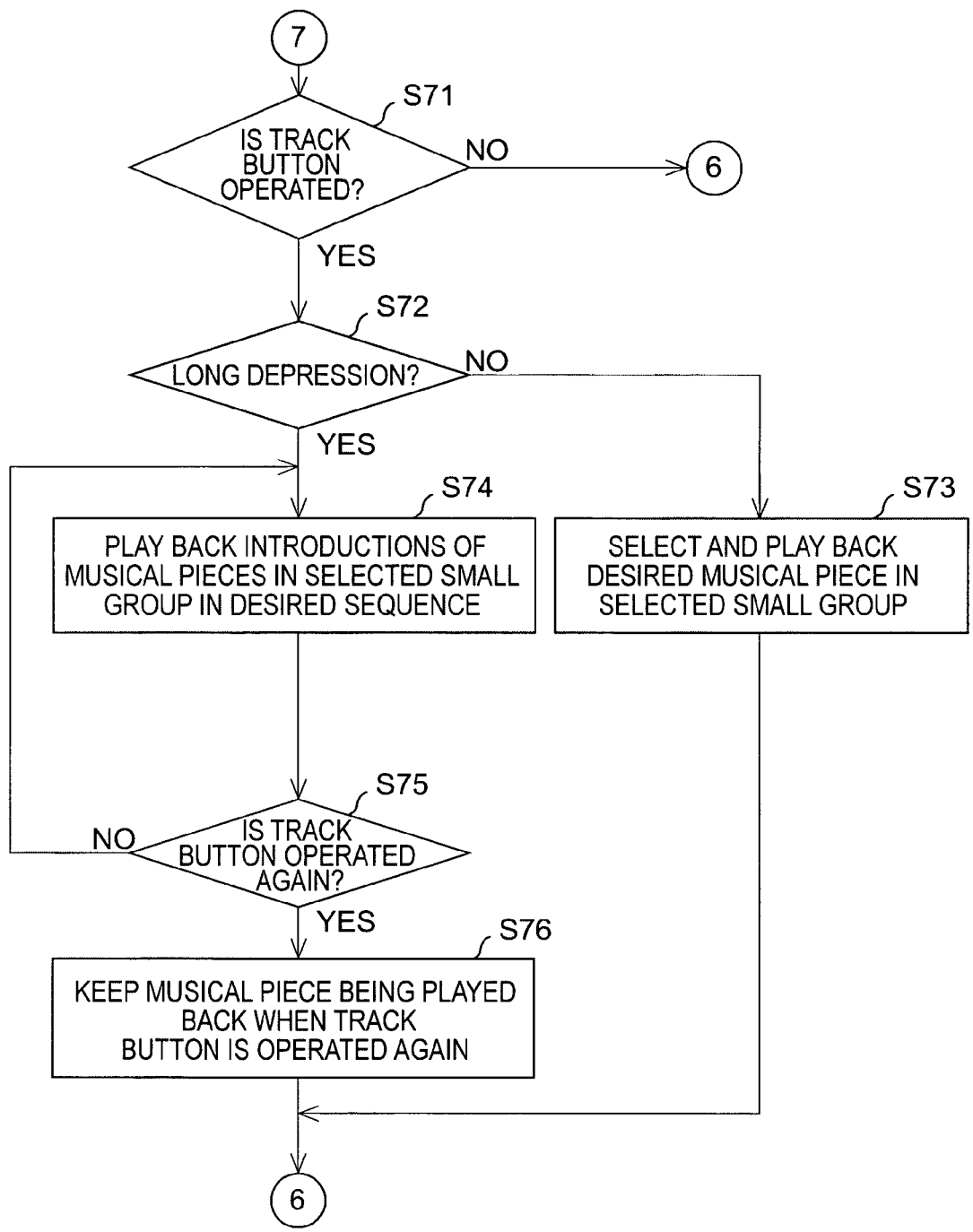
FIG. 15 shows a portion of the flowchart illustrating the processing operation in the content providing apparatus according to the third embodiment of the present invention.

FIGS. 13, 14, and 15 are flowcharts illustrating the processing operation based on the operation of the rule button 124, the mode button 125, and the track button 126 in the content providing apparatus 3 of the third embodiment, configured in the manner described above.

That is, in the content providing apparatus 3 of this example, even if the power supply is switched off, power is supplied to the parts including the CPU 101 for detecting that the rule button 124, the mode button 125, or the track button 126 is operated, so that whether or not the rule button 124, the mode button 125, or the track button 126 is operated by the user is always monitored (step S51).

Then, in the operation of monitoring the operation of the rule button 124, the mode button 125, or the track button 126 in the switched-off state in step S51, when it is determined that the rule button 124, the mode button 125, or the track button 126 is operated, the CPU 101 performs control so that power is supplied to the entire content providing apparatus 3 because it is an operation from the switched-off state (step S52). The operation button to be detected as being depressed in step S51 may be any one of the rule button 124, the mode button 125, and the track button 126, and the depressing operation mode may be any depressing operation mode.

Then, when the power supply is switched on, the CPU 101 reads the content data of a desired musical piece from the hard disk device 110 and transfers the content data to the content decoding section 107. Then, in the content decoding section 107, the received content data is decoded, and a digital audio signal, which is a decoded result, is sent to the D-A conversion circuit 111. In the D-A conversion circuit 111, the digital audio signal is converted into an analog audio signal, and the analog audio signal is supplied to the speaker 113 via the amplifier 112, and sound is played back (step S53).

At this time, on the screen 119D of the LCD display section 119, the rule for selecting a large group including the content currently being played back is displayed (step S54). In FIG. 10A, a case in which a large group is formed by using the rule of "genre" is shown.

When the user does not like the played-back musical piece, the user requests the playback of another musical piece by operating the rule button 124, the mode button 125, or the track button 126. The operation for switching off the power supply is assumed as a long depressing operation of the rule button 124 in this example.

The CPU 101 determines whether or not the rule button 124 is depressed (step S55). When it is determined that the rule button 124 is depressed, the CPU 101 determines whether or not it is a long depressing operation (step S56). When the operation is a long depressing operation, the CPU 101 switches off the power supply (step S57), and this processing routine is completed.

When it is determined in step S56 that the operation is not a long depressing operation, the CPU 101 selects a desired rule (a different large group) differing from the rule of the large group to which the musical piece content currently being played back belongs, and changes so as to play back the desired musical piece in the desired small group contained in the large group according to the changed rule (step S58).

For example, when the content contained in the large group 10 of the rule of the genre, when the rule button 124 is normally depressed rather than being depressed for a long time, the desired musical piece content in the desired small group (the desired artist in this case) in the large group 20 of the rule of the artist is played back.

Then, the CPU 101 displays the changed rule, for example, the "artist", on the screen 119D of the LCD display section 119 (step S59). Then, the process returns to step S55, and the operation of the rule button 124 is monitored.

When it is determined in step S55 that the rule button 124 is not operated, the CPU 101 determines whether or not the mode button 125 is depressed (step S61 in FIG. 14). When it is determined that the mode button 125 is depressed, the CPU 101 determines whether or not the depressing operation is a long depression (step S62).

When it is determined in step S62 that the operation is not a long depressing operation of the mode button 125, by determining that it is not a normal depressing operation, in the large group to which the content currently being played back belongs, desired content in a desired small group other than the small group in which the content currently being played back is contained is played back (step S63). Then, the process returns to step S55, and the depressing operation of the rule button 124 is monitored.

When it is determined in step S62 that the operation is a long depressing operation of the mode button 125, the CPU 101 performs control so that, in the large group of the rule content being selected, intros of the musical piece content for each musical piece selected from each of a plurality of small groups other than the small group to which the content currently being played back belongs is played back (step S64).

Then, the process waits for the mode button 125 to be depressed by the user again (step S65), and continues the sequential playback of the intros of one piece of the musical content selected from each of the plurality of small groups until another depressing operation occurs. In this case, if the intro playback for each musical piece from all the target small groups is completed, the same musical pieces may be repeatedly played back. In this embodiment, another musical piece is selected from all the target small groups and the intro thereof is played back.

When it is determined in step S65 that there is another depressing operation of the mode button 125, the CPU 101 performs control so that the sequential playback of the intros is stopped, the musical piece content of the small group, whose intro was being played back when the depressing operation was performed, is kept, and the entire content of the musical piece is played back (step S66). Thereafter, the process proceeds to step S55, and the depressing operation of the rule button 124 is monitored.

Furthermore, when it is determined in step S61 that the mode button 125 is not depressed, the CPU 101 determines whether or not the track button 126 is depressed (step S71 in FIG. 15). When it is determined in step S71 that the track button 126 is not depressed, the CPU 101 returns to step S55 and monitors the depressing operation of the rule button 124.

When it is determined in step S71 that the track button 126 is depressed, the CPU 101 determines whether or not the depressing operation is a long depression (step S72). When it is determined that the depressing operation is not a long depression, the CPU 101 determines that the operation of the track button 126 is a normal one depressing operation, selects desired musical piece content differing from the musical piece content currently being played back from the small group in which the musical piece content currently being played back is contained, and reads the selected content from the hard disk device 110. Then, the read content is transferred to the content decoding section 107, and in the manner described above, sound is played back from the speaker 113 (step S73). Thereafter, the process returns to step S55, and the depressing operation of the rule button 124 is monitored.

When it is determined in step S72 that the depressing operation of the track button 126 is a long depression, the CPU 101 performs control so that, in the small group containing the content currently being played back, the intros of the other musical piece content excluding the content currently being played back are sequentially played back and output in a desired sequence of provision (step S74).

Then, the process waits for the track button 126 to be depressed by the user again (step S75) and continues the sequential playback of the intros until another depressing operation is performed. When it is determined in step S75 that another depressing operation of the track button 126 is performed, the CPU 101 performs control so that the sequential playback of the intros is stopped, the musical piece content, whose intro was being played back when the depressing operation was performed, is kept, and the entire content of the musical piece is played back (step S76). Thereafter, the process proceeds to step S55, and the depressing operation of the rule button 124 is monitored.

According to the third embodiment, by operating the rule button 124, the user can easily switch and change the rule for grouping of content to that based on various rules, such as the genre, the artist, the album, the composer, and the era of sales. Therefore, according to the third embodiment, there are the advantages in that the diversity of the selection of content is increased.

That is, it is possible to change from the state in which, for example, content that is grouped according to the genre is enjoyed by operating the mode button and the track button to a state in which the content grouped according to the artist and the album as a result of the depressing operation of the rule button 124 is selected in a desired manner and is enjoyed by operating the mode button and the track button.

In the third embodiment, the same operational effects as those of the above-described second embodiment are offered.

[Modification 1 of the Third Embodiment]

Also, in the third embodiment, if the user has already determined a specific musical piece to be listened to, there is a risk in that it takes too much time to arrive at the desired musical piece with the operation of the operation buttons 124 to 126. Accordingly, in the third embodiment, in order to avoid this problem, the content providing apparatus 3 includes, in addition to the operation buttons 124 to 126, means by which the user can directly specify and select the content of a musical piece is provided.

That is, in this modification, the content providing apparatus 3 includes, as means for a user to directly specify and select the content of the musical piece, a display section formed of, for example, an LCD, and operation means for performing a selection input via the screen of the display section is provided. In the third embodiment, as described above, a display section 119 formed of an LCD is provided, and therefore, for the display section 119, a display having a comparatively large display screen is used.

Figure 10B:
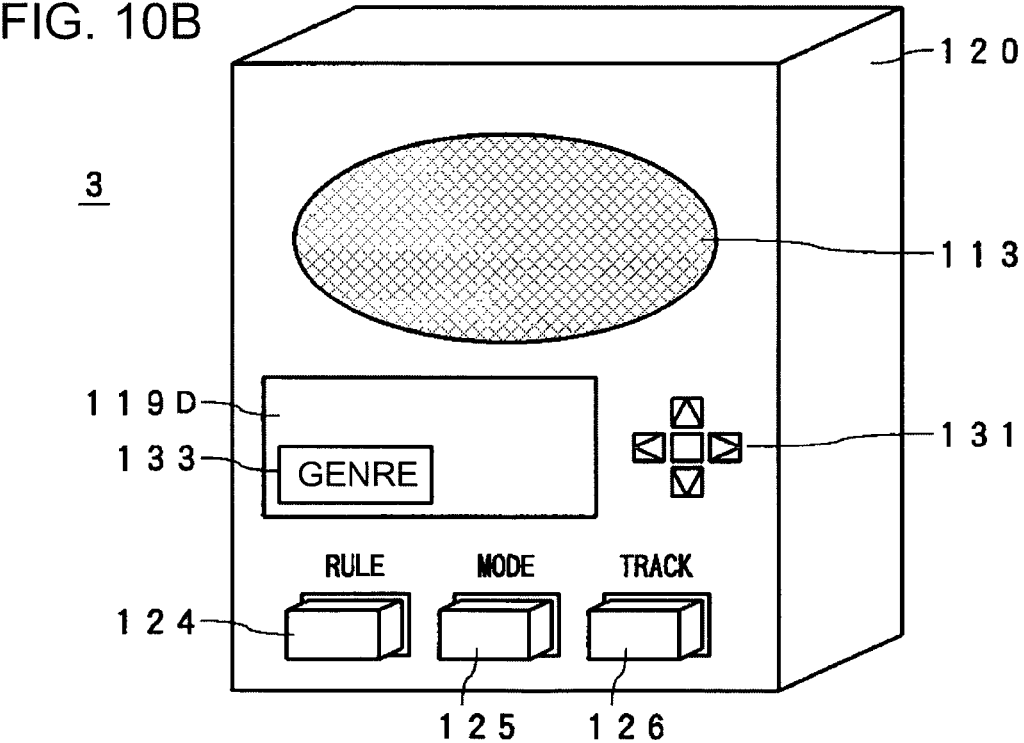

FIG. 10B shows the exterior of the content providing apparatus 3 in that case. That is, the content providing apparatus 3 includes a display section 119 formed of, for example, an LCD, and a cross-type operation button 131 for moving a selection cursor displayed on the screen 119D of the display section 119 vertically and horizontally and for performing a determination operation. On the screen 119D of the display section 119, a rule display area 133 for displaying in characters the currently selected rule is provided.

In the third embodiment, a large amount of content stored in the hard disk device 110 is grouped by a hierarchical structure as illustrated with reference to FIG. 32 at the beginning of the specification according to the genre, the artist, the album, the composer, etc. The CPU 101 displays a content group of a large group and a small group for each hierarchy on the screen 119D of the display section 119.

The user selects and determines the group desired by the user himself/herself from among the groups for each hierarchy, displayed on the screen 119D of the display section 119, by using the cross-type operation button 131. When a specific group is selected and determined in the associated hierarchy, the CPU 101 allows a screen in the group below that hierarchy to be displayed so that a selection at the associated hierarchy is prompted.

Then, at the lowest hierarchy, the CPU 101 displays the content name of the musical piece, etc. At the lowest hierarchy, when the selection and determination of the content via the cross-type operation button 131 is received at the screen of the lowest hierarchy, the CPU 101 reads the selected and determined content from the hard disk device 110 and plays it back.

In the manner described above, when the operation buttons 124 to 126 are operated while the content of the selected and determined musical piece is being played back or after it is played back, the above-described processing operations of FIGS. 13 to 15 are performed by using as a reference the large group and the small group to which the selected and determined content belongs.

[Modification 2 of the Third Embodiment]

Figure 16A:
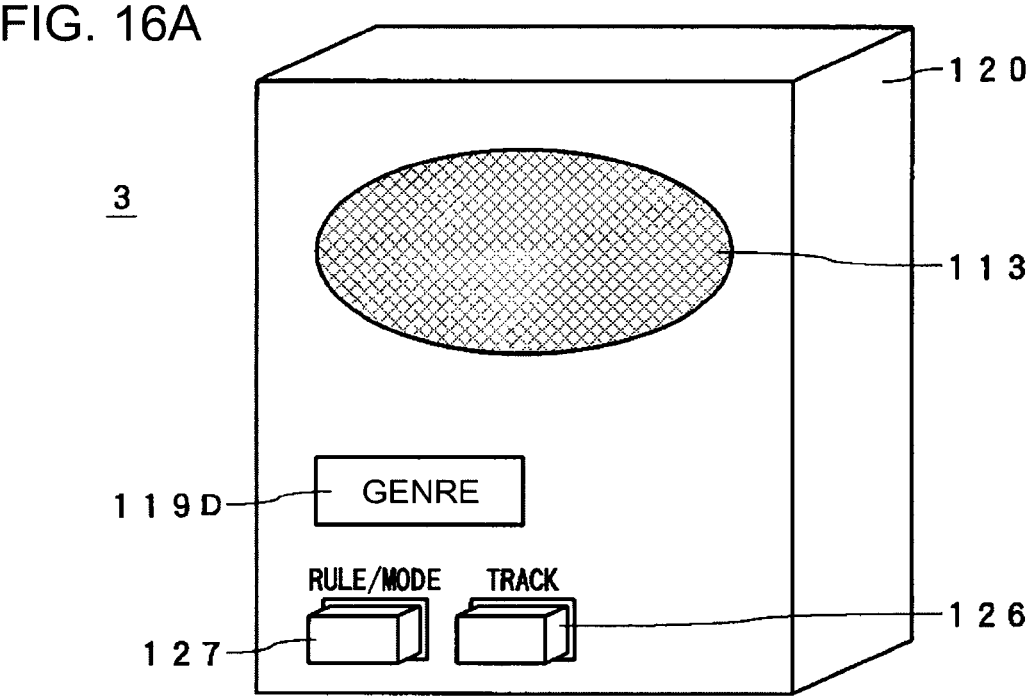
FIGS. 16A and 16B show an example of the exterior configuration of a modification of the content providing apparatus according to the third embodiment of the present invention.
Figure 16B:
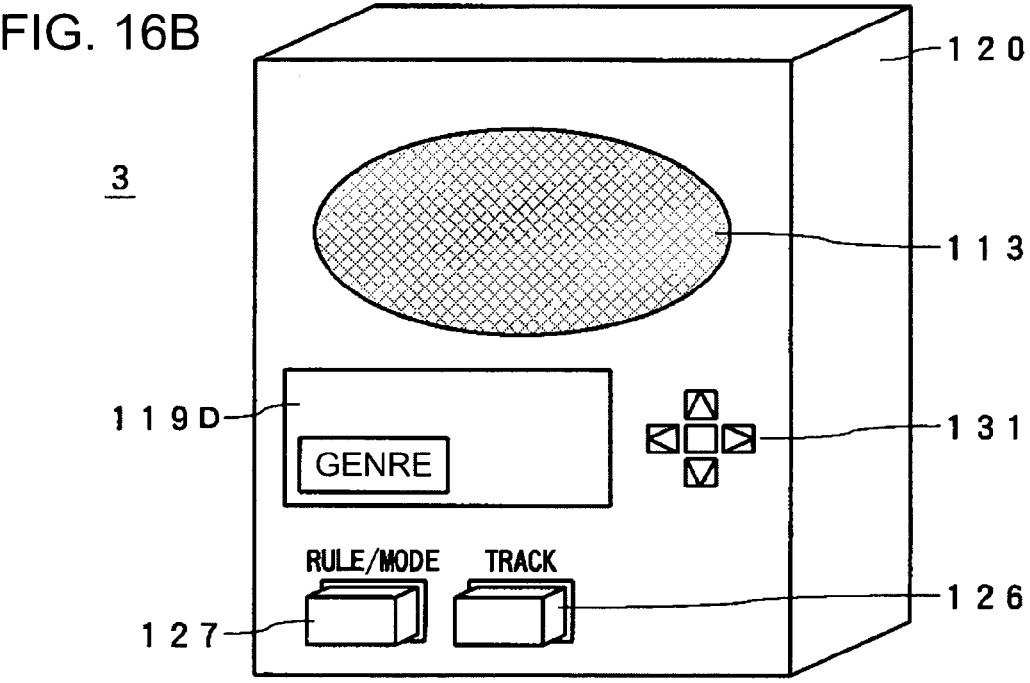

In the third embodiment, for the operation buttons, three operation buttons, that is, the rule button 124, the mode button 125, and the track button 126 are used. The functions of the rule button 124 and the mode button 125 can be realized by one operation button 127, as shown in FIGS. 16A and 16B.

The operation button 127 of this example will be referred to as a "mode button 127" in the following description. In this example, when the rule/mode button 127 is depressed two times continuously, this button functions as a rule button. Then, when the button is depressed once as in the normal case, the rule/mode button 127 functions as one depressing operation of the mode button, and when the button is depressed for a long time, it functions as a long depressing operation of the mode button.

In this example, the simultaneous depressing operation of the rule/mode button 127 and the track button 126 is assumed as a power switching-off operation.

Figure 17:
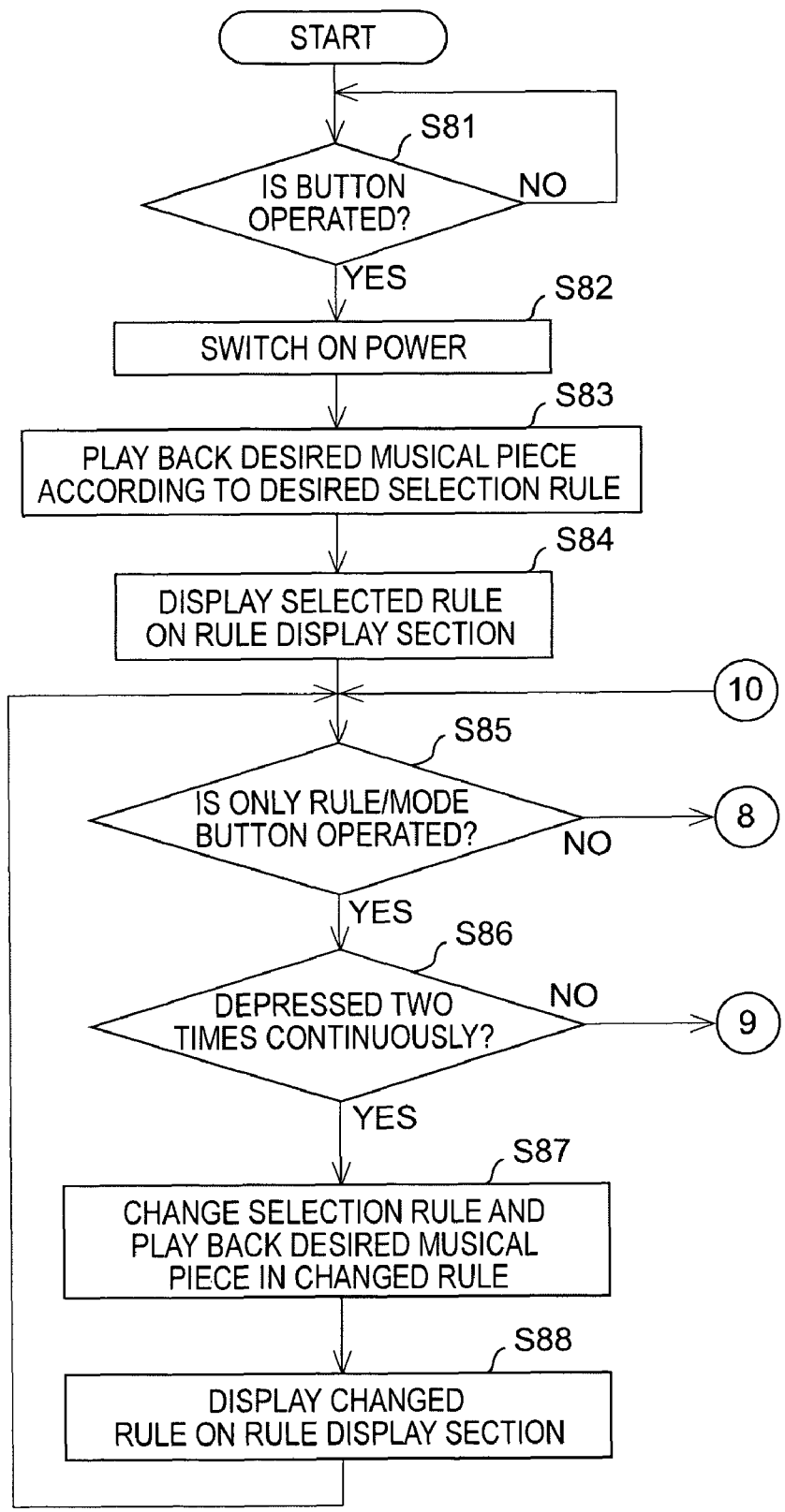
FIG. 17 shows a portion of the flowchart illustrating the processing operation in the modification of the content providing apparatus according to the third embodiment of the present invention.
Figure 18:
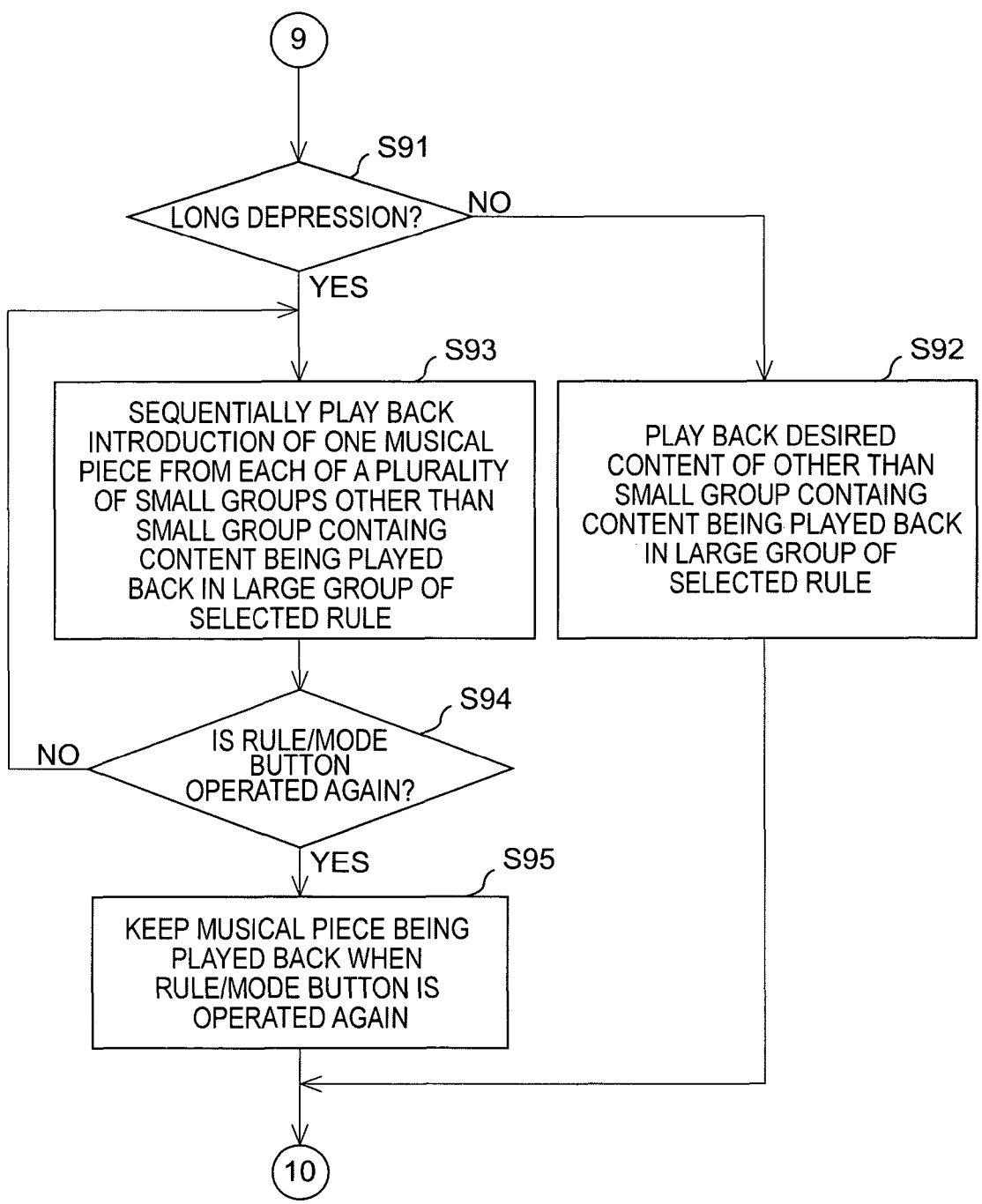
FIG. 18 shows a portion of the flowchart illustrating the processing operation in the modification of the content providing apparatus according to the third embodiment of the present invention.
Figure 19:
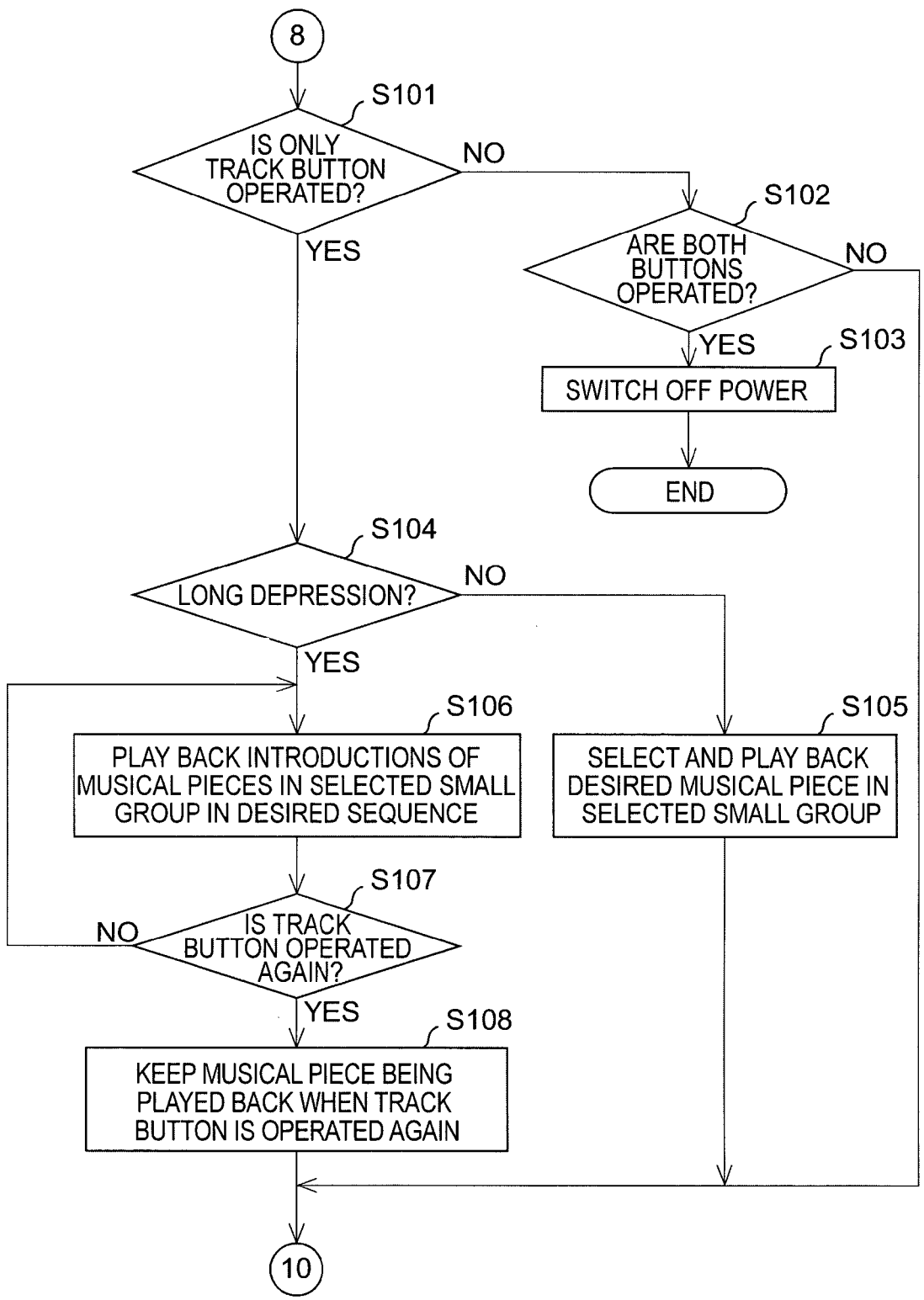
FIG. 19 shows a portion of the flowchart illustrating the processing operation in the modification of the content providing apparatus according to the third embodiment of the present invention.

FIGS. 17 to 19 are flowcharts illustrating the processing operation based on the operation of the rule/mode button 127 and the track button 126 in the case of the content providing apparatus 3 of this example.

That is, in the content providing apparatus 3 of this example, even in the state in which the power supply is switched off, power is supplied to the parts including the CPU 101 for detecting that the rule/mode button 127 and/or the track button 126 are operated, so that whether or not the rule/mode button 127 and/or the track button 126 are operated by the user is always monitored (step S81).

In the operation of monitoring the operation of the rule/mode button 127 and the track button 126 in the state of the power supply being switched off in step S81, when it is determined that the rule/mode button 127 and/or the track button 126 are depressed, the CPU 101 performs control so that power is supplied to the entire content providing apparatus 3 because it is an operation from the switched-off state (step S82). The operation button to be detected as being depressed in step S81 may be any one of the rule/mode button 127 and the track button 126, and the depressing operation mode may be any depressing operation mode.

Then, when the power supply is switched on, the CPU 101 reads the content data of a desired musical piece from the hard disk device 110 and transfers the content data to the content decoding section 107. Then, in the content decoding section 107, the received content data is decoded, and a digital audio signal, which is a decoded result, is sent to the D-A conversion circuit 111. In the D-A conversion circuit 111, a digital audio signal is converted into an analog audio signal, the analog audio signal is supplied to the speaker 113 via the amplifier 112, and sound is played back (step S83).

At this time, on the screen 119D of the LCD display section 119, the rule for selecting the large group containing the currently played-back content is displayed (step S84). In FIG. 16A, a case in which the large group is formed by the rule of the "genre" is shown.

When the user does not like the played-back musical piece, the user requests the playback of another musical piece by operating the rule/mode button 127 and/or the track button 126. For switching off the power supply, the user performs a simultaneous depressing operation of the rule/mode button 127 and the track button 126.

The CPU 101 determines whether or not only the rule/mode button 127 is depressed (step S85). When it is determined that only the rule/mode button 127 is depressed, the CPU 101 determines whether or not the operation is a two-time continuous depressing operation (step S86).

When it is determined that the operation is a two-time continuous depressing operation of the rule/mode button 127, the CPU 101 selects in a desired manner another rule (a different large group) differing from the rule of the large group to which the musical piece content currently being played back belongs and changes to play back desired musical piece content in the desired small group contained in the large group according to the changed rule (step S87).

Then, the CPU 101 displays the changed rule, for example, the "artist" on the screen 119D of the LCD display section 119 (step S88). Then, the process returns to step S85, and the operation of the rule/mode button 127 is monitored.

When it is determined in step S86 that the rule/mode button 127 is not depressed two times continuously, the CPU 101 determines whether or not the rule/mode button 127 is depressed for a long time (step S91 in FIG. 18). When it is determined in step S91 that the rule/mode button 127 is not depressed for a long time, the CPU 101 determines that the operation is a normal depressing operation, and plays back the desired content of a desired small group other than the small group containing the content being played back in the large group to which the content currently being played back belongs (step S92). Then, the process returns to step S85, and the depressing operation of the rule/mode button 127 is monitored.

When it is determined in step S91 that the operation is a long depressing operation of the rule/mode button 127, the CPU 101 performs control so that, in the large group of the rule currently being selected, the intros of a plurality of pieces of musical content for each musical piece selected from each of a plurality of small groups other than the small group to which the content currently being played back belongs are sequentially played back and output in a desired sequence of provision (step S93).

Then, the CPU 101 waits for the rule/mode button 127 to be depressed again by the user (step S94), and continues the sequential playback of the intros of the musical piece content of one musical piece selected from each of the plurality of small groups until another depressing operation is performed. In this case, if the intro playback for each musical piece from all the target small groups is completed, the same intros may be repeatedly played back. In this embodiment, another desired musical piece is selected in sequence from all the target small groups and the intro thereof is played back.

Then, when it is determined in step S94 that the rule/mode button 127 is depressed again, the CPU 101 performs control so that the sequential playback of the intros is stopped, the musical piece content of the small group, whose intro is being played back when the depressing operation was performed, is kept, and the entire content of the musical piece is played back (step S95). Thereafter, the process proceeds to step S85, and the CPU 101 returns to the state in which the depressing operation of the rule/mode button 127 is monitored.

When it is determined in step S85 that the rule/mode button 127 is not depressed or only the rule/mode button 127 is not depressed, the CPU 101 determines whether or not only the track button 126 is depressed (step S101 in FIG. 19). When it is determined in step S101 that the track button 126 is not depressed or only the track button 126 is not depressed, the CPU 101 determines whether or not the rule/mode button 127 and/or the track button 126 are depressed simultaneously (step S102). When it is determined that the rule/mode button 127 and the track button 126 are not depressed simultaneously, the process returns to step S85, and the depressing operation of the rule/mode button 127 is monitored.

When it is determined in step S102 that the rule/mode button 127 and the track button 126 are depressed simultaneously, the CPU 101 switches off the power supply of the content providing apparatus 3 (step S103), and the processing routine is completed.

When it is determined in step S101 that the track button 126 is depressed, a determination is made as to whether or not the depressing operation is a long depression (step S104). When it is determined in step S104 that the depressing operation of the track button 126 is not a long depression, the CPU 101 determines that the operation of the track button 126 is a normal one depressing operation, selects desired musical piece content differing from the musical piece content currently being played back from the small group containing the musical piece content currently being played back, and reads the selected content from the hard disk device 110. Then, the CPU 101 transfers the read content to the content decoding section 107, and sound is played back from the speaker 113 in the manner described above (step S105). Thereafter, the process returns to step S85, and the depressing operation of the rule/mode button 127 is monitored.

When it is determined in step S104 that the depressing operation of the track button 126 is a long depression, the CPU 101 performs control so that the intros of a plurality of the other musical piece content excluding the content currently being played back in the small group containing the content currently being played back are sequentially played back and output in a desired sequence of provision (step S106).

Then, the CPU 101 waits for the track button 126 to be depressed again by the user (step S107) and continues the sequential playback of the intros until another depressing operation is performed. When it is determined in step S107 that another depressing operation of the track button 126 is performed, the CPU 101 performs control so that the sequential playback of the intros is stopped, the musical piece content whose intro was being played back when the depressing operation was performed is kept, and the entire content of the musical piece is played back (step S108). Thereafter, the process proceeds to step S85, and the depressing operation of the rule/mode button 127 is monitored.

Fourth Embodiment of the Content Providing Apparatus

The hardware configuration of a content providing apparatus 4 of the fourth embodiment is identical to that of the third embodiment. Also, a large amount of pieces of content stored in the hard disk device 110 is divided into a plurality of large groups by using a plurality of rules, such as the genre, the artist, the album, etc., similarly to the third embodiment, and the content is managed in such a way that a plurality of small groups are formed in each large group.

In the content providing apparatus 4 of the fourth embodiment, it is not that the rule for grouping is changed in a desired manner by operating the rule button 125 and/or the rule/mode button 127, but a shortcut button capable of directly selecting a rule for each grouping is used.

For this reason, the operation button section 114 of the content providing apparatus 4 of the fourth embodiment includes a button (shortcut button) corresponding to each of the rules for grouping, and also includes a track button similar to that described above.

Figure 20:
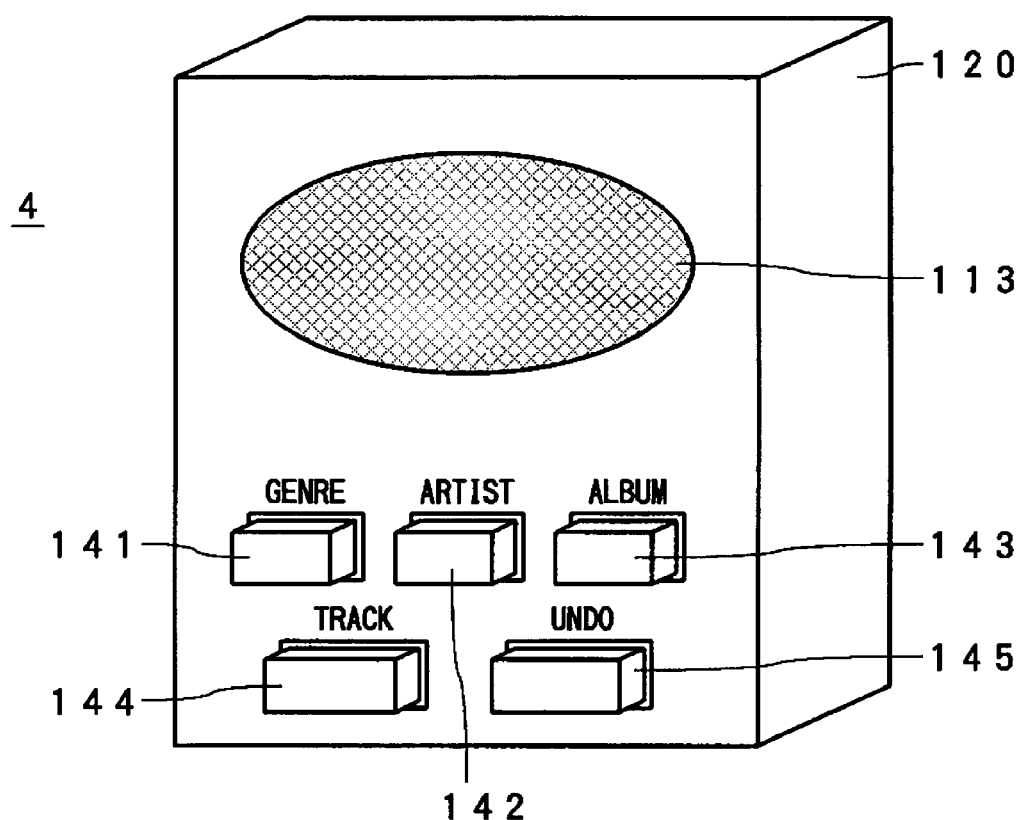
FIG. 20 show an example of the exterior configuration of a content providing apparatus according to a fourth embodiment of the present invention.
Figure 21:
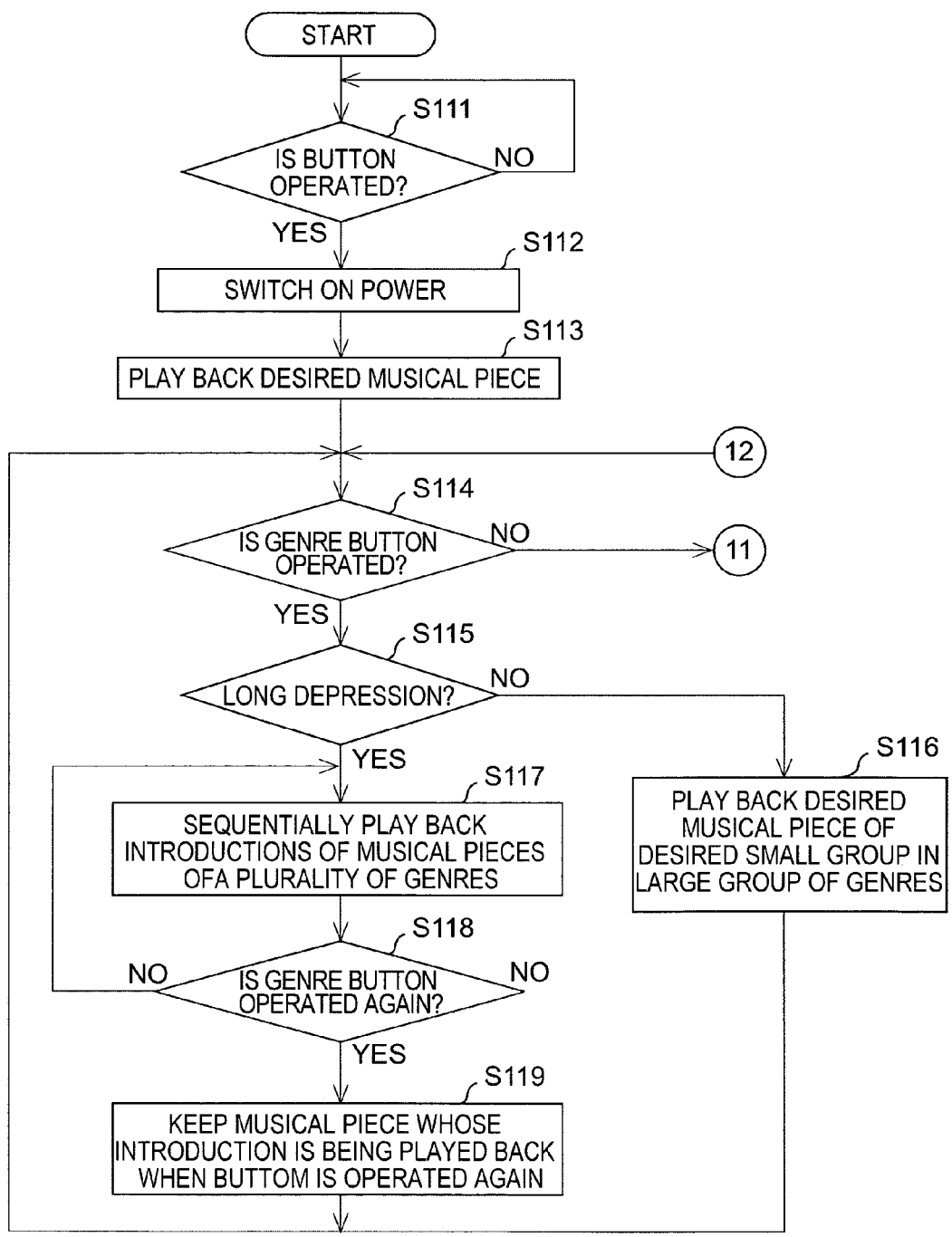
FIG. 21 shows a portion of the flowchart illustrating the processing operation in the content providing apparatus according to the fourth embodiment of the present invention.

FIG. 20 shows an example of the exterior configuration of the content providing apparatus 4 of the fourth embodiment. In the example of FIG. 20, as shortcut buttons, a genre button 141, an artist button 142, and an album button 143 are provided, and also, a track button 144 is provided similarly to the third embodiment. Furthermore, in the fourth embodiment, an undo button 145 for returning the playback state in the content providing apparatus 4 to the preceding operation state is provided.

FIGS. 21 to 24 are flowcharts illustrating the processing operation based on the operation of the operation buttons 141 to 145 in the content providing apparatus 4 of the fourth embodiment.

In the content providing apparatus 4 of this example, even in the state in which the power supply is switched off, power is supplied to the parts including the CPU 101 for detecting that the operation buttons 141 to 145 are operated, so that whether or not the operation buttons 141 to 145 are operated by the user is always monitored (step S111).

When it is determined in step S111 that any one of the operation buttons 141 to 145 is depressed in the state in which the power supply is switched off, the CPU 101 performs control so that power is supplied to the entire content providing apparatus 4 because the operation is an operation from the switched-off state (step S112). The depressing operation mode of the operation button detected as being depressed in step S111 may be any depressing operation mode.

When the power supply is switched on, the CPU 101 reads the content data of a desired musical piece from the hard disk device 110 and transfers the content data to the content decoding section 107. Then, in the content decoding section 107, the received content data is decoded, and a digital audio signal, which is a decoded result, is sent to the D-A conversion circuit 111. In the D-A conversion circuit 111, the digital audio signal is converted into an analog audio signal, the analog audio signal is supplied to the speaker 113 via the amplifier 112, and sound is played back (step S113).

When the user does not like the played-back musical piece, the user requests the playback of another musical piece by operating one of the shortcut buttons 141 to 143 or the track button 144. When the user feels that the immediately preceding musical piece is more desirable, the user operates the undo button 145. In this example, the operation of switching off the power supply is defined as a long depressing operation of the undo button 145.

The CPU 101 determines whether or not the genre button 141 is depressed (step S114). When it is determined that the genre button 141 is depressed, the CPU 101 determines whether or not the depressing operation is a long depression (step S115).

When it is determined in step S115 the depressing operation is not a long depression, the CPU 101 performs control so that, in the large group 10 of the genre shown in FIG. 12, a musical piece differing from that currently being played back, which is a desired musical piece in the small group of a desired genre from among the small groups 11 to in of a plurality of genres is played back (step S116). Thereafter, the process returns to step S114, and the depressing operation of the genre button 141 is monitored.

When it is determined in step S115 that the operation is a long depressing operation, the CPU 101 sequentially plays back the intros of a plurality of musical pieces selected in a desired manner for each musical piece from each of the small groups 11 to in of a plurality of genres in the large group 10 of the genre (step S117).

Then, the CPU 101 waits for the genre button 141 to be depressed again by the user (step S118), and continues the sequential playback of the intros of the plurality of pieces of musical content selected for each musical piece from each of the plurality of small groups until another depressing operation is performed. In this case, if the intro playback for each musical piece from all the target small groups is completed, the same intros may be repeatedly played back. In this embodiment, another desired musical piece is selected from all the target small groups and the intro thereof is played back.

When it is determined in step S118 that the genre button 141 is depressed again, the CPU 101 performs control so that the sequential playback of the intros is stopped, the musical piece content of the genre in the small group, whose intro was being played back when the depressing operation was performed is kept, and the entire content of the musical piece is played back (step S119). Thereafter, the process proceeds to step S114, and the depressing operation of the genre button 141 is monitored.

Figure 22:
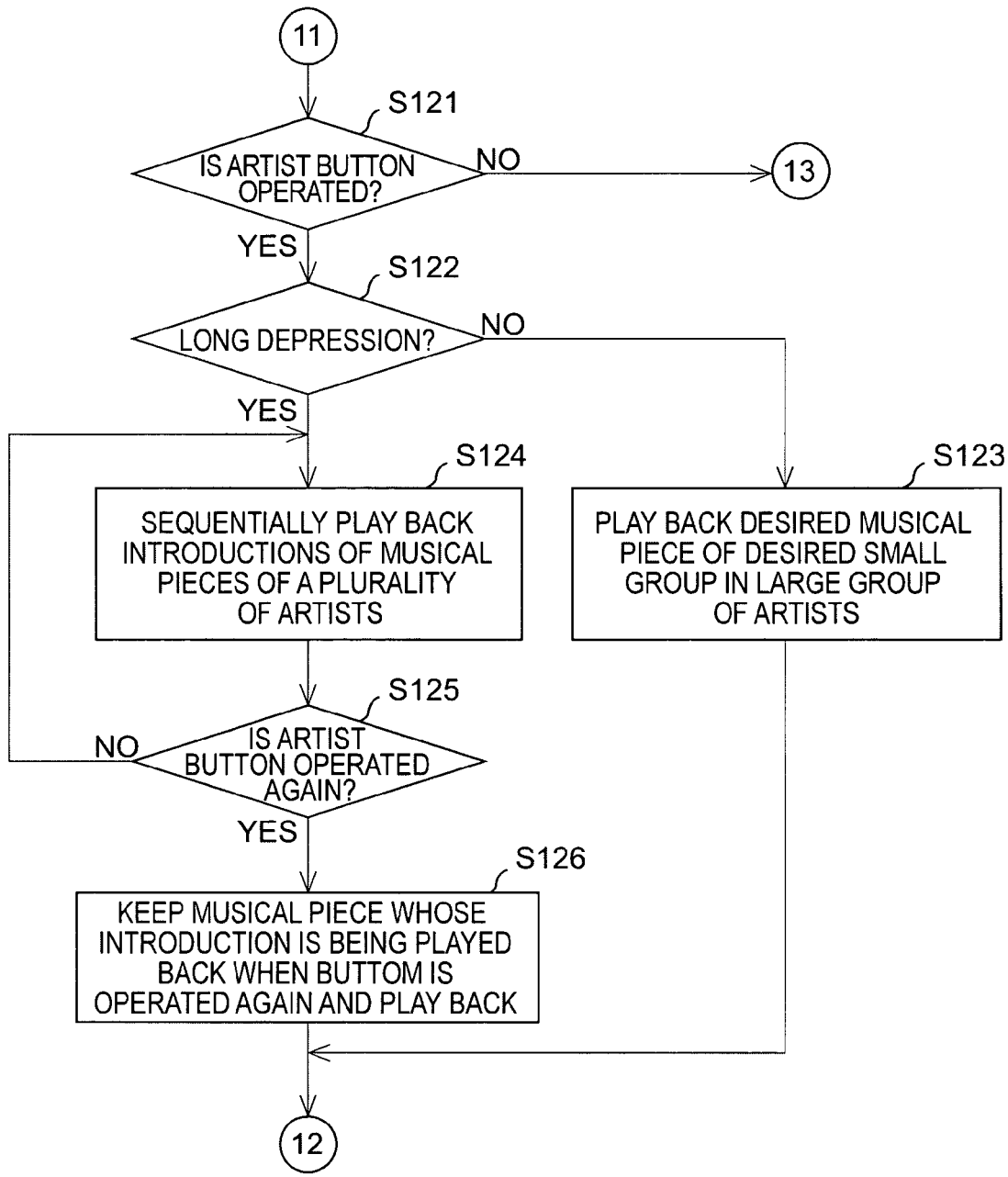
FIG. 22 shows a portion of the flowchart illustrating the processing operation in the content providing apparatus according to the fourth embodiment of the present invention.

When it is determined in step S114 that the genre button 141 is not depressed, the CPU 101 determines whether or not the artist button 142 is depressed (step S121 in FIG. 22).

When it is determined in step S121 that the artist button 142 is depressed, the CPU 101 determines whether or not the depressing operation is a long depression (step S122). When it is determined in step S122 that the depressing operation is not a long depression, the CPU 101 performs control so that, in the large group 20 of the artist shown in FIG. 12, a musical piece differing from that currently being played back, which is a desired musical piece in the small group of a desired artist among the small groups 21 to 2n of a plurality of artists, is played back (step S123). Thereafter, the process returns to step S114, where the CPU 101 returns to the process of monitoring the depressing operation of the genre button 141.

When it is determined in step S122 that the depressing operation is a long depressing operation, the CPU 101 sequentially plays back, in a desired sequence of provision, the intros of a plurality of musical pieces selected in a desired manner for each musical piece from each of the small groups 21 to 2m of a plurality of artists in the large group 20 of the artist (step S124).

Then, the CPU 101 waits for the artist button 142 to be depressed again by the user (step S125), and continues the sequential playback of the intros of a plurality of pieces of musical content selected for each musical piece from each of the plurality of small groups until another depressing operation is performed. In this case, if the intro playback for each musical piece from all the target small groups is completed, the same intros may be repeatedly played back. In this embodiment, another desired musical piece is selected from all the target small groups and the intro thereof is played back.

When it is determined in step S125 that another depressing operation of the artist button 142 is performed, the CPU 101 performs control so that the sequential playback of the intros is stopped, the musical piece content of the artist in the small group, whose intro was being played back when the depressing operation was performed is kept, and the entire musical piece content is played back (step S126). Thereafter, the process proceeds to step S114, and the depressing operation of the genre button 141 is monitored.

Figure 23:
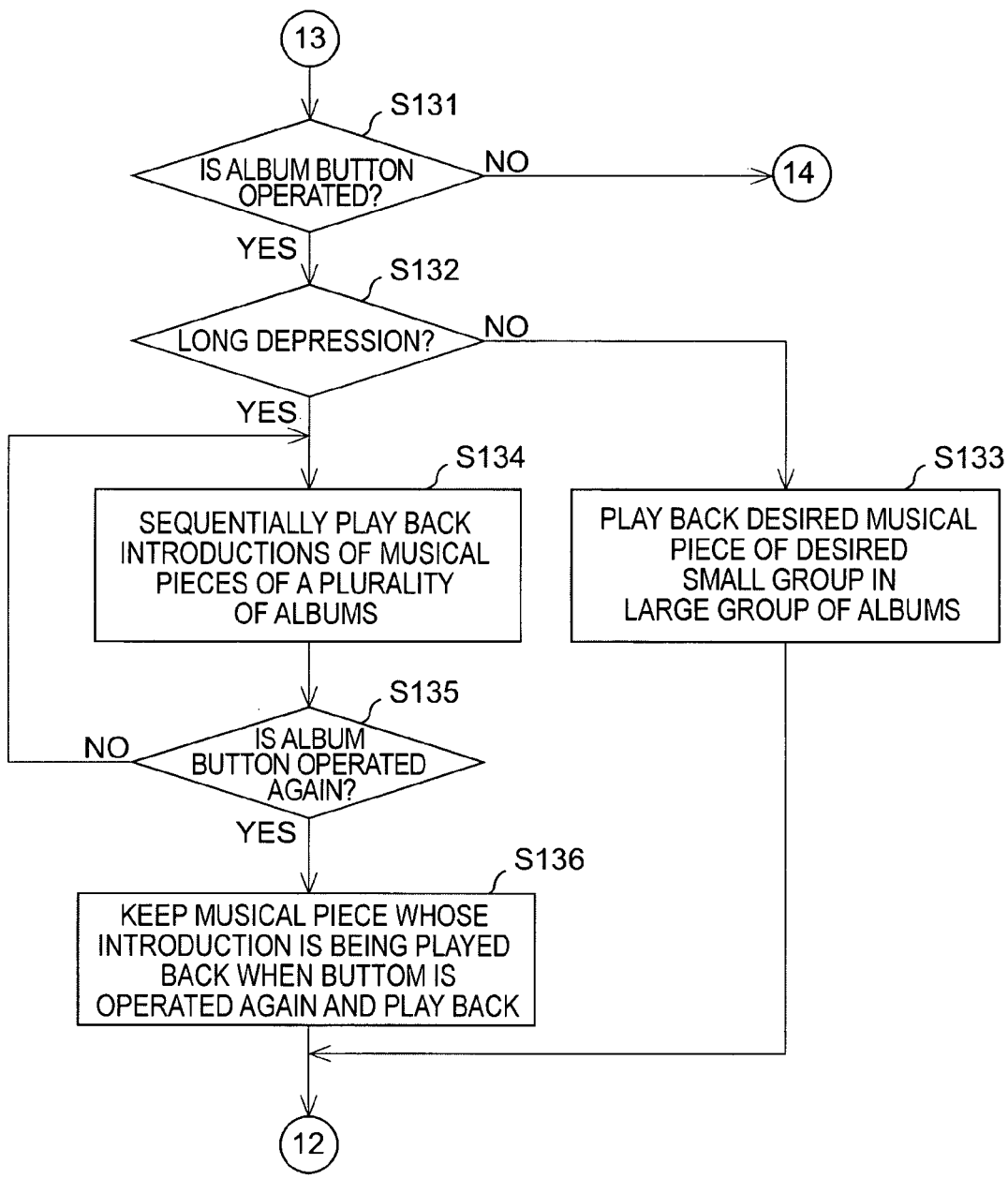
FIG. 23 shows a portion of the flowchart illustrating the processing operation in the content providing apparatus according to the fourth embodiment of the present invention.
Figure 24:
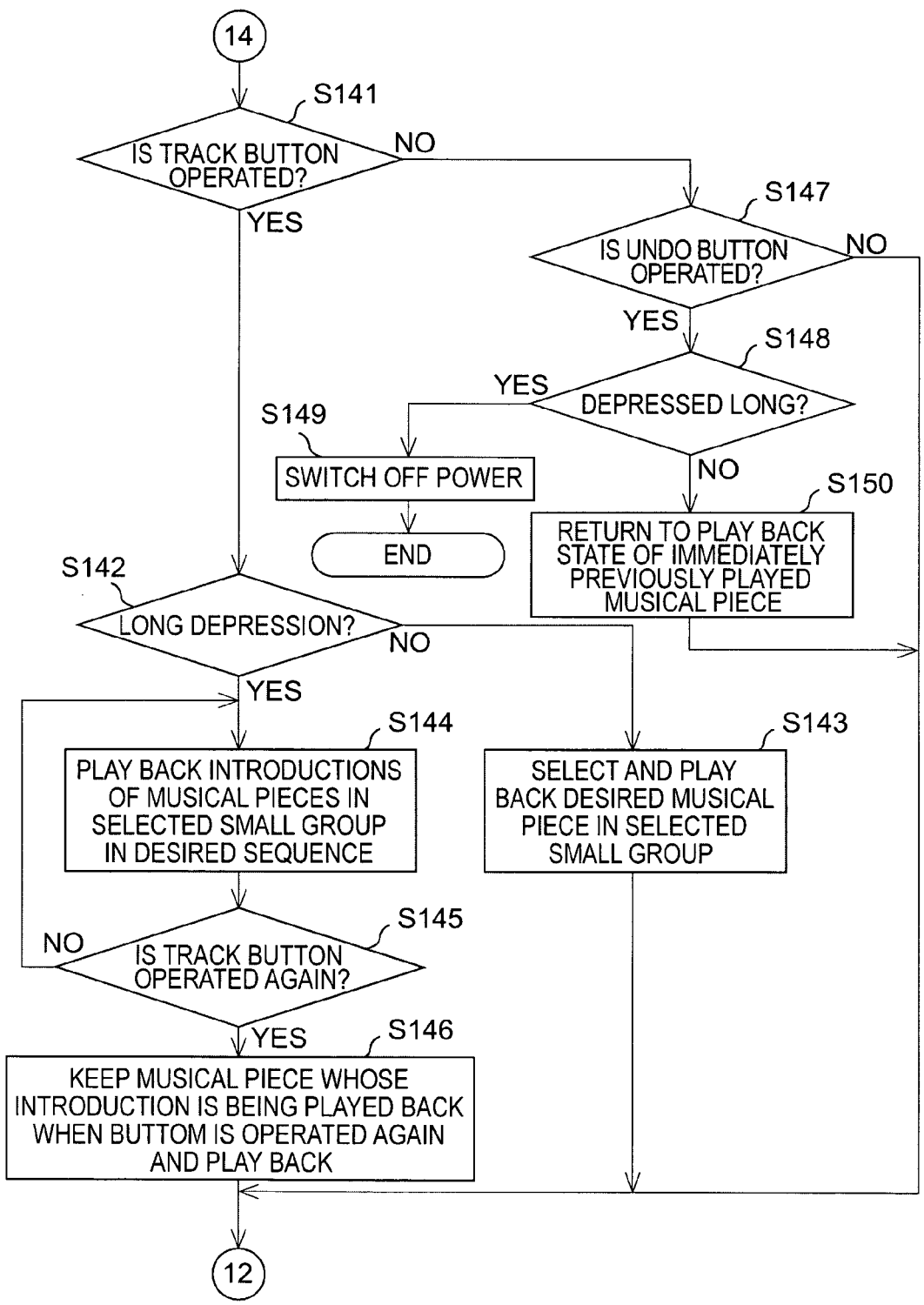
FIG. 24 shows a portion of the flowchart illustrating the processing operation in the content providing apparatus according to the fourth embodiment of the present invention.

When it is determined in step S121 that the artist button 142 is also not depressed, the CPU 101 determines whether or not the album button 143 is depressed (step S131 in FIG. 23).

When it is determined in step S131 that the album button 143 is depressed, the CPU 101 determines whether or not the depressing operation is a long depression (step S132). When it is determined in step S132 that the depressing operation is not a long depression, the CPU 101 performs control so that a musical piece different from that of the musical piece content currently being played back, which is a desired musical piece in the small group of a desired album from among the small groups 31 to 3k of a plurality of albums in the large group 30 of the album shown in FIG. 12 is played back (step S133). Thereafter, the process returns to step S114, where the CPU 101 returns to the state of monitoring the depressing operation of the genre button 141.

When it is determined in step S132 that the operation is a long depressing operation, the CPU 101 sequentially plays back a plurality of intros selected in a desired manner for each musical piece from each of the small groups 31 to 3k of a plurality of albums in a desired sequence (step S134).

Then, the CPU 101 waits for the album button 143 to be depressed again by the user (step S135) and continues the sequential playback of the intros of a plurality of pieces of musical content selected for each musical piece from each of the plurality of the small groups until another depressing operation is performed. In this case, if the intro playback for each musical piece from all the target small groups is completed, the same intros may be repeatedly played back. In this embodiment, another individual desired musical pieces are selected from all the target small groups and the intro thereof is played back.

Then, when it is determined in step S135 that the album button 143 is depressed again, the CPU 101 performs control so that the sequential playback of the intros is stopped, the musical piece content of the album in the small group, whose intro was being played back when the depressing operation was performed is kept, and the entire content of the musical piece is played back (step S136). Thereafter, the process proceeds to step S114, where the CPU 101 returns to the state of monitoring the depressing operation of the genre button 141.

When it is determined in step S141 that the track button 144 is depressed, the CPU 101 determines whether or not the depressing operation is a long depression (step S142). When it is determined in step S142 that the depressing operation is not a long depression, the CPU 101 determines that the operation of the track button 144 is a normal one depressing operation, selects desired musical piece content differing from the musical piece content currently being played back from the small group containing the musical piece content currently being played back, and reads the selected content from the hard disk device 110. Then, the read content is transferred to the content decoding section 107, and in the manner described above, sound is played back from the speaker 113 (step S143). Thereafter, the process returns to step S114, where the CPU 101 returns to the state of monitoring the depressing operation of the genre button 141.

Furthermore, when it is determined in step S142 that the depressing operation of the track button 144 is a long depression, the CPU 101 performs control so that the intros of a plurality of pieces of musical content excluding the content currently being played back in the small group containing the content currently being played back are sequentially played back and output in a desired sequence of provision (step S144).

Then, the CPU 101 waits for the track button 144 to be depressed again by the user (step S145) and continues the sequential playback of the intros until another depressing operation of the track button 144 is performed. When it is determined in step S145 that another depressing operation of the track button 144 is performed, the CPU 101 performs control so that the sequential playback of the intros is stopped, the musical piece content, whose intro is being played back when the depressing operation is performed is kept, and the entire musical piece content is played back (step S146). Thereafter, the process proceeds to step S114, where the CPU 101 returns to the state of monitoring the depressing operation of the genre button 141.

When it is determined in step S141 that the track button 144 is also not depressed, the CPU 101 determines whether or not an undo button 145 is depressed (step S147). When it is determined in step S147 that the undo button 145 is not depressed, the process proceeds to step S114, where the CPU 101 returns to the state of monitoring the depressing operation of the genre button 141.

When it is determined in step S147 that the undo button 145 is depressed, the CPU 101 determines whether or not the depressing operation is a long depression (step S148). When it is determined that the depressing operation is a long depression, the power supply is switched off (step S149), and the processing routine is completed.

When it is determined in step S148 that the depressing operation is not a long depression, the CPU 101 performs control so that the state is returned to the playback state immediately before the playback state when the undo button 145 was depressed (step S150). Therefore, in the content providing apparatus 4, the content identification information in the playback state at least one before to the current playback state is always stored. By storing in advance all the content identification information in the playback state two or more before the current playback state rather than the preceding playback state, it is possible to return to the playback state up to the previously stored state.

After step S150, the CPU 101 returns to the state of monitoring the depressing operation of the genre button 141 in step S114.

Fifth Embodiment

The content providing apparatuses 1 to 4 of the above-described embodiments each include large-capacity storage means, for example, a hard disk device, so that content read from the hard disk device is controlled in response to the operation of the operation button. However, recently, the content providing apparatus does not include large-capacity storage means, but receives content from a content server apparatus in a communication network, such as the Internet, and plays back the content.

In a system that distributes content via such a communication network, the content providing apparatus includes the above-described one or more operation buttons, and makes a content obtaining request in response to the operation of the operation button. The content providing server apparatus makes a determination as to whether or not the request is a content obtaining request based on what kind of operation of the operation button, and distributes the content to the content providing apparatus on the basis of the determination result.

The fifth embodiment is an example when the present invention is applied to such a content providing system, and is an embodiment corresponding to the first embodiment. FIG. 25 is a block diagram showing an example of the configuration of the content providing system of the fifth embodiment.

As shown in FIG. 25, the content providing system of this embodiment is configured in such a way that a content server apparatus 51 and a content reception terminal 52 serving as a content providing apparatus are connected to each other via a communication network 53, such as the Internet.

The content server apparatus 51 is formed of, for example, a personal computer. A program ROM 202, a work area RAM 203, a content database memory 204, a storage data management section 205, a transmission and reception data processing section 206, and a communication interface 207 are connected to a CPU 201 via a system bus 200.

The content database memory 204 is formed of, for example, a hard disk device, a semiconductor memory device, and another large-capacity storage device, in which a large amount of content is grouped and stored similarly to the first to fourth embodiments. The storage data management section 205 group-manages content data stored in the content database memory 204 similarly to the storage data management section 105 of the first to fourth embodiments.

The transmission and reception data processing section 206 performs processing for receiving a content obtaining request from the content reception terminal 52, sent from the communication network 53, and performs processing for generating transmission data of content data to be transmitted to the content reception terminal 52 via the communication network 53. The communication interface 207 is used for connection with the communication network 53.

The content reception terminal 52 includes a microcomputer. A program ROM 302, a work area RAM 303, a playback content buffer 304, a content decoding section 305, a transmission and reception data processing section 306, a communication interface 307, and a button input interface 308 are connected to a CPU 301 via a system bus 300.

A button operation section 314 is connected to the button input interface 308. The button operation section 314 is configured similarly to the button operation section 114. The communication interface 307 is connected to the communication network 53.

A D-A conversion circuit 311 is connected to the content decoding section 305. An analog audio signal from the D-A conversion circuit 311 is supplied to a speaker 313 via an amplifier 312.

In the fifth embodiment, the button operation section 314 of the content reception terminal 52 is formed of one operation button. Therefore, the exterior of the content reception terminal 52 in the case of the fifth embodiment is exactly identical to that shown in FIG. 2A in the case of the first embodiment.

On the other hand, in the content database memory 204 of the content distribution server apparatus 51, similarly to the hard disk device 110 of the first embodiment, content is grouped and stored according to the genre, and is managed by the storage data management section 205.

Figure 26:
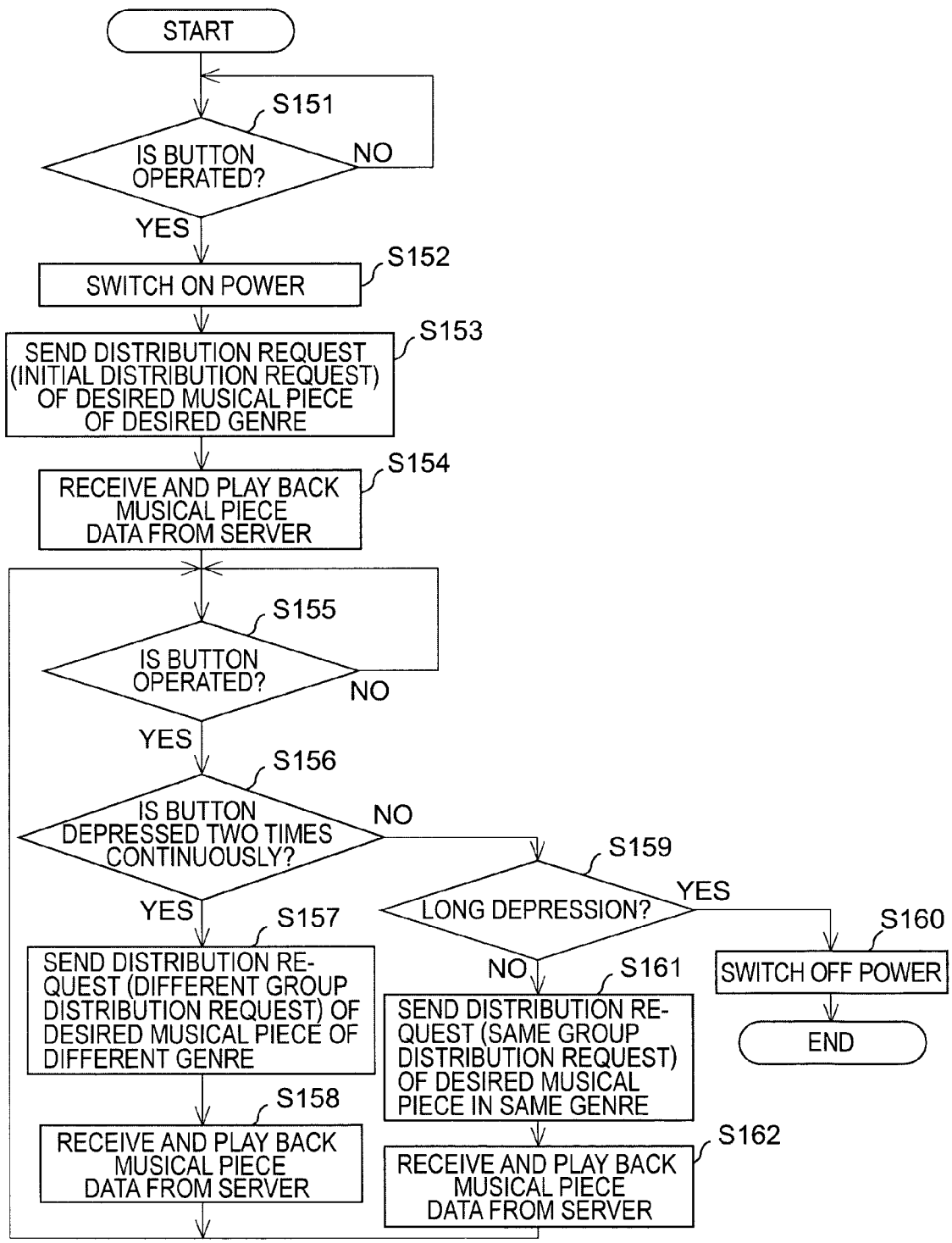
FIG. 26 shows a flowchart illustrating the processing operation in the content providing system according to the fifth embodiment of the present invention.
Figure 27:
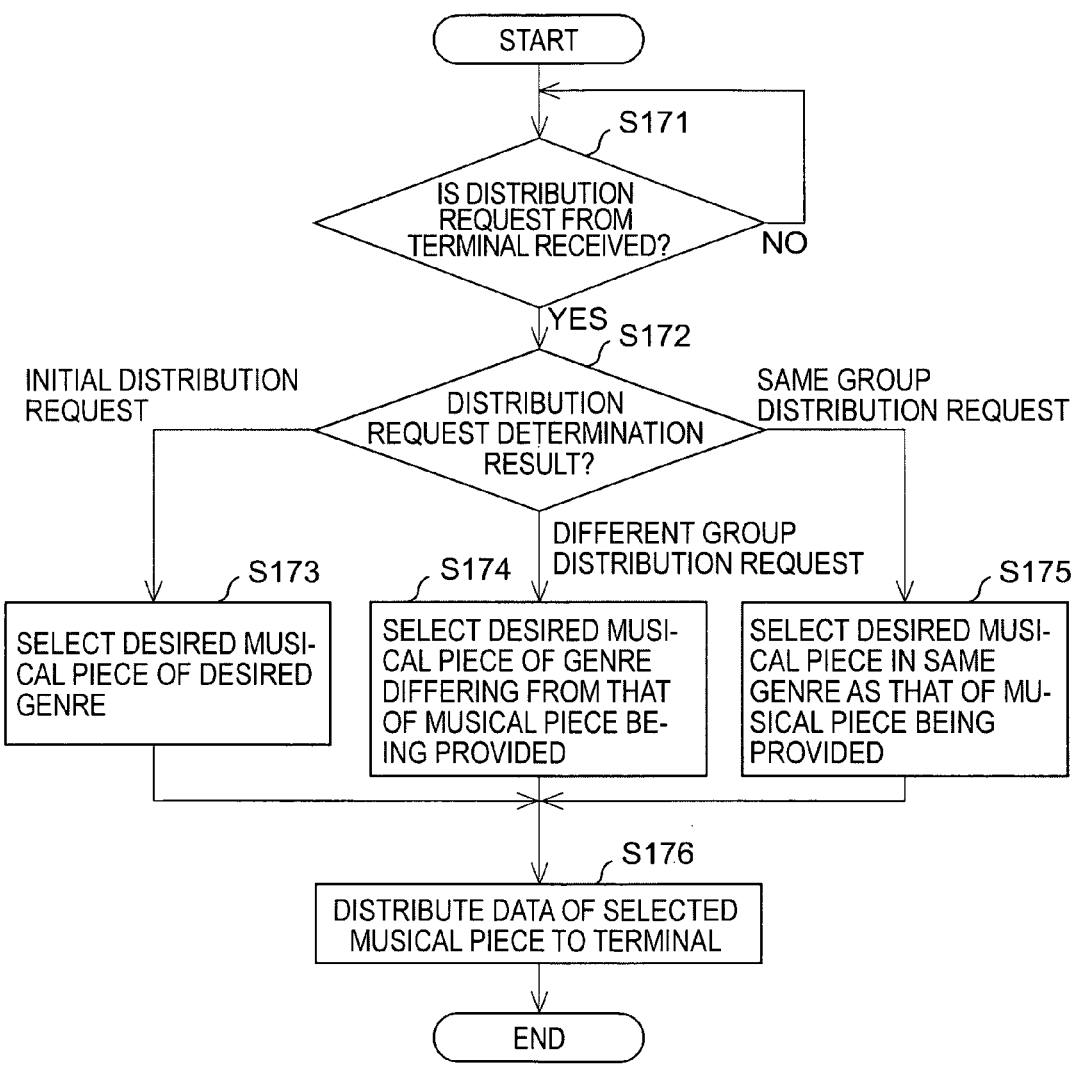
FIG. 27 shows a flowchart illustrating the processing operation in the content providing system according to the fifth embodiment of the present invention.

The operation of the server apparatus 51 and the content reception terminal 52 of the fifth embodiment is described with reference to the flowcharts in FIGS. 26 and 27. FIG. 26 is a flowchart of the operation based on the operation of one operation button in the content reception terminal 52. FIG. 27 is a flowchart of the corresponding processing operation in the content distribution server apparatus 51.

In the following description, a description is given by assuming that the exterior of the content reception terminal 52 is identical to that of FIG. 2A and the button operation section 314 includes one operation button 121.

In the content reception terminal 52 of this embodiment, even in the state in which the power supply is switched off, power is supplied to the parts including the CPU 301 for detecting that the operation button 121 is operated, so that whether or not the operation button 121 is operated by the user is always monitored (step S151).

Then, in the operation of monitoring the operation of the operation button 121 in the switched-off state in step S151, when it is determined that the operation button 121 is depressed, the CPU 301 performs control so that power is supplied to the entire content providing apparatus 1 because it is an operation from the switched-off state (step S152). The depressing operation mode of the operation button 121 at this time may be any depressing operation mode.

Then, when the power supply is switched on, under the control of the CPU 301, the transmission and reception data processing section 306 generates a distribution request (this distribution request is hereinafter referred to as an "initial distribution request") of a desired musical piece of a desired genre, and sends the initial distribution request to the server apparatus 51 via the communication network 53 (step S153). In this case, in all the distribution requests sent from the content reception terminal 52 to the server apparatus 51, the identification information of the content reception terminal 52 is contained. The same applies hereinafter.

With respect to the initial distribution request, since the data of the musical piece content is sent from the server apparatus 51, the transmission and reception data processing section 306 receives the musical piece content data via the communication interface 307 and transfers the musical piece content data to the playback content buffer 304. The musical piece content data transferred to the playback content buffer 304 is sent to the content decoding section 305, whereby the musical piece content data is decoded into a digital audio signal under the control of the CPU 301. Then, the decoded digital audio signal is converted into an analog audio signal by the D-A conversion circuit 311, the analog audio signal is supplied to the speaker 313 via the amplifier 312, and sound is played back (step S154).

When the user does not like the played-back musical piece, the user operates the operation button 121 to request the playback of another musical piece. There are two operation modes of the operation button 121 at that time. When it is desired to maintain the same atmosphere as that of the musical piece currently being played back, the operation button 121 is operated once for a short time as in the normal case, and when it is desired to change the atmosphere to an atmosphere differing from that of the musical piece currently being played back, the operation button 121 is depressed two times continuously.

Accordingly, the CPU 301 determines whether or not the operation button 121 is depressed (step S155). When it is determined that the operation button 121 is depressed, the CPU 301 determines whether or not the operation is a two-time continuous depressing operation (step S156).

When it is determined in step S156 that the operation is a two-time continuous depressing operation, the CPU 301 controls the transmission and reception data processing section 306 so as to generate a distribution request (hereinafter, this distribution request is referred to as a different group distribution request) for requesting the distribution of desired musical piece content differing from the musical piece content currently being played back from the genre (group) differing from that of the musical piece content currently being played back, and allows the server apparatus 51 to transmit the different group distribution request (step S157).

In the different group distribution request, not only the identification information of the content reception terminal 52, but also the identification information of the musical piece content currently being played back is contained.

With respect to this different group distribution request, the data of the musical piece content corresponding thereto is sent from the server apparatus 51. Therefore, the transmission and reception data processing section 306 receives the musical piece content data via the communication interface 307 and transfers the musical piece content data to the playback content buffer 304. Then, similarly to step 154 above, the transmission and reception data processing section 306 converts the received musical piece content data into an analog audio signal, supplies it to the speaker 313 via the amplifier 312, and sound is played back (step S158). Thereafter, the process returns to step S155, where another depressing operation of the operation button 121 is monitored.

When it is determined in step S156 that the operation is not a two-time continuous depressing operation, the CPU 301 determines whether or not the depressing operation of the operation button 121 is a long depression (step S159). When it is determined that the operation is a long depression, the content reception terminal 52 is switched off (step S160), and the processing routine is completed.

When it is determined in step S159 that it is not a long depression, the CPU 301 determines that the operation is a normal one depressing operation, controls the transmission and reception data processing section 306 so as to generate a same group distribution request for requesting the distribution of desired musical piece content differing from the musical piece content currently being played back from the same genre as that of the musical piece content currently being played back, and transmits the same group distribution request to the server apparatus 51 (step S161).

In the same group distribution request, not only the identification information of the content reception terminal 52, but also the identification information of the musical piece content currently being played back is contained.

With respect to the same group distribution request, the data of the musical piece content corresponding thereto is sent from the server apparatus 51. Therefore, the transmission and reception data processing section 306 receives the musical piece content data via the communication interface 307 and transfers it to the playback content buffer 304. Then, similarly to step 154 above, the data of the received musical piece content is converted into an analog audio signal and is supplied to the speaker 313 via the amplifier 312, and sound is played back (step S162). Thereafter, the process returns to step S155, where a further depressing operation of the operation button 121 is monitored.

Next, a description will be given of the processing operation of the server apparatus 51 with reference to the flowchart in FIG. 27. That is, the CPU 201 of the server apparatus 51 monitors the reception of the distribution request from the content reception terminal 52 (step S171). When it is determined that the distribution request from the content reception terminal 52 is received, the CPU 201 determines as to which of the three types of distribution requests the distribution request is (step S172).

When the determination result of step S172 shows that the request is an initial distribution request, the CPU 201 selects and reads desired musical piece content of a desired genre from the content database memory 204 (step S173) and distributes the desired musical piece content to the content reception terminal 52 that has requested the distribution (step S176).

When the determination result of step S172 shows that the request is a different group distribution request, the CPU 201 selects desired musical piece content of a different desired genre differing from that of the content currently being played back on the basis of the identification information of the content currently being played back, contained in the received different group distribution request, reads the desired musical piece content from the content database memory 204 (step S174), and distributes it to the content reception terminal 52 that has requested the distribution (step S176).

When the determination result of step S172 shows that the request is a same group distribution request, the CPU 201 selects content differing from the content currently being played back, which is desired musical piece content of the same genre as that of the content currently being played back, on the basis of the identification information of the content currently being played back contained in the received same group distribution request, reads the content from the content database memory 204 (step S175), and distributes it to the content reception terminal 52 that has requested the distribution (step S176).

This completes the processing routine of the content distribution in the server apparatus 51.

In the foregoing description, when the content reception terminal 52 sends a content distribution request to the server apparatus 51, the identification information of the content being played back, which was distributed previously, is contained in the content distribution request. However, when the server apparatus 51 has stored the identification information of the musical piece content that was distributed previously to each of the content reception terminals 52, the identification information of the musical piece content currently being played back needs not to be contained in the same group distribution request. The reason for this is as follows. In this case, the server apparatus 51 can confirm the identification information of the musical piece content that was distributed previously to the terminal that has requested the distribution by referring to the storage information, and based on the identification information of the musical piece content, the group of the musical piece content to be distributed next and the distribution content can be selected.

Sixth Embodiment

The sixth embodiment is an embodiment in the case of a content providing system formed of a content providing server apparatus and a content reception terminal similarly to the fifth embodiment, and the hardware configuration is identical to that shown in FIG. 25.

The sixth embodiment is concerned with a case in which the button operation section 314 provided in the content reception terminal includes a genre button 122 and a track button 123 similarly to that shown in FIG. 5. That is, the sixth embodiment is an embodiment of a content providing system corresponding to the second embodiment of the content providing apparatus.

In the sixth embodiment, the depressing operation of the normal length of the genre button 122 is assumed as an input of the meaning "the genre of the musical piece content currently being distributed differs from the genre desired by the user", and a long depressing operation longer than or equal to, for example, three seconds, of the genre button 122 is assumed as a request for changing from the switched-on state to the switched-off state.

The depressing operation of the normal length of the track button 123 is assumed as an input of the meaning "the genre of the content of the musical piece currently being distributed is the same and is good, but it differs from the content of the musical piece desired by the user". Furthermore, a long depressing operation longer than or equal to, for example, three seconds, of the track button 123 is assumed as an input of the same meaning as the depressing operation of the normal length of the track button 123. However, the processing in the content reception terminal 52 with respect to the above differs from the depressing process of the normal length.

More specifically, in the content reception terminal 52 of the sixth embodiment, when the track button 123 is depressed for a long time, a distribution request for requesting the sequential distribution in a desired sequence of only a portion of each of the plurality of pieces of musical content contained in the same genre as the genre of the content of the musical piece currently being played back, for example, the intro portion (the intro portion of the music, hereinafter this is referred to as an "intro"), is sent to the server apparatus 51.

Then, when the track button 123 is depressed again by the user while the intros of the musical piece content are sequentially being played back, the content reception terminal 52 sends the request for distributing the entire data of the content being played back when the depressing operation was performed to the server apparatus.

Figure 28:
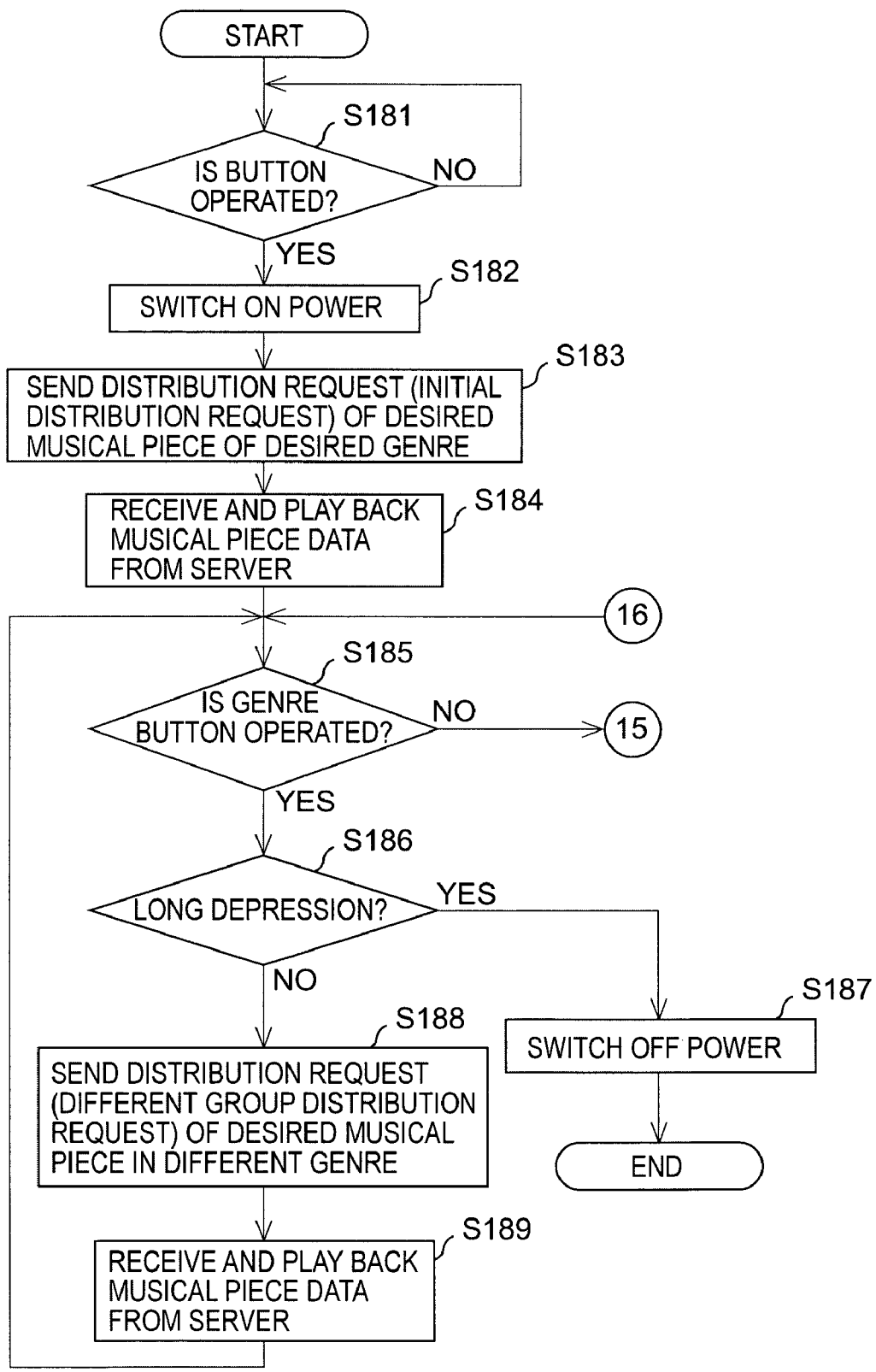
FIG. 28 shows a portion of the flowchart illustrating the processing operation in a content providing system according to a sixth embodiment of the present invention.
Figure 29:
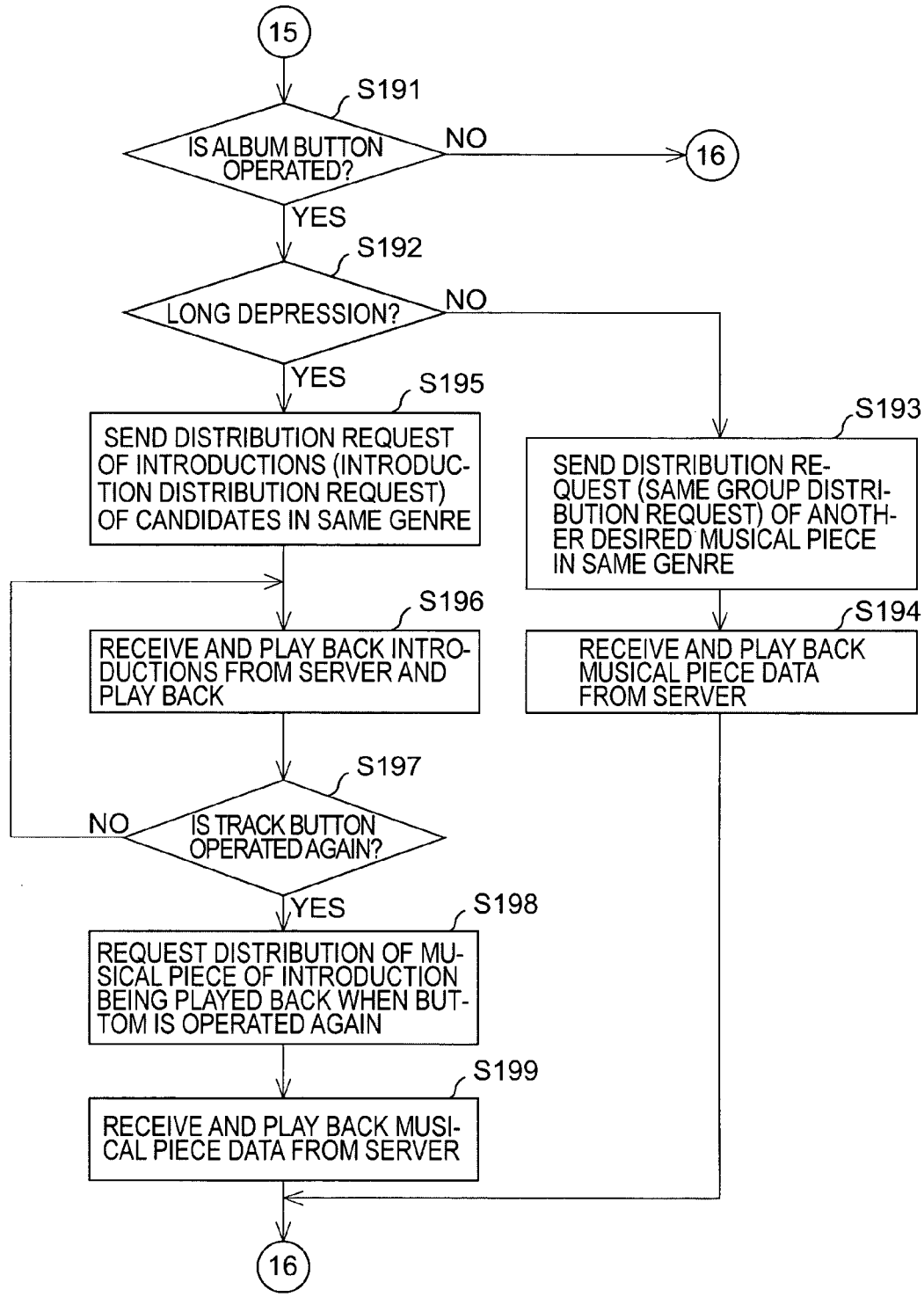
FIG. 29 shows a portion of the flowchart illustrating the processing operation in the content providing system according to the sixth embodiment of the present invention.

FIGS. 28 and 29 are flowcharts illustrating the processing operation based on the operation of the genre button 122 and the track button 123 in the content reception terminal 52 of the content providing system of the sixth embodiment.

In the content reception terminal 52 of the sixth embodiment, even in the state in which the power supply is switched off, power is supplied to the parts including the CPU 301 for detecting that the genre button 122 and/or the track button 123 are operated, so that whether or not the genre button 122 and/or the track button 123 are operated by the user is always monitored (step S181).

In the operation of monitoring the operation of the genre button 122 and the track button 123 in the switched-off state in step S181 when it is determined that genre button 122 and/or the track button 123 are depressed, the CPU 301 performs control so that power is supplied to the entire content reception terminal 52 because it is an operation from the switched-off state (step S182). The operation button to be detected as being depressed in step S181 may be any one of the genre button 122 and the track button 123, and the depressing operation mode may be any depressing operation mode.

Then, when the power supply is switched on, under the control of the CPU 301, the transmission and reception data processing section 306 generates an initial distribution request of a desired musical piece of a desired genre and sends the initial distribution request to the server apparatus 51 via the communication network 53 (step S183). In this case, in the distribution request sent from the content reception terminal 52 to the server apparatus 51, the identification information of the content reception terminal 52 is contained. The same applies hereinafter.

With respect to the initial distribution request, since musical piece content data is sent from the server apparatus 51, the transmission and reception data processing section 306 of the content reception terminal 52 receives the musical piece content data via the communication interface 307 and transfers it to the playback content buffer 304. The musical piece content data transferred to the playback content buffer 304 is sent to the content decoding section 305 under the control of the CPU 301 and is decoded into a digital audio signal. Then, the decoded digital audio signal is converted into an analog audio signal by the D-A conversion circuit 311 and is supplied to the speaker 313 via the amplifier 312, and sound is played back (step S184).

When the user does not like the played-back musical piece, the user operates the genre button 122 and/or the track button 123 to request the playback of another musical piece. As described above, there are two operation modes of the genre button 122 and the track button 123 at that time. When it is desired to maintain the same atmosphere as that of the musical piece currently being played back, the track button 123 is operated, and when it is desired to change the atmosphere to an atmosphere differing from that of the musical piece currently being played back, the genre button 122 is operated.

Accordingly, the CPU 301 determines whether or not the genre button 122 is depressed (step S185). When it is determined that the genre button 122 is depressed, a determination is made as to whether or not the operation is a long depression (step S186). When it is determined in step S186 that the genre button 122 is depressed for a long time, the CPU 301 switches off the content reception terminal 52 (step S187), and the processing routine is completed.

When it is determined in step S186 that the genre button 122 is not depressed for a long time, the CPU 301 controls the transmission and reception data processing section 306 so as to generate a different group distribution request that requests the distribution of desired musical piece content differing from the musical piece content currently being played back from the genre (group) different from that of the musical piece content currently being played back and so as to transmit the different group distribution request to the server apparatus 51 (step S188).

In the different group distribution request, not only the identification information of the content reception terminal 52, but also the identification information of the musical piece content currently being played back is contained.

With respect to the different group distribution request, since musical piece content data corresponding thereto is sent from the server apparatus 51, the transmission and reception data processing section 306 receives the musical piece content data via the communication interface 307 and transfers it to the playback content buffer 304. Then, similarly to step 154 above, the received musical piece content data is converted into an analog audio signal, and this signal is supplied to the speaker 313 via an amplifier 312, so that sound is played back (step S189). Thereafter, the process returns to step S185, and a further depressing operation of the genre button 122 is monitored.

When it is determined in step S185 that the genre button 122 is not depressed, the CPU 301 determines whether or not the track button 123 is depressed (step S191 in FIG. 29). When it is determined that the track button 123 is also depressed, the process returns to step S185, and the depressing operation of the genre button 122 is monitored.

When it is determined in step S191 that the track button 123 is depressed, the CPU 301 determines whether or not the depressing operation is a long depression (step S192). When it is determined that the depressing operation is not a long depression, the CPU 301 determines that the operation of the track button 123 is a normal one depressing operation, controls the transmission and reception data processing section 306 so as to generate a same group distribution request that requests the distribution of desired musical piece content differing from the musical piece content currently being played back from the genre that is the same as that of the musical piece content currently being played back and to transmit the same group distribution request to the server apparatus 51 (step S193).

In the same group distribution request, not only the identification information of the content reception terminal 52, but also the identification information of the musical piece content currently being played back is contained.

With respect to the same group distribution request, since the data of the musical piece content corresponding thereto is sent from the server apparatus 51, the transmission and reception data processing section 306 receives the musical piece content data via the communication interface 307 and transfers it to the playback content buffer 304. Then, similarly to step 189 above, the received musical piece content data is converted into an analog audio signal and is supplied to the speaker 313 via the amplifier 312, so that sound is played back (step S194). Thereafter, the process returns to step S185, and a further depressing operation of the genre button 122 is monitored.

When it is determined in step S192 that the depressing operation of the track button 123 is a long depression, the CPU 301 controls the transmission and reception data processing section 306 so as to transmit, to the server apparatus 51, a distribution request for requesting that intros of a plurality of pieces of musical content (hereinafter, this distribution request is referred to as an "intro distribution request") differing from the content currently being played back in the same genre as that of the content currently being played back are sequentially distributed (step S195).

In the intro distribution request, the identification information of the content reception terminal 52 and the identification information of the content currently being played back are contained.

With respect to the intro distribution request, the intros of a plurality of pieces of musical content differing from the content currently being played back in the same genre as that of the content currently being played back (the identification information of each piece of the musical piece content is attached to each of the intros) are sent from the server apparatus 51. Therefore, in the content reception terminal 52, the data of the intros is temporarily stored in the playback content buffer 304. Then, the intros of each piece of the musical piece content are sequentially read from the playback content buffer 304 and are played back (step S196).

Then, the CPU 301 waits for the track button 123 to be depressed again by the user (step S197) and continues the sequential playback of the intros until another depressing operation is performed. Then, when it is determined in step S197 that the track button 123 is depressed again, the CPU 301 performs control so that the sequential playback of the intros is stopped, the identification information of the musical piece content whose intro was being played back when the depressing operation was performed is read from the playback content buffer 304, and the distribution request containing the identification information of the musical piece content as the identification information of the request content is transmitted to the server apparatus 51 via the transmission and reception data processing section 306 (step S198).

Then, in the content reception terminal 52, the data of the request content sent from the server apparatus 51 in response to the distribution request is received by the transmission and reception data processing section 306, the data of the received content is transferred to the content decoding section 305 via the playback content buffer 304 and is processed similarly to that described above, thereby playing back the musical piece content (step S199). Thereafter, the process returns to step S185, and the depressing operation of the genre button 122 is monitored.

Figure 30:
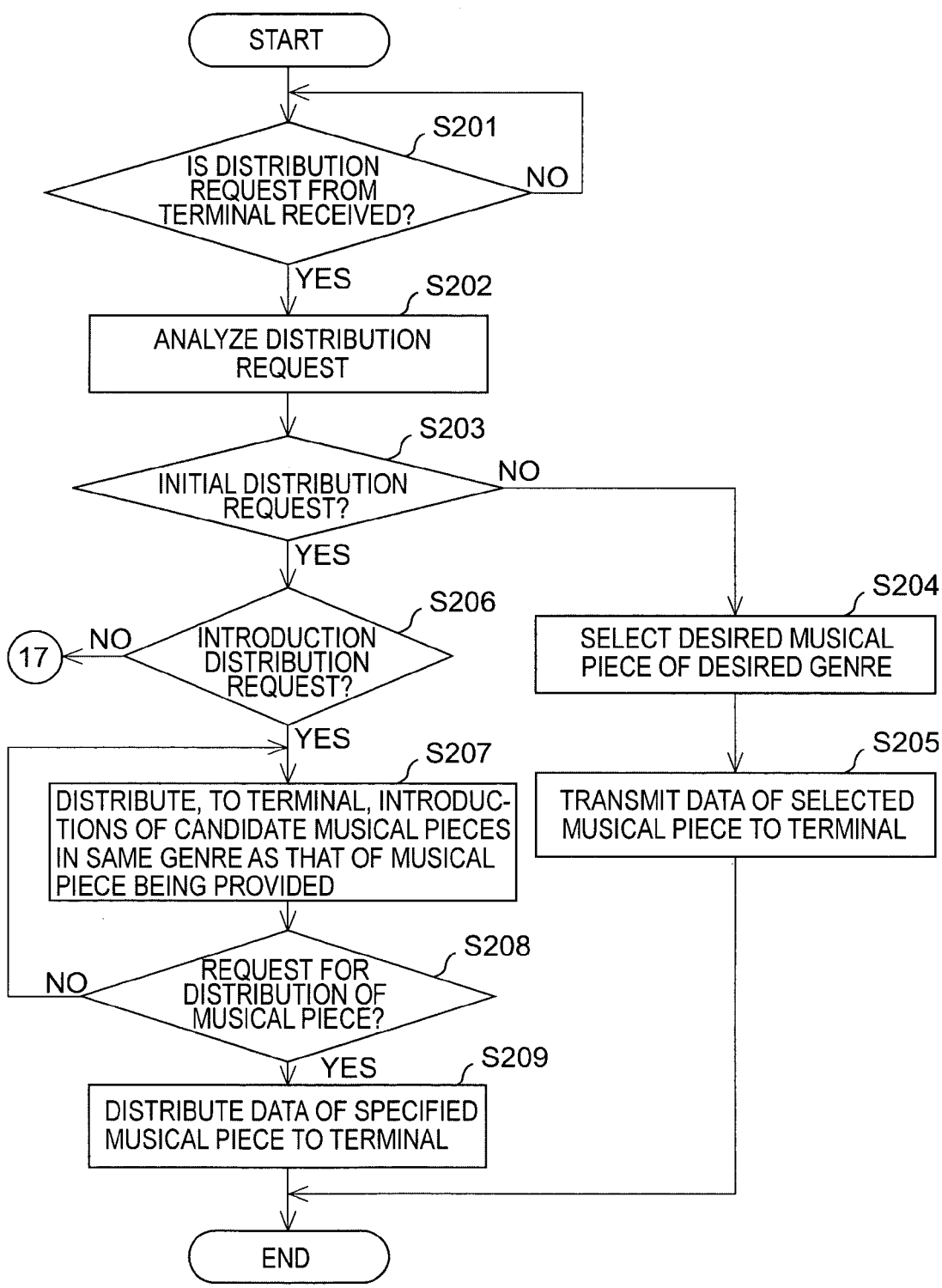
FIG. 30 shows a portion of the flowchart illustrating the processing operation in the content providing system according to the sixth embodiment of the present invention.
Figure 31:
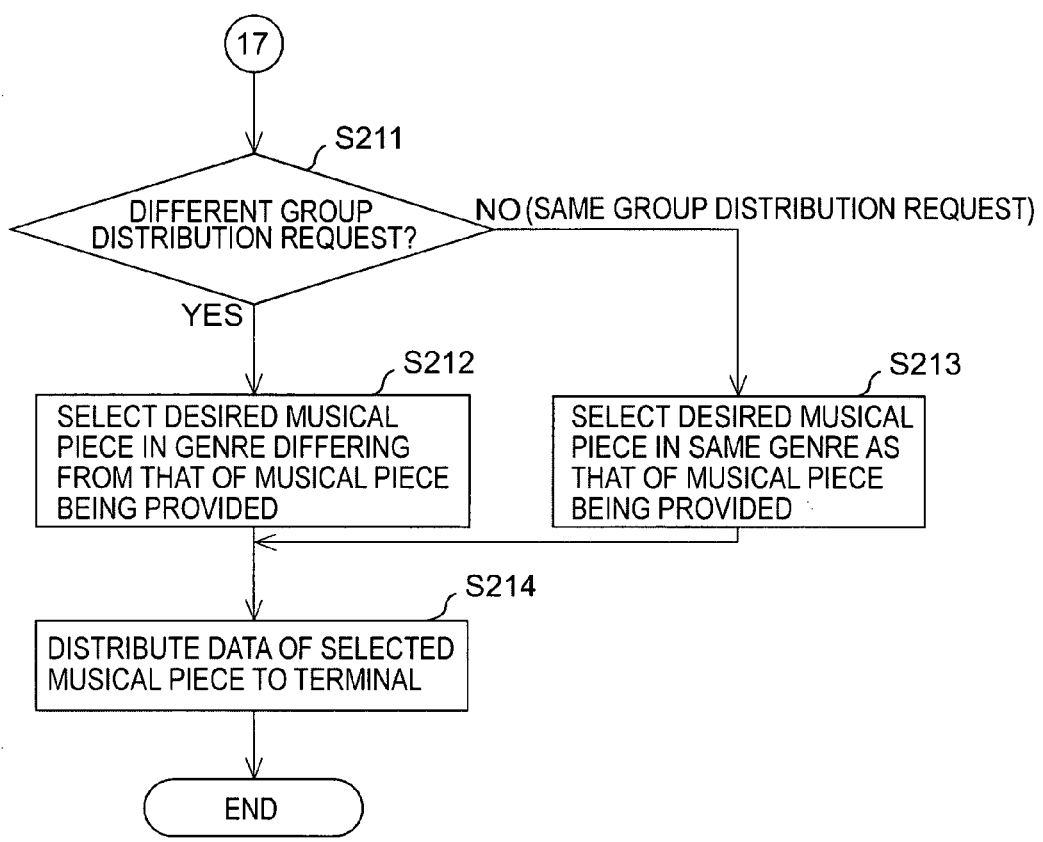
FIG. 31 shows a portion of the flowchart illustrating the processing operation in the content providing system according to the sixth embodiment of the present invention.

Next, a description is given, with reference to the flowcharts in FIGS. 30 and 31, of the processing operation in the server apparatus 51, corresponding to the above processing operation of the content reception terminal 52.

The CPU 201 of the server apparatus 51 monitors the reception of the distribution request from the content reception terminal 52 (step S201). When it is determined that the distribution request from the content reception terminal 52 is received, the distribution request is analyzed to identify as to what the distribution request is (step S202).

Then, based on the result of the identification in step S202, a determination is made as to whether or not the request is an initial distribution request (step S203). When it is determined that the request is an initial distribution request, the CPU 201 selects and reads desired musical piece content of a desired genre from the content database memory 204 (step S204) and distributes it to the content reception terminal 52 that has made the distribution request (step S205).

Furthermore, based on the result of the identification in step S202, a determination is made as to whether or not the request is an intro distribution request (step S206). When it is determined that the request is an intro distribution request, based on the content identification information contained in the intro distribution request, the data of the intro portions of a plurality of desired pieces of content belonging to the same genre as that of the content indicated by the content identification information, which is content differing from the content indicated by the content identification information, is sent to a terminal 52 that has made the intro distribution request (step S207). At this time, the identification information of the musical piece is attached to the intro of each musical piece.

Then, the CPU 201 waits for a distribution request containing the identification information of specific musical piece content from the content reception terminal 52 (step S208). When the distribution request is received, the data of the musical piece content specified by the identification information of the musical piece content is distributed to the content reception terminal 52 (step S209).

Next, when it is determined in step S206 that the request is not an intro distribution request, the CPU 201 determines whether or not the request is a different group distribution request (step S211 in FIG. 31). Then, when it is determined in step S211 that the request is a different group distribution request, the CPU 201 selects desired musical piece content of a desired genre differing from that of the content currently being played back on the basis of the identification information of the content currently being played back, which is contained in the received different group distribution request, reads the musical piece content from the content database memory 204 (step S212), and distributes it to the content reception terminal 52 that has made the distribution request (step S214).

When it is determined as the result of the identification in step S211 that the request is not a different group distribution request but a same group distribution request, based on the identification information of the content currently being played back, which is contained in the received same group distribution request, the CPU 201 selects content different from the content currently being played back, which is desired musical piece content of the same genre as that of the content currently being played back, read the content from the content database memory 204 (step S213), and distributes the content to the content reception terminal 52 that has made the distribution request (step S214).

This completes the processing routine of the content distribution in the server apparatus 51.

In the foregoing description, when a content distribution request is sent to the server apparatus 51, in the content reception terminal 52, the identification information of the content being played back, which was distributed previously, is contained in the content distribution request. However, when the server apparatus 51 stores the identification information of the musical piece content, which was previously distributed to each of the content reception terminals 52, the identification information of the musical piece content currently being played back needs not to be contained in the same group distribution request. The reason for this is that the server apparatus 51 can confirm the identification information of the musical piece content that was previously distributed to the terminal that has made the distribution request by referring to the storage information and can select the group of musical piece content to be distributed next and distribution content on the basis of the identification information of the musical piece content.

Other Embodiments of the Content Providing System

The above-described content providing system is not limited to the content providing system of the fifth embodiment and the sixth embodiment, and a content provision mode based on the operation of a plurality of operation buttons can be realized similarly to the modification of the second embodiment, the third embodiment, and the fourth embodiment in the above-described content providing apparatus.

Also, in those embodiments, similarly to the fifth embodiment and the sixth embodiment, in the content reception terminal 52, a content distribution request in response to the operated operation button is sent to the content distribution server apparatus, and the content distribution server distributes the content and the intros in accordance with the request.

Embodiments of Web Site Changing Apparatus and Web Site Changing System for Providing Web Pages content to be provided by the content providing apparatus and the content providing system according to the present invention is not limited to the content of musical pieces and also contains pages of Web sites (Web pages).

When pages of Web sites are provided content, there are an embodiment of a Web site changing apparatus, which is an embodiment identical to the content providing apparatus of the first to fourth embodiments, and an embodiment of a Web site changing system formed of a server apparatus and a terminal device, which is an embodiment identical to the content providing system of the fifth and the sixth embodiments.

In the embodiment of the Web site changing apparatus, the Web site changing apparatus itself stores in advance addresses of a large number of URLs (Uniform Resource Locators) in a storage device such as a hard disk device, and based on the input information input via input means, such as an operation button and speech input means provided in the Web site changing apparatus, the Web site changing apparatus changes to a Web site differing from the Web site currently being accessed and provides Web pages to a user.

Also, in this case, similarly to the above-described examples, the Web sites stored in the storage device of the Web site changing apparatus are grouped according to the genre, such as news, sports, and economics, and according to other items for grouping, and are managed. Then, similarly to the case of the musical piece content of the above-described embodiments, Web pages in the group and Web pages beyond the group are provided to the user.

The embodiment of the Web site changing apparatus can realize an embodiment exactly corresponding to the first to fourth embodiments of the content providing apparatus.

In the embodiment of the Web site changing system, the server apparatus includes a storage device for URL addresses of Web pages, and similarly to that described above, the URLs of a large number of Web sites are grouped according to the information provided as pages by the Web sites, and the URLs of the Web site are managed.

On the other hand, the terminal device includes input means, such as operation buttons and speech input means, and is configured in such a way that, based on input information input via the input means, a request for changing to a Web site differing from the Web site currently being accessed is transmitted to the server apparatus.

Then, similarly to the content reception terminal of the content providing system of the fifth and sixth embodiments, the terminal device sends a request for obtaining Web pages of the same group as that of the Web page currently being accessed and Web pages of a different group to the server apparatus in response to the operation of the operation button.

The server apparatus receives the Web page obtaining request from the terminal device, and provides the URL address of the Web page to the terminal device similarly to the case of the above-described distribution request of musical piece content. Alternatively, the server apparatus obtains a Web page in accordance with the request and provides the obtained Web page to the terminal device.

In the provision of Web pages in the embodiment of the Web site changing system, the terminal device may not be provided with input means such as operation buttons and speech input means, and on each Web page provided from the server apparatus, icon buttons similar to the operation buttons of the above-described embodiments may be displayed.

In this case, the terminal device can send the information of the operated icon button and the identification information of the Web page that was displayed when the icon button was operated to the server apparatus. The server apparatus can send to the content reception terminal the URL address of the Web page to be presented next on the basis of the received information of the icon button and the received information of the Web page, or can transmit to the content reception terminal the information of the Web page to be presented next.

Also, the embodiment of the Web site changing system can be realized as a plurality of embodiments similarly to the above-described content providing system.

Other Embodiments

As a method for grouping content of musical pieces, grouping can be performed by using content related attributes, such as a genre, an artist, and an album as in the above-described examples, but also by using feature attributes, which are directly extracted from content, for example, a tempo, a melody, and a beat (8 beat, 16 beat, etc.). For example, by using tempo, the content can be grouped into several groups from the slowest tempo to the fastest tempo. As the method for extracting tempo, methods disclosed in, for example, Japanese Unexamined Patent Application Publication No. 2002-116754 and Japanese Patent Application No. 2003-94100 can be used.

As also described above, in all the above-described embodiments, for inputting the meaning "the current state differs from the state desired by the user", a specific speech input, for example, uttering the word "different", and the operation of clapping the hands can also be processed as the above input.

Instead of providing the operation buttons in the housing of the content providing apparatus and the content reception terminal, a remote commander may be provided, and in the content providing apparatus and the content reception terminal, a section for receiving a remote control signal from the remote commander may be provided.

The content to be provided by the content providing apparatus according to the present invention is not restricted to content of musical pieces and pages of Web sites, but movie content, electronic-book content, etc., are also contained. The content providing apparatus can also be applied to uses for selection and recommendations of musical pieces of karaoke (sing-along).

In each of the above-described embodiments, the provision of content is content data itself of musical piece content, image content, and Web pages. The provision of content may be presentation of the title of the musical piece content to be recommended, the name of the artist, the name of the composer, etc., presentation of the name of image content and intro information, presentation of a list of a plurality of recommended pieces of content, and presentation of book names of recommended electronic-book contents. The provision of content needs not always to play back or display the content itself.

Furthermore, a list of musical piece content to be continuously played back in a case where, for example, a plurality of pieces of musical content are continuously played back, can also be made to be provision information. In this case, as a method for providing the list, in addition to the method of presenting the names of musical piece content in the form of a list, intros of a plurality of pieces of musical content in the form of a list are sequentially played back so as to be provided to the user.

In this case, grouping can be performed according to a group in which the arrangement sequence of a plurality of pieces of musical content contained in the list of the musical piece content to be continuously played back is changed and according to a group in which a plurality of pieces of musical content are changed variously. As the group in which a plurality of pieces of musical piece content are changed variously, group organization is possible such as a group organized by making common, for example, a rule for grouping such as a genre and a group of musical piece content organized regardless of a grouping rule, such as a genre, an artist, and an album. Furthermore, the group corresponding to uses, such as party use and private use, can also be organized.

In the above-described embodiments, although the content providing apparatus and the content reception terminal are described in the form of a desktop-type apparatus, they may be portable apparatuses and car-mounted apparatuses. In the case of a portable apparatus, when content is musical piece content, the portable apparatus needs not always to be provided with a speaker, and may include a jack via which a plug of a headphone or an earphone can be inserted.

In the above-described embodiments, as the method of making "desired" in the selection of desired content and Web sites, in intro playback in a desired sequence, and in the presentation of candidates of a plurality of desired Web sites, a method of using a random number is adopted. However, for the method, the addressing of the storage device may also be used. In addition, the selection history about each group and content by the user on the basis of the operation history of operation buttons and the history of input information via speech input means is stored in advance, and by analyzing the selection history, preference tendency about the group and content for the user is determined, so that the determined preference tendency may be reflected in the selection of desired content and in the sequence of intro playback.

Furthermore, the server apparatus may store in advance the content provision history and the Web site provision history with respect to each content reception terminal, and by analyzing them, preference tendency is determined, and the preference tendency may be reflected in the selection of provided content and Web sites.

What is claimed is:

1. A content providing apparatus comprising:
a memory in which a plurality of pieces of content are divided into a plurality of groups based on related attributes and are stored, the groups being part of a hierarchical data structure and corresponding to a same level within the hierarchical data structure;
input detection means for detecting a first input from a user;
providing means for providing a first content to the user; and
provided-content changing means for selecting, from the plurality of pieces of content stored in the memory, a second content belonging to a different group than the first content, and causing the providing means to provide the second content to the user in response to the first input being detected by the input detection means in a state in which the first content is provided to the user such that the user specifies that a change of group is desired but does not specify the different group,
the apparatus having a first operation button that performs operations of switching on a power supply of the apparatus in response to the first button being depressed during a power supply off state, switching from a content belonging to a first of the groups to another content belonging to the first group in response to the first button being depressed during a power supply on state and the depression is not a long depression, and switching from a content belonging to a first group to a content belonging to a second group in response to the first button being depressed during a power supply on state and the button is depressed two times continuously,
a server stores content provision history for the apparatus and analyzes the content provision history to determine a preference tendency for the user, and
the preference tendency is reflected in the selection of the second content,
dividing the plurality of pieces of content into a plurality of groups is performed according to a rule and the rule changed by the user through use of the first button, the rule being changed in response to a three-time continuous operation of the button,
the apparatus having a second operation button, the provided-content changing means selecting the second content other than the first content currently being provided from the plurality of pieces of content stored in the content storage section and providing the second content to the user in response to the input detection means detecting a first one of the two different operations of the second operation button, and
the provided-content changing means sequentially providing a portion of each of a plurality of pieces of content belonging to the differing group in response to the input detection means detecting a second one of the two different operations of the second operation button.

2. The content providing apparatus according to claim 1, wherein the second content is provided to the user by reproducing the second content.

3. The content providing apparatus according to claim 1, wherein the provision of the second content to the user is a presentation of information for identifying the second content.

4. The content providing apparatus according to claim 1, further comprising a microphone, wherein the input detection means detects, as the first input, a speech input of a specific word picked up by the microphone.

5. The content providing apparatus according to claim 1, wherein the input detection means also detects a second input differing from the first input, and the provided-content changing means selects, from the plurality of pieces of content stored in the memory, the second content belonging to the same group as the group to which the first content belongs and provides the second content to the user in response to the second input being detected by the input detection means in a state in which the first content is provided to the user.

6. The content providing apparatus according to claim 5, wherein the input detection means detects different operations of the first operation button as the first input and the second input.

7. The content providing apparatus according to claim 5, further comprising a microphone, wherein the input detection means detects speech inputs of two different words, picked up by the microphone, as the first input and the second input.

8. The content providing apparatus according to claim 5, wherein the input detection means detects the operations of the first and second operation buttons as the first input and the second input, respectively.

9. The content providing apparatus according to claim 5, wherein the provided-content changing means selects and provides the second content belonging to a group differing from the group to which the first content being provided belongs based on a provision history of first content when the first input is detected by the input detection means, and selects second content belonging to the group to which the first content being provided belongs based on a provision history of the second content when the second input is detected by the input detection means.

10. The content providing apparatus according to claim 5, wherein the input detection means also detects a third input differing from the first input and the second input, and the provided-content changing means changes a rule used for changing to the second content to another rule when the third input is detected by the input detection means.

11. The content providing apparatus according to claim 10, wherein the input detection means detects different operations of the first two operation button as the first input and the third input, respectively, and detects an operation of the second operation button as the second input.

12. The content providing apparatus according to claim 5, wherein the input detection means also detects a third input differing from the first input and the second input, and the provided-content changing means changes a rule used for changing to a group differing from the group to which the first content belongs to another rule when the third input is detected by the input detection means.

13. The content providing apparatus according to claim 12, wherein the input detection means detects an operation of the first operation button as the first input, and detects different operations for the second operation button as the second input and the third input.

14. The content providing apparatus according to claim 1, wherein
the provided-content changing means selects the second content other than the first content currently being provided from the plurality of pieces of content stored in the memory and provides the second content to the user in response to the input detection means detecting a first one of two different operations of the first operation button, and
the provided-content changing means sequentially provides, to the user, a portion of each of a plurality of pieces of content belonging to the same group as the first content in response to the input detection means detecting a second one of the two different operations with respect to the first operation button, and during the sequential providing of the portion of each of the plurality of pieces of content, establishes the piece of content whose portion is currently being provided as the second content in response to the input detection means detecting the first operation of the first operation button.

15. The content providing apparatus according to claim 1, wherein during the sequential providing of the portion of each of the plurality of pieces of content belonging to the differing group, the provided-content changing means establishes the piece of content whose portion is currently being provided as the second content in response to the input detection means detecting the first operation of the second operation button.

16. The content providing apparatus according to claim 1, further comprising: a display section; and selection operation means for performing a selection input in a state in which a selection-prompting display is displayed on the display section, wherein items used for searching for content are displayed on the display section, and content stored in the memory is directly selected by selecting the displayed items by the selection operation means.

17. The content providing apparatus according to claim 1, wherein the provided-content changing means selects a classification differing from a classification to which the first content currently being provided based on provision history of a classification of the first content.

18. The content providing apparatus according to claim 1, wherein the input detection means also detects a third input differing from the first input, and when the input detection means detects the third input, the provided-content changing means changes a rule of dividing said plurality of pieces of content into said plurality of groups, and selects said second content belonging to a group differing from the group to which the first content being provided belongs.

19. The content providing apparatus according to claim 18, wherein the input detection means detects different operations of one of the first and second operation buttons as the first input and the third input.

20. The content providing apparatus according to claim 1, wherein
the input detection means detects two different operations with respect to the first operation button, and
in response to the input detection means detecting a first operation of the two different operations, the provided-content changing means selects the second content other than the first content currently being provided from amongst the plurality of pieces of content stored in the memory and provides the second content to the user,
in response to the input detection means detecting a second operation of the two different operations, the provided-content changing means sequentially provides, to the user, a portion of each of a plurality of contents belonging to the group differing from the group to which the first content belongs, and in response to the input detection means detecting the first operation during the sequential providing, the provided-content changing means establishes the piece of content whose portion is currently being provided as the second content.

21. A Web site changing apparatus comprising:
a memory in which uniform resource locators (URLs) of a plurality of groups of Web sites are stored, the groups being part of a hierarchical data structure and corresponding to a same level within the hierarchical data structure;
input detection means for detecting a first input from a user; and
URL changing means for reading, from the memory, the URL of another Web site other than a Web site currently being presented among the URLs of the Web sites belonging to a group differing from the Web site being presented, accessing an associated URL, and shifting to a state in which the page of the another Web site is presented when the input detection means detects the first input when one page of the Web site is presented to a user, the Web site changing being performed such that the user specifies that a change of group is desired but does not specify the differing group, and the apparatus having a first operation button that performs operations of switching on a power supply of the apparatus in response to the first button being depressed during a power supply off state, switching from a Web site belonging to a first of the groups to another Web site belonging to the first group in response to the first button being depressed during a power supply on state and the depression is not a long depression, and switching from a Web site belonging to a first group to a Web site belonging to a second group in response to the first button being depressed during a power supply on state and the button is depressed two times continuously, a server stores content provision history for the apparatus and analyzes the content provision history to determine a preference tendency for the user, and the preference tendency is reflected in the presentation of the another Web site, the plurality of groups of Web sites are formed according to a rule and the rule changed by the user through use of the first button, the rule being changed in response to a three-time continuous operation of the button, the apparatus having a second operation button, the URL changing means switching from presenting the page of the Web site belonging to the first group to presenting the page of the Web site belonging to the second group in response to the input detection means detecting a first one of the two different operations of the second operation button, and the URL changing means sequentially presenting a page of each of a plurality of Web sites belonging to the differing group in response to the input detection means detecting a second one of the two different operations of the second operation button.

22. The Web site changing apparatus according to claim 21, wherein said input detection means also detects a second input different from the first input, and the URL changing means reads, from the memory, the URL of the another Web site other than the Web site currently being presented from among the URLs of the Web sites belonging to the same group as a group to which the URL of the Web site currently being presented belongs, accesses the read URL, and shifts to the page of the another Web site when the input detection means detects the second input when the page of the Web site is presented to the user.

23. A content providing method for reading content from a content storage section of an apparatus in which a plurality of pieces of content are stored in such a manner as to be divided into a plurality of groups and for providing the content to a user, the groups being part of a hierarchical data structure and corresponding to a same level within the hierarchical data structure, the content providing method comprising the steps of:

selecting, from content stored in the content storage section, a second content belonging to a group differing from a group to which a first content being provided belongs when a first input by a user is detected in a state in which one of the pieces of content is provided to the user;

providing the second content to the user, the method being performed such that the user specifies that a change of group is desired but does not specify the differing group;

switching on a power supply of the apparatus in response to a first operation button being depressed during a power supply off state, switching from a content belonging to a first of the groups to another content belonging to the first group in response to the first button being depressed during a power supply on state of the apparatus and the depression is not a long depression;

switching from a content belonging to a first group to a content belonging to a second group in response to the first button being depressed during a power supply on state and the button is depressed two times continuously;

wherein a server stores content provision history for the apparatus and analyzes the content provision history to determine a preference tendency for the user, the preference tendency is reflected in the selection of the second content, and dividing the plurality of pieces of content into a plurality of groups is performed according to a rule and the rule changed by the user through use of the first button, the rule being changed in response to a three-time continuous operation of the button;

selecting the second content other than the first content currently being provided from the plurality of pieces of content stored in the content storage section and providing the second content to the user in response detecting a first one of the two different operations of a second operation button; and sequentially providing a portion of each of a plurality of pieces of content belonging to the differing group in response to detecting a second one of the two different operations of the second operation button.

24. A Web site changing method for changing a page of a Web site to be presented to a user of an apparatus to the page of the Web site of a URL read from a URL storage section in which URLs of a plurality of groups of Web sites are stored, the groups being part of a hierarchical data structure and corresponding to a same level within the hierarchical data structure, the Web site changing method comprising the steps of:

reading, from the URL storage section, the URL of a second Web site other than a first Web site currently being presented from among the URLs of the Web sites belonging to a group different from the first Web site when a first input by a user is detected when one page of the Web site is presented; accessing the read URL;

shifting to a state in which the page of the second Web site is presented, the Web site changing being performed such that the user specifies that a change of group is desired but does not specify the differing group;

switching on a power supply of the apparatus in response to a first operation button is depressed during a power supply off state;

switching from a Web site belonging to a first of the groups to another Web site belonging to the first group in response to the first button being depressed during a power supply on state and the depression is not a long depression;

switching from a Web site belonging to a first group to a Web site belonging to a second group in response to the first button being depressed during a power supply on state and the button is depressed two times continuously, wherein a server stores content provision history for the apparatus and analyzes the content provision history to determine a preference tendency for the user, and the preference tendency is reflected in the presentation of the second Web site, and the plurality of groups of Web sites are formed according to a rule and the rule changed by the user through use of the first button, the rule being changed in response to a three-time continuous operation of the button;

switching from presenting the page of the Web site belonging to the first group to presenting the page of the Web site belonging to the second group in response to detecting a first one of two different operations of a second operation button, and sequentially presenting a page of each of a plurality of Web sites belonging to the differing group in response to detecting a second one of the two different operations of the second operation button.

* * * * *